United States Patent
Iwagami et al.

(10) Patent No.: US 10,040,440 B2
(45) Date of Patent: Aug. 7, 2018

(54) VEHICLE ELECTRONIC CONTROL APPARATUS

(71) Applicant: Mitsubishi Electric Corporation, Chiyoda-ku, Tokyo (JP)

(72) Inventors: Yuki Iwagami, Tokyo (JP); Koji Hashimoto, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 14/840,352

(22) Filed: Aug. 31, 2015

(65) Prior Publication Data

US 2016/0347326 A1     Dec. 1, 2016

(30) Foreign Application Priority Data

Jun. 1, 2015  (JP) ................................ 2015-111187

(51) Int. Cl.
*B60W 50/04* (2006.01)
*B60W 10/10* (2012.01)
(Continued)

(52) U.S. Cl.
CPC ............ *B60W 10/10* (2013.01); *B60W 10/06* (2013.01); *B60W 50/023* (2013.01);
(Continued)

(58) Field of Classification Search
CPC ...... B60W 50/02; B60W 50/04; B60W 10/06; B60W 10/08; B60W 20/00; B60K 6/445;
(Continued)

(56) References Cited

U.S. PATENT DOCUMENTS

| | | | | |
|---|---|---|---|---|
| 2001/0027537 A1* | 10/2001 | Nada | ...................... | B60K 6/365 714/23 |
| 2003/0100975 A1 | 5/2003 | Hashimoto et al. | | |

(Continued)

FOREIGN PATENT DOCUMENTS

| | | |
|---|---|---|
| JP | 2003-161194 A | 6/2003 |
| JP | 2009-129267 A | 6/2009 |

(Continued)

*Primary Examiner* — Anne M Antonucci
*Assistant Examiner* — Sanjeev Malhotra
(74) *Attorney, Agent, or Firm* — Sughrue Mion, PLLC; Richard C. Turner

(57) ABSTRACT

A first monitoring control circuit unit monitors controlling operation of an engine control unit (ECU); when the occurrence frequency of an abnormality becomes the same as or larger than a predetermined threshold value, a first storage circuit stores that occurrence frequency and a first cutoff circuit de-energizes an intake valve opening degree control motor for an air-intake throttle so as to set the intake valve opening degree to a fixed intake valve opening degree; a second monitoring control means monitors controlling operation of a transmission control unit (TCU); when the occurrence frequency of an abnormality becomes the same as or larger than a predetermined threshold value, a second storage circuit stores that occurrence frequency and a second cutoff circuit de-energizes a gear-shifting electromagnet valve so as to set the transmission ratio to a fixed transmission ratio.

11 Claims, 21 Drawing Sheets

(51) Int. Cl.
    *B60W 10/06* (2006.01)
    *B60W 50/023* (2012.01)
    *B60W 50/032* (2012.01)
    *B60W 50/00* (2006.01)

(52) U.S. Cl.
    CPC ... *B60W 50/032* (2013.01); *B60W 2050/0005* (2013.01); *B60W 2050/0006* (2013.01)

(58) Field of Classification Search
    CPC ....... B62D 5/008; F02D 41/22; F02D 41/266; F16H 1/321; Y10T 74/1966; Y10T 90/14; Y02T 10/6239; Y02T 10/7005; Y02T 10/7072
    USPC ............. 701/1, 42, 103; 714/2, 23; 180/444; 318/400.21; 370/329, 362; 475/115; 320/109; 709/224; 60/428
    See application file for complete search history.

(56) References Cited

U.S. PATENT DOCUMENTS

| | | | |
|---|---|---|---|
| 2007/0050122 A1* | 3/2007 | Matsuda | F02D 11/107 701/103 |
| 2009/0134970 A1 | 5/2009 | Iwagami et al. | |
| 2009/0312898 A1 | 12/2009 | Hashimoto | |
| 2011/0022246 A1* | 1/2011 | Rieth | G01C 21/32 701/1 |
| 2011/0108355 A1* | 5/2011 | Shiina | B62D 5/008 180/444 |
| 2011/0108356 A1* | 5/2011 | Otsuki | B62D 5/008 180/444 |
| 2011/0160985 A1* | 6/2011 | Yamaguchi | B60W 50/0205 701/112 |
| 2011/0266984 A1* | 11/2011 | Watanabe | G05B 9/03 318/400.21 |
| 2012/0040792 A1* | 2/2012 | Ito | F16H 61/0025 475/115 |
| 2012/0297235 A1* | 11/2012 | Nakamura | B60K 6/445 714/2 |
| 2013/0099740 A1* | 4/2013 | Takashima | B60L 11/1816 320/109 |
| 2013/0289827 A1* | 10/2013 | Yoshitake | B62D 5/0463 701/42 |
| 2013/0322434 A1* | 12/2013 | Armbruster | H04L 12/40006 370/362 |
| 2015/0149619 A1* | 5/2015 | Tsuji | G08B 21/04 709/224 |
| 2015/0354607 A1* | 12/2015 | Avni | F15B 11/16 60/428 |
| 2016/0198477 A1* | 7/2016 | Takagi | G06K 19/0723 370/329 |

FOREIGN PATENT DOCUMENTS

| | | |
|---|---|---|
| JP | 2009-274569 A | 11/2009 |
| JP | 2009-298308 A | 12/2009 |

* cited by examiner

VEHICLE ELECTRONIC CONTROL APPARATUS

BACKGROUND OF THE INVENTION

Field of the Invention

The present invention relates to a vehicle electronic control apparatus provided with a pair of microprocessors consisting of a first CPU and a second CPU that work as an engine control means and a transmission control means, respectively, and particularly to a vehicle electronic control apparatus improved in such a way that a plurality of saving operation means can be utilized so as to be effectively combined in accordance with an abnormality in the first CPU side and an abnormality in the second CPU side.

Description of the Related Art

In general, engine control means in a vehicle engine control system include a valve-opening control means for controlling the valve opening degree of an air-intake throttle and a basic control means consisting of an ignition control means (in the case of a gasoline engine) and a fuel injection control means; when an abnormality exists in the valve-opening control means, a first saving operation can be implemented based on a fixed throttle valve opening degree.

In contrast, a transmission control means incorporated in the vehicle engine control system or implemented by a transmission control apparatus connected with the outside of the vehicle engine control system includes a gear-shift control means that controls the transmission ratio of a continuously variable transmission in response to the step-on degree of the accelerator pedal and the present vehicle speed or performs multi-step automatic gear shifting by combining the actions of a plurality of linear solenoid valves and hydraulic-clutch hydraulic pressure control, which is another basic control means, for forward/backward switching, torque-converter lockup, all-wheel driving, and the like; when the operation of the transmission control means is stopped, forward driving with a fixed transmission ratio, suitable for a middle or high speed drive, can be implemented.

For example, according to FIG. 1 of Patent Document 1 "engine control apparatus", listed below, there are provided a main CPU 111 that functions as an engine control means for performing fuel injection control and valve-opening control of an intake valve and a sub-CPU 121 that functions as a transmission control means; when a first abnormality storage device 133 stores an abnormality, a power-supply load relay 104a for an intake valve opening degree control motor 108 is de-energized and then sever-abnormality saving driving is implemented based on the fixed throttle valve opening degree represented in FIG. 2.

The first abnormality storage device 133 is set when a first reset signal RST1 for the main CPU 111, a second reset signal RST2 for the sub-CPU 121, an actuator-system output ER0, for valve-opening driving, that is detected by the main CPU 111, and a sever-sensor-abnormality detection output ER1 of a valve opening system occur; the first abnormality storage device 133 is reset when a power switch 107 is closed.

Patent Document 1 is characterize in that an abnormality is categorized into a sever abnormality or a slight abnormality by determining, for example, as to whether a pair of accelerator position sensors that detect the step-on degree of an accelerator pedal are both abnormal or only any one of the accelerator position sensors is abnormal or as to whether a pair of throttle position sensors that detect the intake valve opening degree are both abnormal or only any one of the throttle position sensors is abnormal, so that a simple saving operation can be implemented without relying on the fixed throttle valve opening degree.

According to FIG. 1 of Patent Document 2 "a vehicle electronic control apparatus with a monitoring control circuit", listed below, a main control circuit unit 20A that performs fuel injection control, valve-opening control of an intake valve, and transmission control of a transmission is connected in series with a monitoring control circuit unit 30A that includes transmission-related input and output circuits; Question information for monitoring the controlling operation of the main control circuit unit 20A is transmitted thereto by the monitoring control circuit unit 30A; the monitoring control circuit unit 30A compares answer information obtained from the main control circuit unit 20A with correct answer information preliminarily stored in the monitoring control circuit unit 30A so as to determine whether or not an abnormality exists in the control by the main control circuit unit 20A; then, in the case where an abnormality is detected, the monitoring control circuit unit 30A generates a reset output RST2 so as to initialize and then restart the main control circuit unit 20A.

When detecting an abnormality in the monitoring control circuit unit 30A, the main control circuit unit 20A generates a reset output RST1 so as to initialize and then restart the monitoring control circuit unit 30A; a watchdog timer 40 monitors a watchdog signal WD, which is a pulse train signal generated by a microprocessor 20 included in the main control circuit unit 20A; when the pulse width of the watchdog signal WD exceeds a predetermined value, the watchdog timer 40 generates a reset pulse RST so as to initialize and then restart the main control circuit unit 20A and the monitoring control circuit unit 30A. Patent Document 2 is characterized in that the same question information is repeatedly transmitted in order to prolong the question communication period so that synchronous communication of upstream and downstream signals is implemented while the control load on the main control circuit unit 20A is reduced.

In contrast, according to FIG. 1 of Patent Document 3 "vehicle control apparatus", listed below, there is disclosed a vehicle control apparatus in which a master-side core 21 included in a multicore CPU (dual-core CPU) 20 performs engine control and a slave-side core 22 performs transmission control; a monitoring IC 30, which is a watchdog timer, is connected with the multicore CPU 20; when an abnormality exists in the slave-side core 22, the master-side core 21 can perform proxy processing.

Specifically, when an abnormality exists in the slave-side core 22 that performs automatic transmission control, the master-side core 21 sets the transmission to the second fixed mode, as a simple proxy processing, so that saving operation of the vehicle can be implemented. The multicore CPU 20 in Patent Document 3 is not provided with a function of resetting each of the cores when an abnormality exists in any one of the cores; the multicore CPU 20 is of a type in which the whole cores are collectively reset (refer to Paragraph [0006]). A contrivance is provided to the multicore CPU 20 in such a way that although when an abnormality exists in the slave-side core 22, the slave-side core 22 is reset by the master-side core 21, the master-side core 21 is not reset (refer to Paragraph[0007]). When an abnormality exists in the master-side core 21, the monitoring IC 30 resets both the master-side core 21 and the slave-side core 22 so as to initialize and then restart them.

According to FIG. 1 of Patent Document 4 "a vehicle electronic control apparatus with a monitoring control circuit", listed below, a gear-shift control apparatus 41, which is a part of an external control apparatus 40, is connected in series with a vehicle electronic control apparatus 10A by way of a main control circuit unit 20A; the vehicle electronic control apparatus 10A is provided with the main control circuit unit 20A and a monitoring control circuit unit 30A. The monitoring control circuit unit 30A periodically transmits question information to the main control circuit unit 20A and the external control apparatus 40 and compares answer information for the question information with correct answer information corresponding to expected answer information so as to determine whether or not an abnormality exists in the main control circuit unit 20A or the external control apparatus 40.

In Patent Document 4, when detecting a question-answer abnormality in the main control circuit unit 20A, the monitoring control circuit unit 30A generates a reset output RST2 so as to initialize and then restart a microprocessor in the main control circuit unit 20A; when detecting a question-answer abnormality in the external control apparatus 40, the monitoring control circuit unit 30A provides abnormality notification to the external control apparatus 40 by way of the main control circuit unit 20A; the main control circuit unit 20A responds to an engine-rotation-speed decrease demand from the external control apparatus 40; however, the main control circuit unit 20A does not respond to an engine-rotation-speed increase demand and performs control of maintaining the engine rotation speed as it is.

PRIOR ART REFERENCE

Patent Document

[Patent Document 1] Japanese Patent Application Laid-Open No. 2003-161194 (FIGS. 1 and 2 and ABSTRACT OF THE DISCLOSURE)
[Patent Document 2] Japanese Patent Application Laid-Open No. 2009-129267 (FIG. 1, ABSTRACT OF THE DISCLOSURE, and Paragraphs [0016], [0017], [0027], and [0028])
[Patent Document 3] Japanese Patent Application Laid-Open No. 2009-274569 (FIG. 1 and ABSTRACT OF THE DISCLOSURE)
[Patent Document 4] Japanese Patent Application Laid-Open No. 2009-298308 (FIG. 1 and ABSTRACT OF THE DISCLOSURE)

(1) Explanation for Problems in the Prior Art

In Patent Document 1, the engine control apparatus is configured in such a way that actuator-system and sensor-system hardware abnormalities can be detected; however, when an abnormality exists in the control system, this abnormality cannot be recognized although a hardware abnormality exists or a determination of abnormality is erroneously implemented although no hardware abnormality exists; thus, there has been a problem that the abnormality detection means is one-sided. Moreover, in Patent Document 1, when due to a runaway abnormality in the sub-CPU 121, the reset signal RST2 is generated, the first abnormality storage device 133 stores this abnormality; as a result, power supply to the intake valve opening degree control motor 108 is stopped for a fixed intake valve opening degree, and the transmission ratio is set, for example, to the third-speed fixed transmission ratio for middle- or high-speed driving.

Accordingly, there has been a problem that in the case where the engine output is limited and the transmission ratio is set to the third speed for middle- or high-speed driving, it is difficult to escape from a run-off state or to drive on an uphill road. In the case where a transmission ratio fixation mechanism is designed in such a way that when the sub-CPU 121 is abnormally stopped by the second reset signal RST2, the transmission ratio is set to the first speed or the second speed for low-speed driving, the foregoing problems are solved; however, there has been a problem that when during high-speed driving, an abnormality occurs in the sub-CPU 121 and the transmission ratio moves to the first speed or the second speed, the sudden deceleration may cause a rear-end-collision accident or a car-body spinning accident.

According to foregoing Patent Document 2, the monitoring control circuit unit 30A determines whether or not an abnormality exists in the control by the main control circuit unit 20A, and in the case where an abnormality is detected, the main control circuit unit 20A is initialized and then restarted; thus, there is demonstrated a characteristic that in the case where hardware-abnormality detection based on Patent Document 1 and control-abnormality detection based on Patent Document 2 are combined, the abnormality detection means becomes many-sided. However, according to Patent Document 2, when abnormal control by at least one of the valve-opening control means and the gear-shift control means continues, the main control circuit unit 20A is stopped by the reset output RST2; thus, there has been a problem that stoppage of the fuel injection control may make the saving operation infeasible.

Control abnormality includes a temporary abnormality caused by a malfunction attributed to noise or the like and a continuous abnormality caused by an abnormality in a microprocessor hardware; the continuous abnormality includes a non-runaway repeated abnormality in which repeated control operation of the microprocessor is continued and hence no watchdog-timer abnormality is caused and a runaway repeated abnormality in which the repeated control operation of the microprocessor is stopped and hence the watchdog-timer abnormality is caused. In the case where the control abnormality is a temporary one, the microprocessor is reset and restarted through reset processing, so that the abnormal state is cancelled and followed by the normal state. However, there has been a problem that the fuel injection control is stopped not only at a time when the runaway repeated abnormality is continuing but also at a time of the non-runaway repeated abnormality that is not as severe as the runaway abnormality.

According to foregoing Patent Document 3, even when due to an abnormality in the slave-side core 22, the automatic transmission control function is lost, the master-side core 21 can set the transmission ratio to a low-speed gear step, for example, to the second speed (refer to Paragraph [0040]); alternatively, for example, in accordance with the vehicle speed and the engine rotation speed, the transmission ratio can be determined in a simple manner (refer to Paragraph[0054]). However, in the case where an abnormality exists in the master-side core 21, even when the abnormality is related to the valve-opening control abnormality, the engine ignition control function (in the case of a gasoline engine) and the fuel injection control function may be lost; in that case, the saving operation of the vehicle cannot be implemented.

Moreover, in the case where due to an abnormality in the master-side core 21 at a time of high-speed driving, the throttle valve is suddenly fixed and the transmission ratio is changed to the second speed, i.e., a low-speed step, the engine brake abruptly works and hence a rear-end-collision accident or a spinning accident may happen. There has been a problem that in the case where when the transmission ratio has been set in such a way as to mechanically move to a fixed middle- or high-speed ratio, for example, to the third speed, power supply to the transmission is stopped in order to prevent the foregoing troubles, high-load saving operation such as low-speed slope climbing or escaping from a run-off becomes difficult.

According to foregoing Patent Document 4, in the case where an abnormality in the main control circuit unit 20A detected by the monitoring control circuit unit 30A is a temporary one caused by a malfunction attributed to noise, the reset output RST2 can initialize and restart the main control circuit unit 20A so that the normal state can be recovered. In the case where in the valve-opening control, an abnormality occurs in input- or output-hardware, saving operation based on a fixed intake valve opening degree may be implemented; however, there has been a problem that in the case where a continuous runaway repeated abnormality or non-runaway repeated abnormality occurs, the main control circuit unit 20A is stopped, the fuel injection control cannot be implemented, and the abnormality monitoring of the external control apparatus 40 cannot be implemented.

SUMMARY OF THE INVENTION

(2) Objective of the Present Invention

The objective of the present invention is to provide a vehicle engine control system that has a first CPU, for controlling an engine, that includes at least a fuel injection control function and a valve opening degree control means for an intake valve and a second CPU, for controlling a transmission, that includes at least a gear-shift control function, and respective monitoring control circuit units and monitoring control means for the foregoing CPUs and that can perform saving operation through various means when a control abnormality occurs.

Another objective of the present invention is to provide a vehicle engine control system that prevents the occurrence of a control abnormality related to the valve-opening control from providing an effect to the fuel injection control so that the saving operation function is maintained.

In a vehicle electronic control apparatus according to the first invention, a first CPU and a second CPU that are microprocessors provided in an engine control circuit unit and a transmission control circuit unit, respectively, collaborate with each other, and the first CPU and the second CPU are mounted on a common circuit board and are contained in a common case or the first CPU and the second CPU are separately mounted on a first circuit board contained in a first case and on a second circuit board contained in a second case, respectively. The vehicle electronic control apparatus according to the first invention is characterized in that a first monitoring control circuit unit including at least a first watchdog timer is connected with the first CPU; in that the first CPU operates with opening/closing signals or analogue signals, as input signals, to be obtained from a first input-sensor group dedicated to engine control and a third input-sensor group utilized commonly in the engine control and transmission control, and generates at least a fuel injection control output for a fuel-injection electromagnetic valve and a valve-opening control output for an intake valve opening degree control motor for an intake valve provided in an intake throttle; in that a valve-opening drive mechanism of the intake valve includes an initial-position returning mechanism that can perform saving operation based on a fixed intake valve opening degree when power supply to the intake valve opening degree control motor is stopped; in that the operation of the second CPU is monitored by a runaway monitoring means included in a second monitoring control means or a second watchdog timer included in a second monitoring control circuit unit, and the runaway monitoring means is a means in which the first CPU monitors a watchdog signal to be generated by the second CPU; in that a transmission to be controlled by the second CPU includes a transmission ratio fixation mechanism that makes it possible to travel at least forward at a fixed transmission ratio suitable for middle- or high-speed driving when the second CPU stops its operation; in that the first watchdog timer measures the ON-time width and the OFF-time width of a first pulse train signal generated by the first CPU, and generates a first reset signal so as to initialize and restart the first CPU, when the pulse width becomes the same as or longer than the first threshold-value time; in that the first monitoring control circuit unit is provided with a first control abnormality determination circuit including a communication abnormality determination circuit and a question-answer abnormality determination circuit, a mode selection first circuit, and a first gate circuit; in that the first control abnormality determination circuit has a correct answer information data memory for transmission question data, sequentially transmits a plurality of question information pieces related to at least a valve-opening control output creation program to the first CPU in driving operation, receives from the first CPU answer information corresponding to the question information, and then compares the answer information with correct answer information preliminarily stored in the first monitoring control circuit unit, and the first control abnormality determination circuit determines whether or not a code check abnormality and an answering-response delay exist in the answer information so as to determine whether or not a first control abnormality including a communication abnormality and a question-answer abnormality exists and then to create a first control abnormality signal; in that the mode selection first circuit has a first storage circuit that is set when a first state is established in which the occurrence count or the occurrence frequency of each of the first reset signal and the first control abnormality signal becomes the same as or larger than a predetermined threshold value, a first cutoff circuit that stops power supply to the intake valve opening degree control motor when the first storage circuit stores the occurrence of an abnormality, and a reset circuit that preliminarily initializes the first storage circuit when the power switch for starting power supply to the first CPU is closed; and in that the first gate circuit resets the first CPU through the first reset signal and the first control abnormality signal when the first state has not been established, and after the first storage circuit has stored the occurrence of an abnormality, the first gate circuit prohibits the first control abnormality signal from performing reset processing of the first CPU so that a continuous non-runaway repeated abnormality related to valve-opening control is suppressed from providing an effect to fuel injection control.

In a vehicle electronic control apparatus according to the second invention, a first CPU and a second CPU that are microprocessors provided in an engine control circuit unit and a transmission control circuit unit, respectively, collaborate with each other, and the first CPU and the second CPU are collectively mounted on a common circuit board contained in a common case. The vehicle electronic control apparatus according to the first invention is characterized in that a first monitoring control circuit unit including at least a first watchdog timer is connected with the first CPU; in that the first CPU operates with opening/closing signals or analogue signals, as input signals, to be obtained from a first input-sensor group dedicated to engine control and a third input-sensor group utilized commonly in the engine control and transmission control, and generates at least a fuel injection control output for a fuel-injection electromagnetic valve and a valve-opening control output for an intake valve opening degree control motor for an intake valve provided in an intake throttle; in that a valve-opening drive mechanism of the intake valve includes an initial-position returning mechanism that can perform saving operation based on a fixed intake valve opening degree when power supply to the intake valve opening degree control motor is stopped; in that a second monitoring control circuit unit including at least a second watchdog timer is connected with the second CPU; in which the operation of the second CPU is monitored by a runaway monitoring means included in a second monitoring control means, and the runaway monitoring means is a means in which the first CPU monitors a watchdog signal to be generated by the second CPU; in that a transmission to be controlled by the second CPU includes a transmission ratio fixation mechanism that makes it possible to travel at least forward at a fixed transmission ratio suitable for middle- or high-speed driving when the second CPU stops its operation; in that the first watchdog timer measures the ON-time width and the OFF-time width of a first pulse train signal generated by the first CPU, and generates a first reset signal so as to initialize and restart the first CPU, when the pulse width becomes the same as or longer than the first threshold-value time; in that the first monitoring control circuit unit is provided with a first control abnormality determination circuit including a communication abnormality determination circuit and a question-answer abnormality determination circuit, a mode selection first circuit, and a first gate circuit; in that the first control abnormality determination circuit has a correct answer information data memory for transmission question data, sequentially transmits a plurality of question information pieces related to at least a valve-opening control output creation program to the first CPU in driving operation, receives from the first CPU answer information corresponding to the question information, and then compares the answer information with correct answer information preliminarily stored in the first monitoring control circuit unit, and the first control abnormality determination circuit determines whether or not a code check abnormality and an answering-response delay exist in the answer information so as to determine whether or not a first control abnormality including a communication abnormality and a question-answer abnormality exists and then to create a first control abnormality signal; in that the mode selection first circuit has a first storage circuit that is set when a first state is established in which the occurrence count or the occurrence frequency of each of the first reset signal and the first control abnormality signal becomes the same as or larger than a predetermined threshold value, a first cutoff circuit that stops power supply to the intake valve opening degree control motor when the first storage circuit stores the occurrence of an abnormality, and a reset circuit that preliminarily initializes the first storage circuit when the power switch for starting power supply to the first CPU is closed; and in that the first gate circuit resets the first CPU through the first reset signal and the first control abnormality signal when the first state has not been established, and after the first storage circuit has stored the occurrence of an abnormality, the first gate circuit prohibits the first control abnormality signal from performing reset processing of the first CPU so that a continuous non-runaway repeated abnormality related to valve-opening control is suppressed from providing an effect to fuel injection control.

In a vehicle electronic control apparatus according to the third invention, a first CPU and a second CPU that are microprocessors provided in an engine control circuit unit and a transmission control circuit unit, respectively, collaborate with each other, and the first CPU and the second CPU are separately mounted on a first circuit board contained in a first case and on a second circuit board contained in a second case, respectively. The vehicle electronic control apparatus according to the first invention is characterized in that the first CPU is configured with a higher-hierarchy first CPU connected with a first monitoring control circuit unit including at least a first watchdog timer and a lower-hierarchy first CPU whose operation state is monitored by a first monitoring control means configured with the higher-hierarchy first CPU; in that the higher-hierarchy first CPU and the lower-hierarchy first CPU each operate with opening/closings signal or analogue signals, as input signals, to be obtained from a first input-sensor group dedicated to engine control and a third input-sensor group utilized commonly in the engine control and transmission control, the higher-hierarchy first CPU generates at least a fuel injection control output for a fuel-injection electromagnetic valve, and the lower-hierarchy first CPU generates a valve-opening control output for an intake valve opening degree control motor for an intake valve provided in an intake throttle; in that a valve-opening drive mechanism of the intake valve includes an initial-position returning mechanism that can perform saving operation based on a fixed intake valve opening degree when power supply to the intake valve opening degree control motor is stopped; in that a second monitoring control circuit unit including at least a second watchdog timer is connected with the second CPU; in that a transmission to be controlled by the second CPU includes a transmission ratio fixation mechanism that makes it possible to travel at least forward at a fixed transmission ratio suitable for middle- or high-speed driving when the second CPU stops its operation; in that the first watchdog timer measures the ON-time width and the OFF-time width of a first pulse train signal generated by the higher-hierarchy first CPU, and generates a first reset signal so as to initialize and restart the higher-hierarchy first CPU, when the pulse width becomes the same as or longer a first threshold-value time; in that the first monitoring control means measures the ON-time width and the OFF-time width of a third pulse train signal generated by the lower-hierarchy first CPU, and generates a third reset signal so as to initialize and restart the lower-hierarchy first CPU, when the pulse width becomes the same as or longer than a third threshold-value time; in that the first monitoring control means is provided with a third control abnormality determination means including a communication abnormality determination means and a question-answer abnormality determination means, a mode selection third circuit, and a monitoring control stopping means; in that the third control abnormality determination means has a correct answer information data memory for transmission question data, sequentially transmits a plurality of question information pieces related to a valve-opening control output creation program to the lower-hierarchy first CPU in driving operation, receives from the lower-hierarchy first CPU answer information corresponding to the question information, and then compares the answer information with correct answer information preliminarily stored in the first monitoring control means, and the third control abnormality determination means determines whether or not a code check abnormality and an answering-response delay exist in the answer information so as to determine whether or not a control abnormality including a communication abnormality and a question-answer abnormality exists and then to create a third control abnormality signal; in that the mode selection third circuit has a first storage circuit that is set when a first state is established in which the occurrence count or the occurrence frequency of each of the third reset signal and the third control abnormality signal becomes the same as or larger than a predetermined threshold value, a first cutoff circuit that stops power supply to the intake valve opening degree control motor when the first storage circuit stores the occurrence of an abnormality, and a reset circuit that preliminarily initializes the first storage circuit when the power switch for starting power supply to the first CPU is closed; and in that the monitoring control stopping means resets the lower-hierarchy first CPU through the third reset signal and the third control abnormality signal when the first state has not been established, and after the first storage circuit has stored the occurrence of an abnormality, the monitoring control stopping means stops the first monitoring control means from being implemented and hence reduces the control load on the higher-hierarchy first CPU so that the function of the first CPU is divided and hence a sporadic or continuous abnormality related to the valve-opening control is prevented from providing an effect to fuel injection control.

As described above, the vehicle electronic control apparatus according to the first invention is configured with the first CPU that performs engine control and the second CPU that performs transmission control; when the first state is established in which the occurrence count or the occurrence frequency of each of the first reset signal generated by the first watchdog timer and the first control abnormality signal generated by the first control abnormality determination means becomes the same as or larger than a predetermined threshold value, the first storage circuit stores the occurrence of an abnormality and stops power supply to the intake valve opening degree control motor so as to set the valve-opening degree to a fixed intake valve opening degree; until the first storage circuit stores the occurrence of an abnormality, the first reset signal and the first control abnormality signal implements reset processing of the first CPU; after the first storage circuit has stored the occurrence of an abnormality, the first reset signal continues the reset processing of the first CPU; however, the first control abnormality signal is prohibited from implementing the reset processing of the first CPU.

Accordingly, abnormality monitoring by the first watchdog timer on a sporadic abnormality or a continuous abnormality in the first CPU and initialization/restarting processing based on the abnormality monitoring are always effective; in the case where after the driving is started, the occurrence count or the occurrence frequency of an abnormality is smaller than a predetermined value, the first control abnormality signal generated by the first control abnormality determination means, related to the valve-opening control for the intake valve, initializes and restarts the first CPU so as to perform recovery processing for the sporadic abnormality, so that the fuel injection control and the valve-opening control can normally be implemented; in the case where the occurrence of an abnormality continues, the recovery processing is stopped and hence the first CPU is not reset for a non-runaway repeated abnormality that is a continuous abnormality but does not cause any run-away abnormality in the first CPU. As a result, there is demonstrated an effect that although the valve-opening control by the first CPU cannot be implemented, the fuel injection control can be implemented so that saving operation based on the fixed intake valve opening degree becomes effective.

When a run-away abnormality in the first CPU occurs, the first watchdog timer performs initialization and restarting; therefore, in the case where the run-away abnormality is contingent and sporadic, at least the fuel injection control can be restored to the normal state.

Moreover, the vehicle electronic control apparatus according to the second invention is configured in such a manner as described above; therefore, there is demonstrated an effect that saving operation can be implemented through various means.

Furthermore, the vehicle electronic control apparatus according to the third invention is configured in such a manner as described above; therefore, there is demonstrated an effect that it is made possible that the occurrence of an abnormality related to valve-opening control does not provide any effect to fuel injection control so that the saving operation function is not impaired.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

(1) Detailed Description of Configuration

Figure 1A:
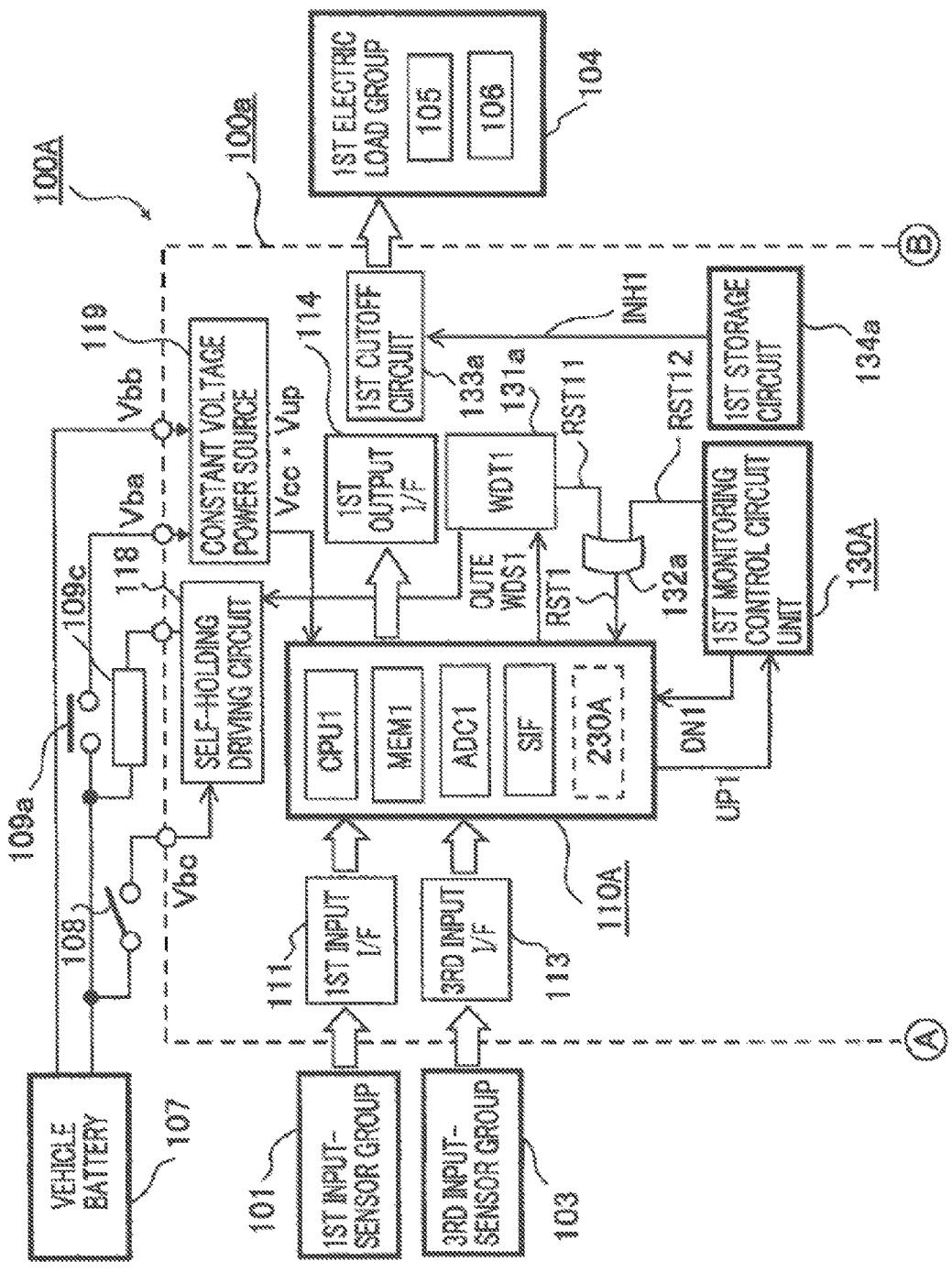
FIGS. 1A and 1B are block diagram illustrating the overall configuration of a vehicle electronic control apparatus according to Embodiment 1 of the present invention.
Figure 1B:
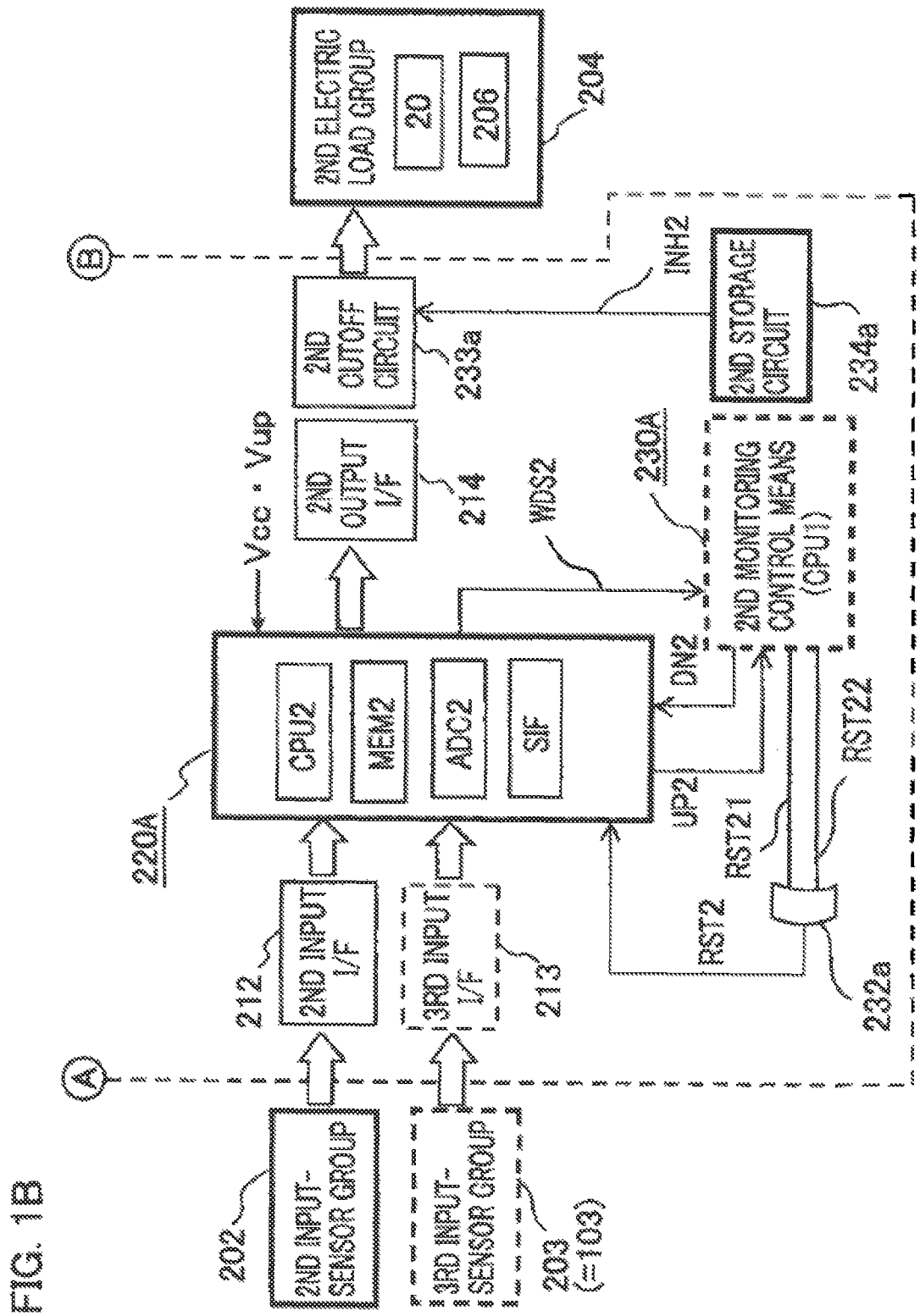

Hereinafter, there will be explained a vehicle electronic control apparatus according to Embodiment 1 of the present invention. FIGS. 1A and 1B are block diagram representing the overall configuration of a vehicle electronic control apparatus according to Embodiment 1 of the present invention. In FIGS. 1A and 1B, a vehicle electronic control apparatus 100A includes an engine control circuit unit 110A and a transmission control circuit unit 220A that are incorporated in a common case 100a; the vehicle electronic control apparatus 100A is provided with a constant voltage power source 119 that is supplied with an electric power by way of a main power source terminal Vba, which is connected with a vehicle battery 107 by way of an output device 109a of a power supply relay 109c to be energized byway of a self-holding circuit 118 when a power switch 108 connected with a command power source terminal Vbc is closed, and an auxiliary power source terminal Vbb directly connected with the vehicle battery 107; the vehicle electronic control apparatus 100A is activated when a stabilized control voltage Vcc to be generated by the constant voltage power source 119 and a back-up voltage Vup for retaining the storage contents of a RAM are supplied thereto.

A first input-sensor group 101 includes various kinds of sensors inherent to engine control such as a crank angle sensor for detecting the rotation angle and the rotation speed of an engine, an air flow sensor for measuring the intake amount of air that passes through a throttle intake valve, a throttle position sensor for detecting the intake valve opening degree, and a gas sensor for detecting the oxygen concentration in an exhaust-gas sensor. A third input-sensor group 103 includes various kinds of sensors to be utilized in both engine control and transmission control such as a vehicle speed sensor, an accelerator position sensor for detecting the step-on degree of an accelerator pedal, and a gearshift sensor for detecting the selection position of a gearshift lever.

A second input-sensor group 202 includes various kinds of sensors inherent to transmission control such as an oil temperature sensor or an oil pressure sensor in a transmission. A third input-sensor group 203 is the same as the third input-sensor group 103, described above. A first electric load group 104 is an engine control load to be controlled in response to the respective operation states of the first and third input-sensor groups 101 and 103 and includes at least a fuel-injection electromagnetic valve 105 and an intake valve opening degree control motor 106 that are disposed for each cylinder; in the case where the control subject is an gasoline engine, the first electric load group 104 further includes an ignition plug disposed for each cylinder.

In addition, there is provided a fail-safe mechanism for compulsory and mechanical resetting so that when power supply to the intake valve opening degree control motor 106 is stopped, the opening degree is set to the fixed intake valve opening degree at which a rotation speed higher than the idling rotation speed can be obtained. A second electric load group 204 is a transmission control load to be controlled in response to the respective operation states of the second and third input-sensor groups 202 and 203 (103) and includes at least a selection electromagnetic valve 205 for selecting forward or backward movement and a gear-shifting electromagnet valve 206 for changing the transmission ratio continuously or in a multi-step manner. In addition, when power supply to the gear-shifting electromagnet valve 206 is stopped, a middle- or high-speed driving transmission ratio higher than the middle transmission ratio in the gear-shift range can be obtained.

The engine control circuit unit 110A, which is an integrated circuit device and includes mainly a first CPU (although in FIGS. 1A and 1B, illustrated as a reference character "CPU1", the first CPU is described simply as the first CPU in the following explanation for the sake of avoiding the complexity and the reference character "CPU1" will be omitted), which is a microprocessor, is configured with a first memory MEM1 including a nonvolatile program memory, which is, for example, a flash memory, a data memory, which is part of the region of the program memory or another nonvolatile memory that can electrically perform reading and writing, and a volatile RAM, a multi-channel A/D converter ADC1, and a communication interface circuit SIF.

The engine control circuit unit 110A is connected with the first input-sensor group 101 by way of a first input interface circuit 111 and with the third input-sensor group 103 by way of a third input interface circuit 113. The engine control circuit unit 110A is connected with the first electric load group 104 by way of a first output interface circuit 114. A first watchdog timer 131a measures the pulse width of a first pulse train signal WDS1 generated by the first CPU; when the pulse width becomes the same as or longer than a first threshold-value time, the first watchdog timer 131a generates a first reset signal RST11 so as to initialize and restart the first CPU.

When the power switch 108 is closed, the self-holding circuit 118 energizes the power supply relay 109c; however, in the case where the first CPU is once activated and the first watchdog timer 131a generates an output permission signal OUTE, the power supply is continued by the operation of the self-holding circuit 118 even when the power switch 108 is opened. Accordingly, after the power switch 108 is opened, the first CPU and an after-mentioned second CPU stop the operation thereof, and the respective CPUs perform saving storage of learning information and the like; then, the first CPU stops the first pulse train signal WDS1, so that the power supply relay 109c is de-energized. While performing serial communication with the first CPU through a downstream signal DN1 and an upstream signal UP1, a first monitoring control circuit unit 130A, described later in FIGS. 2A and 2B, determines whether or not the first CPU normally is performing its control operation; in the case where a control abnormality is detected, the first monitoring control circuit unit 130A generates a control first reset signal RST12 so as to reset the first CPU.

When any one of the first reset signal RST11 and the control first reset signal RST12 is generated, a first logical sum circuit 132a generates a composite first reset signal RST1 so as to reset the first CPU. When the count or the frequency of abnormalities detected by the first monitoring control circuit unit 130A exceeds a predetermined threshold value, a first storage circuit 134a stores the count or the frequency and supplies a first cutoff signal INH1 to a first cutoff circuit 133a; the first cutoff circuit 133a stops supply of the electric power, out of the whole electric power for the output interface circuit 114, that is for the intake valve opening degree control motor 106. The first cutoff circuit 133a may be provided between the first CPU and the first output interface circuit 114; alternatively, in the case where the intake valve opening degree control motor 106 has a dedicated load power source relay, the first cutoff circuit 133a may be provided for the driving circuit of the power source relay.

The engine control circuit unit 220A, which is an integrated circuit device and includes mainly a second CPU (although in FIGS. 1A and 1B, illustrated as a reference character "CPU2", the second CPU is described simply as the second CPU in the following explanation for the sake of avoiding the complexity and the reference character "CPU2" will be omitted), which is a microprocessor, is configured with a second memory MEM2 including a nonvolatile program memory, which is, for example, a flash memory, a data memory, which is part of the region of the program memory or another nonvolatile memory that can electrically perform reading and writing, and a volatile RAM, a multi-channel A/D converter ADC2, and the communication interface circuit SIF.

The transmission control circuit unit 220A is connected with the second input-sensor group 202 by way of a second input interface circuit 212 and with the third input-sensor group 203 by way of a third input interface circuit 213. In this regard, however, in the case of this connection mode, it is only necessary to remove the third input interface circuit 213 and input the output signal of the third input interface circuit 113 for the first CPU. The engine control circuit unit 220A is connected with the second electric load group 204 by way of a second output interface circuit 214.

Figure 3A:
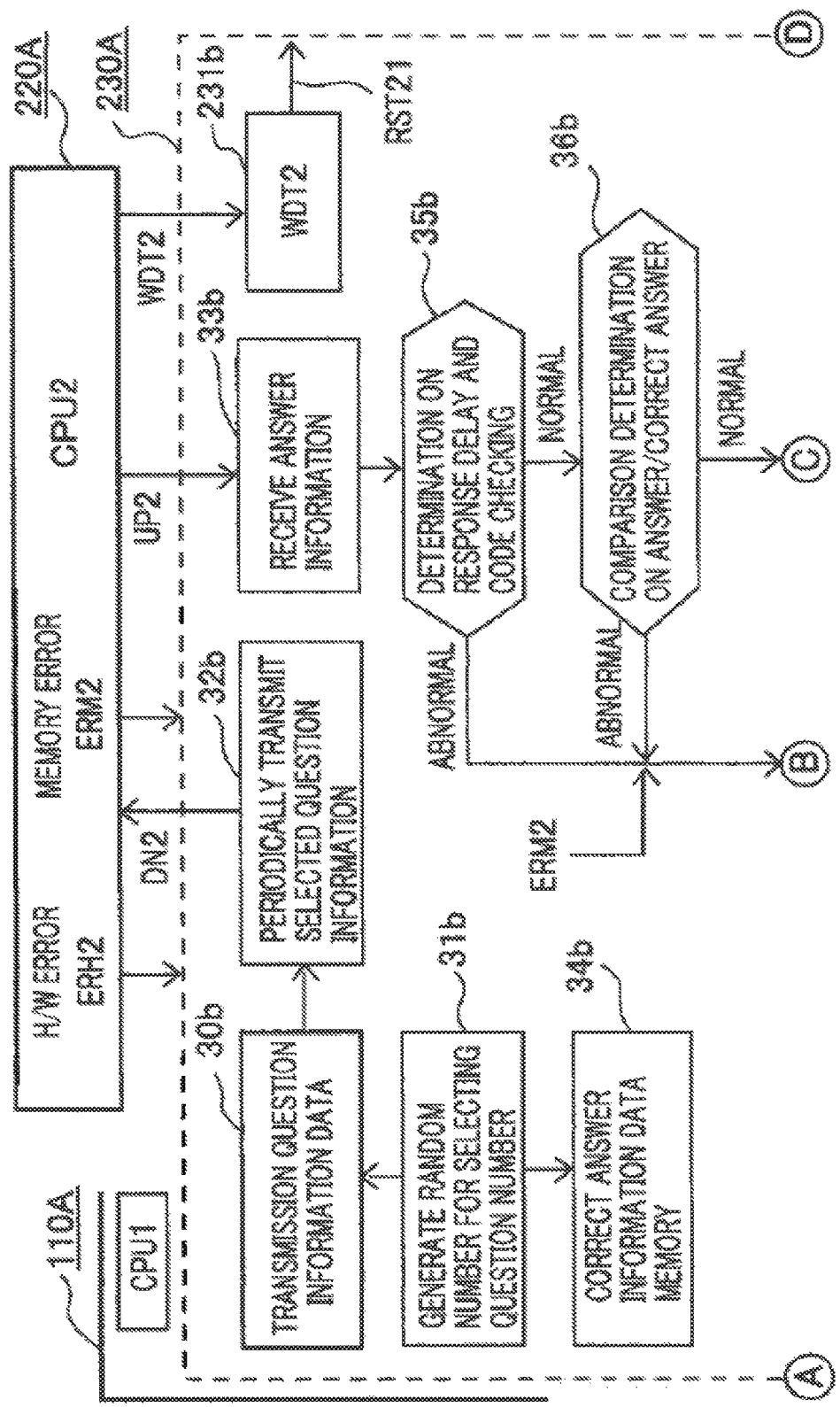
FIGS. 3A and 3B are block diagram illustrating the configuration of a second monitoring control means in the vehicle electronic control apparatus according to Embodiment 1 of the present invention.
Figure 3B:
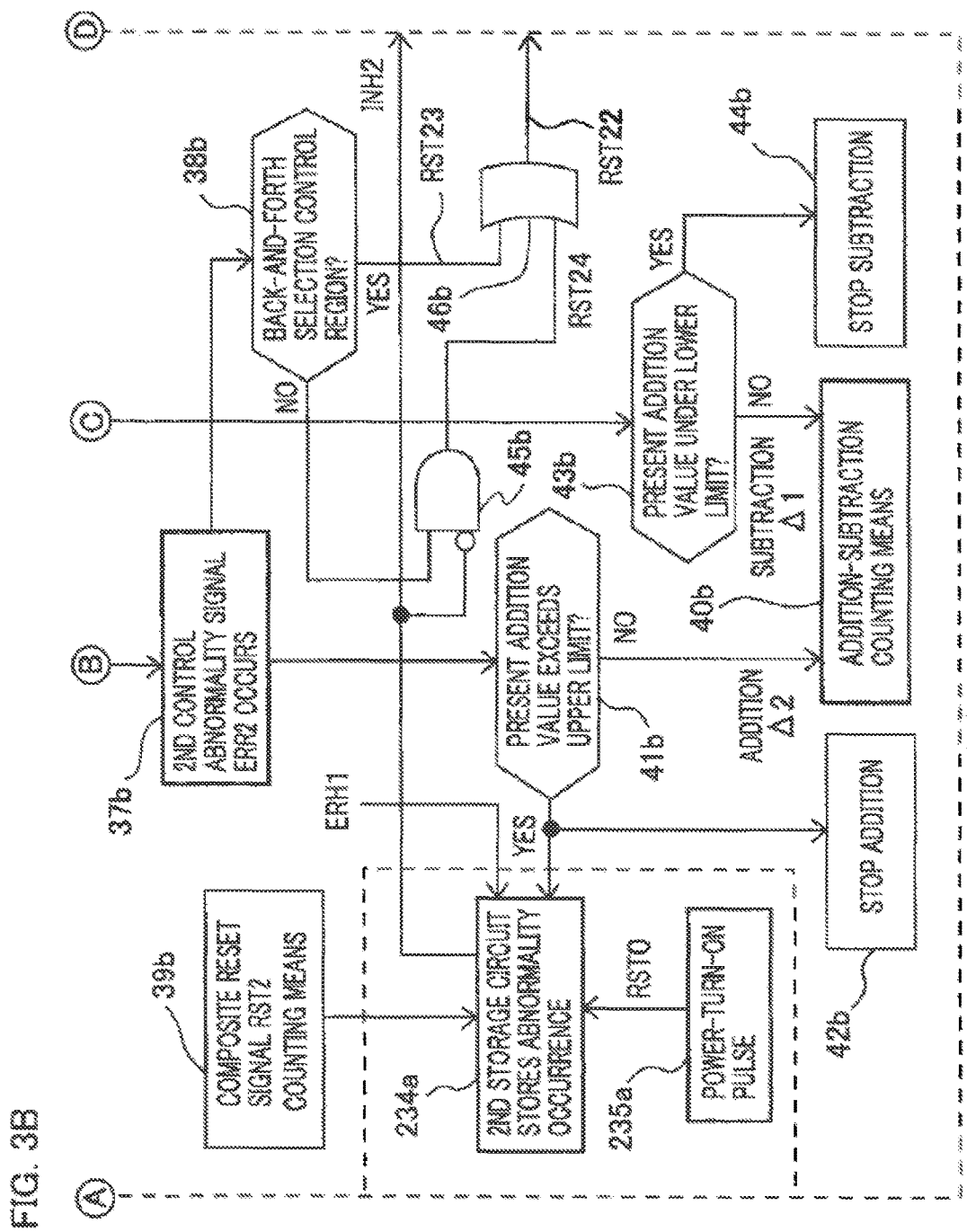

A second monitoring control means 230A, described later in FIGS. 3A and 3B, is formed of software to be implemented by the first CPU; while a first CPU including the second monitoring control means 230A and the second CPU perform serial communication through a downstream signal DN2 and an upstream signal UP2, the second monitoring control means 230A determines whether or not the second CPU normally performing its control operation; in the case where a control abnormality is detected, the second monitoring control means 230A generates a control second reset signal RST22 so as to reset the second CPU.

The second monitoring control means 230A is provided with a runaway monitoring means 231b corresponding to a second watchdog timer; the runaway monitoring means 231b measures the pulse width of a second pulse train signal WDS2 generated by the second CPU; when the pulse width becomes the same as or longer than a second threshold-value time, the runaway monitoring means 231b generates a second reset signal RST21 so as to initialize and restart the second CPU.

When any one of the second reset signal RST21 and the control second reset signal RST22 is generated, a second logical sum circuit 232a generates a composite second reset signal RST2 so as to reset the second CPU. When the count or the frequency of abnormalities detected by the second monitoring control means 230A exceeds a predetermined threshold value, a second storage circuit 234a stores the count or the frequency and supplies a second cutoff signal INH2 to a second cutoff circuit 233a; the second cutoff circuit 233a stops supply of the electric power, out of the whole electric power for the output interface circuit 214, that is for the gear-shifting electromagnet valve 206.

The second cutoff circuit 233a may be provided between the second CPU and the second output interface circuit 214; alternatively, in the case where a plurality of gear-shifting electromagnet valves 206 have a common load power source relay, the second cutoff circuit 233a may be provided for the driving circuit of the power source relay.

Figure 2A:
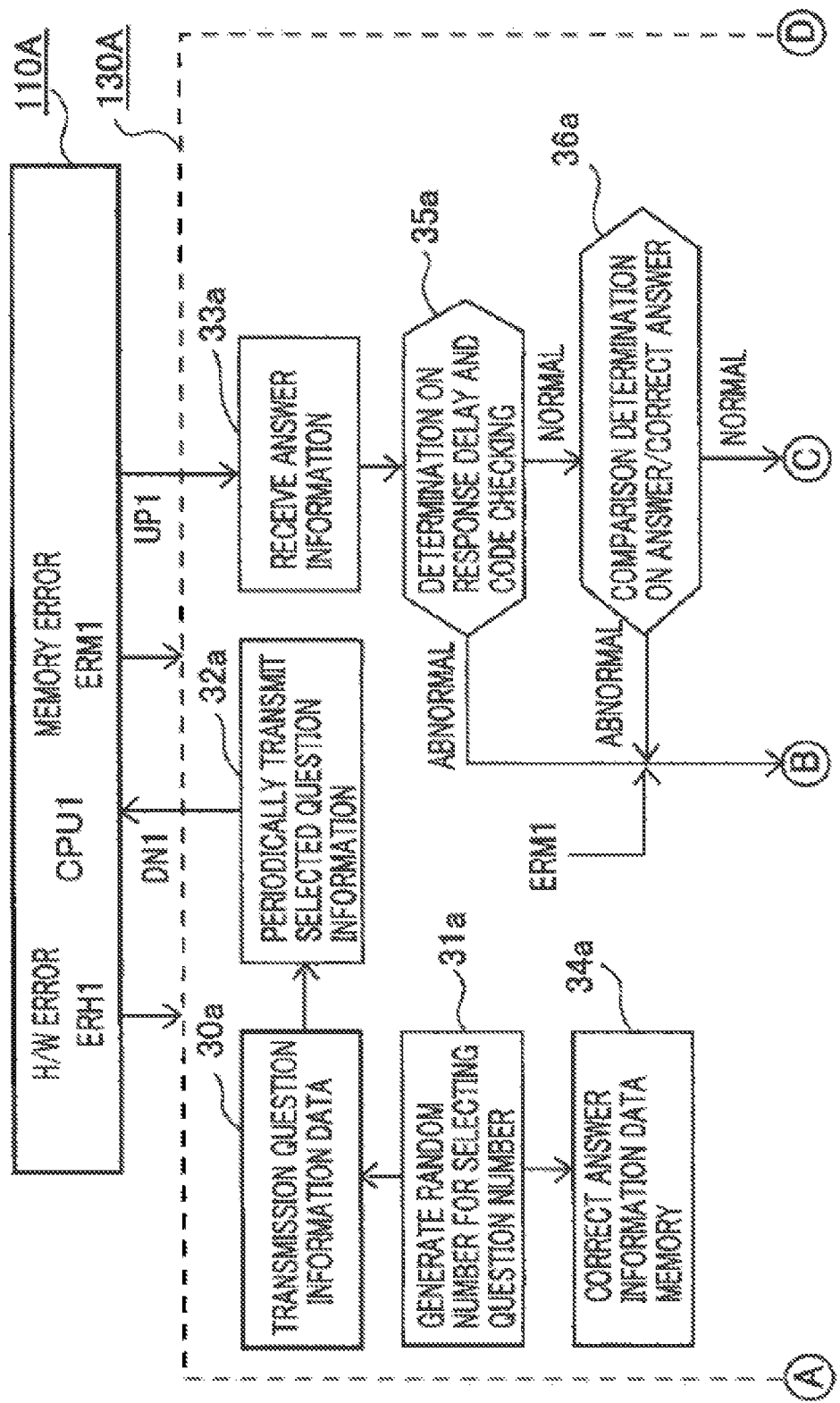
FIGS. 2A and 2B are block diagram illustrating the configuration of a first monitoring control circuit unit in the vehicle electronic control apparatus according to Embodiment 1 of the present invention.
Figure 2B:
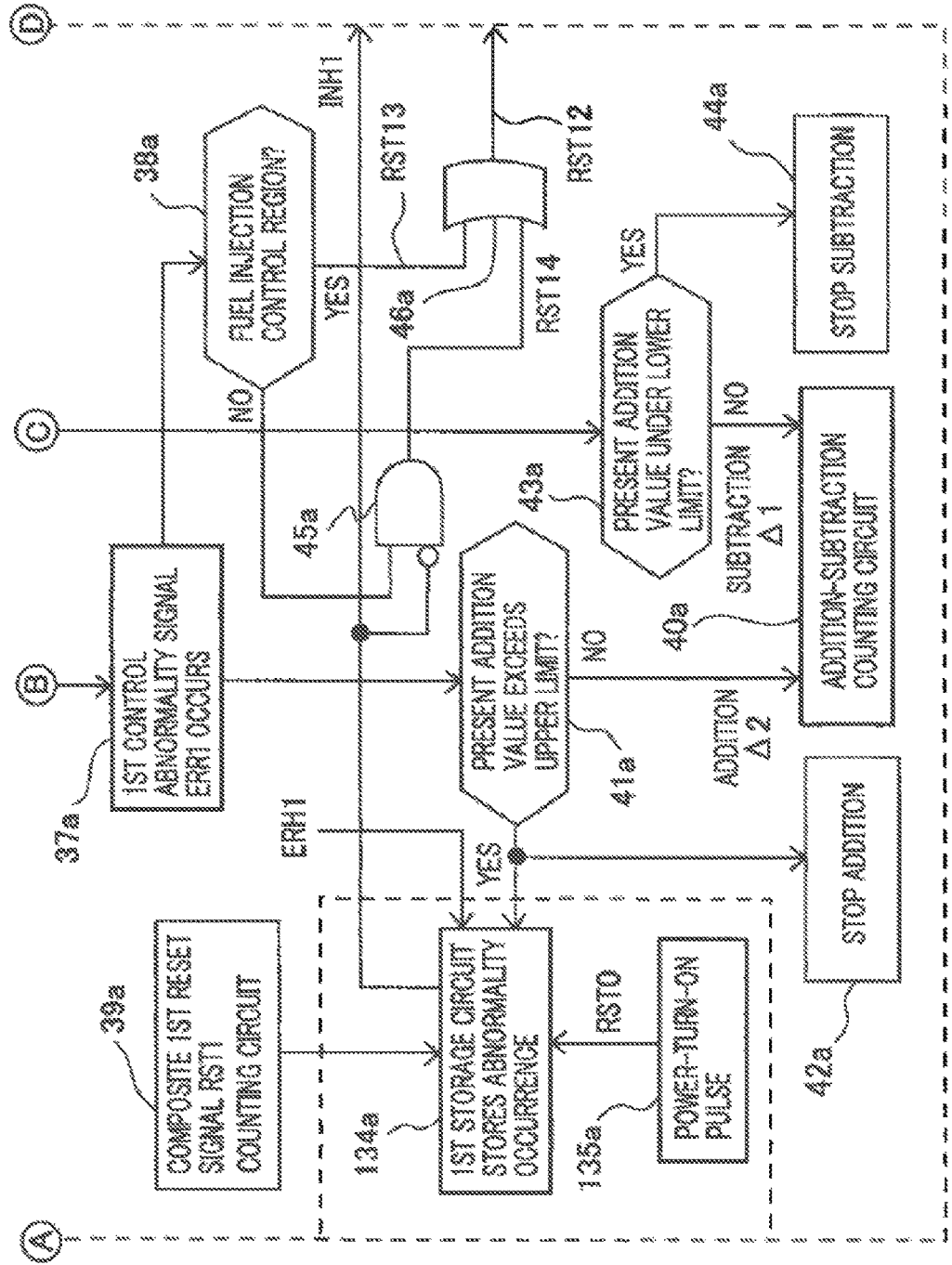

Next, the configuration of the first monitoring control circuit unit 130A will be explained. FIGS. 2A and 2B are block diagram illustrating the configuration of the first monitoring control circuit unit in the vehicle electronic control apparatus according to Embodiment 1 of the present invention. In FIGS. 2A and 2B, for example, any one of question numbers (Qi=0 to 127) is temporarily stored in transmission question data 30a; the number value of the question number Qi is periodically updated by a pseudorandom number generation circuit 31a.

The question numbers Qi are divided into groups in accordance with a fuel injection control region or a valve-opening control region. A correct answer information data memory 34a is a data table that stores numerical data Ri that changes in accordance with the question number Qi; the numerical date Ri designated by the pseudorandom number generation circuit 31a is the correct answer data corresponding to expected answer data Ai. A serialization transmission circuit 32a periodically repeats twice or more times the question number Qi stored in the transmission data 30a so as to transmit the question number Qi as a first monitoring downstream signal DN1 to the first CPU. A parallelization reception circuit 33a receives answer data Ai, as a first monitoring upstream signal UP1, obtained from the first CPU and then converts the answer data Ai into parallel data to be stored in the first monitoring control circuit unit 130A.

A communication abnormality determination circuit 35a determines whether or not the response time of the answer data Ai obtained from the parallelization reception circuit 33a is the same as or longer than a predetermined threshold value time from the time when the first question number Qi has been transmitted and whether or not there exists a code check error. A question-answer abnormality determination circuit 36a determines whether or not normal answer data Ai obtained from the communication abnormality determination circuit 35a coincides with the correct data Ri, in the correct answer information data memory 34a, that corresponds to the present question number Qi.

Each of the communication abnormality determination circuit 35a and the question-answer abnormality determination circuit 36a functions as a first control abnormality determination circuit; when at least one of them determines that an abnormality exists, a first control abnormality signal generation circuit 37a generates a first control abnormality signal ERR1. A region determination circuit 38a determines whether or not the determination subject of the present question-answer abnormality determination is related to the fuel injection control; in the case where the abnormality has occurred within the fuel injection control region, the region determination circuit 38a generates a continuity first reset signal RST13 so as to reset the first CPU by way of a logical sum circuit 46a and the first logical sum circuit 132a (refer to FIGS. 1A and 1B).

In the case where the determination subject of the present question-answer abnormality determination is not related to the fuel injection control, the region determination circuit 38a generates a selection first reset signal RST14 so as to reset the first CPU byway of the logical sum circuit 46a and the first logical sum circuit 132a. In this regard, however, the selection first reset signal RST14 is generated by way of a first gate circuit 45a, described later. A reset signal counting circuit 39a counts the number of occurrence instances of a composite reset signal RST1 (the first reset signal RST11 and the control first reset signal RST12); when the count becomes the same as or larger than a predetermined threshold value count, the reset signal counting circuit 39*a* set-drives the first storage circuit 134*a*. The first storage circuit 134*a* is set-driven also when a first hardware abnormality ERH1 related to a wire-breaking or short-circuit abnormality in an accelerator position sensor or a throttle position sensor that is self-checked by the first CPU or related to a wire-breaking or short-circuit abnormality in the intake valve opening degree control motor 106 is detected.

When the first storage circuit 134*a* stores an abnormality, the first gate circuit 45*a* is activated; thus, the first control abnormality signal ERR1 that is generated in a region other than the fuel injection control region is prohibited from resetting the first CPU. The first storage circuit 134*a* is reset by a reset circuit 135*a* that generates a power-supply turned-on reset pulse RST0 when the power switch 108 is turned on. An addition-subtraction counting circuit 40*a* includes a present-value register; when a subtraction command is given to the present value register, the addition-subtraction counting circuit 40*a* subtract, for example, 1 as a subtraction variation value Δ1 from the present value; when an addition command is given to the present value register, the addition-subtraction counting circuit 40*a* adds, for example, 3 as an addition variation value Δ2 to the present value. However, the value of the present value register is limited to an upper limit value, for example, 13 and to a lower limit value, for example, 0; no addition-subtraction operation exceeding the limitation range is implemented.

The addition command or the subtraction command is issued to the addition-subtraction counting circuit 40*a* each time the pseudorandom number generation circuit 31*a* periodically updates the question number Qi; when the first control abnormality signal ERR1 is generated, the addition variation value 3 is added; when the first control abnormality signal ERR1 is not generated, the subtraction variation value 1 is subtracted.

However, an addition upper limit determination circuit 41*a* and an addition stoppage circuit 42*a* determine whether or not the present value in the addition-subtraction counting circuit 40*a* has reached the upper limit value, for example, 13; in the case where the present value in the addition-subtraction counting circuit 40*a* has already reached the upper limit value, the addition command is stopped even when the first control abnormality signal ERR1 has been generated, and in the case where the addition result exceeds the upper limit value 13, the present value is limited not to be the same as or larger 13. A subtraction lower limit determination circuit 43*a* and a subtraction stoppage circuit 44*a* determine whether or not the present value in the addition-subtraction counting circuit 40*a* has reached the lower limit value, for example, 0; in the case where the present value in the addition-subtraction counting circuit 40*a* has already reached the lower limit value, the subtraction command is stopped even when the first control abnormality signal ERR1 has not been generated (i.e., even when normality is secured), the subtraction command is stopped so that the subtraction result is limited not to be smaller than 0. When the power switch 108 is turned on, the present value in the addition-subtraction counting circuit 40*a* has been cleared, for example, to 0.

When the present value in the addition-subtraction counting circuit 40*a* reaches the upper limit value, the first storage circuit 134*a* stores an abnormality occurrence state; the first cutoff circuit 133*a* stops power supply to the intake valve opening degree control motor 106; the first gate circuit 45*a* prohibits the first control abnormality signal ERR1 that is generated in a region other than the fuel injection control region from resetting the first CPU. A first memory error ERM1, which is one of the self-check means of the first CPU, is treated as is the case with the first control abnormality signal ERR1; the first memory error ERM1 is counted by the addition-subtraction counting circuit 40*a* and the region determination circuit 38*a* determines whether or not the first memory error ERM1 is within the fuel injection control region; then, depending on the result of the determination, the first gate circuit 45*a* performs selection processing.

Next, the configuration of the second monitoring control means 230A will be explained. FIGS. 3A and 3B are block diagram illustrating the configuration of the second monitoring control circuit unit in the vehicle electronic control apparatus according to Embodiment 1 of the present invention. In the explanation below, there will be mainly described the different from the first monitoring control circuit unit 130A in FIGS. 2A and 2B, described above. The first monitoring control circuit unit 130A in FIGS. 2A and 2B have the element characters 30*a* through 46*a* formed of hardware devices; however, the second monitoring control means 230A in FIGS. 3A and 3B include element characters 30*b* through 46*b* formed mainly of software items. The constituent elements with the reference characters the same as those in include FIGS. 3A and 3B denote the same or equivalent constituent elements.

The main difference between the first monitoring control circuit unit 130A and the second monitoring control means 230A is the fact that although the first monitoring control circuit unit 130A resets the first CPU in collaboration with the first watchdog timer 131*a* and stops the drive of the intake valve opening degree control motor 106 by way of the first storage circuit 134*a* and the first cutoff circuit 133*a*, the second monitoring control means 230A resets the second CPU in collaboration with the runaway monitoring means 231*b*, which corresponds to the second watchdog timer, and stops the drive of the gear-shifting electromagnet valve 206 by way of the second storage circuit 234*a* and the second cutoff circuit 233*a*.

As is the case with the first CPU, the second CPU generates a second hardware error ERH2 and a second memory error ERM2 and makes the second storage circuit 234*a* stores an abnormality through the second hardware error ERH2, the second memory error ERM2, and a second control abnormality signal ERR2 generated by the second monitoring control means 230A. The region determination circuit 38*a* determines whether or not the occurrence factor of the first control abnormality signal ERR1 is within the fuel injection control region; however, the region determination means 38*b* in FIGS. 3A and 3B determine whether or not the occurrence factor of the second control abnormality signal ERR2 is within a back-and-forth selection control region.

(2) Detailed Description of Operation and Action

Next, the operation and the action of the vehicle electronic control apparatus according to Embodiment 1 of the present invention, configured as illustrated in FIGS. 1A and 1B through FIGS. 3A and 3B, will be explained in detail. At first, in FIGS. 1A and 1B, FIGS. 2A and 2B, when the power switch 108 is closed, the power supply relay 109*c* is driven by way of the self-holding circuit 118 and hence the output device 109*a* thereof is closed; thus, the vehicle battery 107 starts power supply to the main power source circuit of the constant voltage power source 119; then, the control power source Vcc is applied to the first CPU included in the engine control circuit unit 110A and the second CPU included in the transmission control circuit unit 220A so as to make them start their control operation.

The first CPU performs driving control of the first electric load group 104 in response to the operation states of the first input-sensor group 101 and the third input-sensor group 103 and the contents of the control program in the first memory MEM1; the fuel-injection electromagnetic valve 105 in the first electric load group 104 responds to a fuel injection control program; the intake valve opening degree control motor 106 responds to a valve-opening control program.

The valve-opening drive mechanism of the intake valve includes an initial-position returning mechanism that can perform saving operation based on a fixed intake valve opening degree when power supply to the intake valve opening degree control motor 106 is stopped.

The first CPU has a self-diagnosis function of detecting a wire-breaking or short-circuit abnormality in the input/output wiring leads related to the valve-opening control so as to generate a first H/W abnormality signal ERH1 and performing code checking in the memory region related to the valve-opening control so as to generate a first memory abnormality signal ERM1. The first watchdog timer 131a measures the ON-time width and the OFF-time width of the first pulse train signal WDS1 generated by the first CPU; when the time width of the first pulse train signal WDS1 becomes the same as or longer than the first threshold-value time, the first watchdog timer 131a generates the first reset signal RST11 so as to initialize and restart the first CPU; in the case where the first pulse train signal WDS1 is normal, the first watchdog timer 131a generates the output permission signal OUTE so as to maintain the driving state of the power supply relay 109c by way of the self-holding circuit 118.

As illustrated in FIGS. 2A and 2B, the first monitoring control circuit unit 130A has the correct answer information data memory 34a for the transmission question data 30a, sequentially transmits a plurality of question information pieces related to at least a valve-opening control output creation program to the first CPU in driving operation, receives from the first CPU answer information corresponding to the question information, and then compares the answer information with the correct answer information preliminarily stored in the first monitoring control circuit unit 130A; the first monitoring control circuit unit 130A also has the first gate circuit 45a and the first control abnormality determination circuit 35a/36a for determining whether or not a code check abnormality and an answering-response delay exist in the answer information so as to determine whether or not the first control abnormality including a communication abnormality and a question-answer abnormality exists and then to create the first control abnormality signal ERR1.

The first storage circuit 134a is set when a first state is established in which the occurrence count or the occurrence frequency of each of the first reset signal RST11 and the first control abnormality signal ERR1 becomes the same as or larger than a predetermined threshold value; the first storage circuit 134a is initialized by the reset circuit 135a when the power switch 108 is closed. When the first storage circuit 134a stores the occurrence of an abnormality, the first cutoff circuit 133a stops power supply to the intake valve opening degree control motor 106.

When the first storage circuit 134a has not yet stored the occurrence of an abnormality, the first gate circuit 45a resets the first CPU through the first reset signal RST11 and the first control abnormality signal ERR1; after the first storage circuit 134a has stored the occurrence of an abnormality, the first gate circuit 45a prohibits the first control abnormality signal ERR1 from performing reset processing of the first CPU so that a continuous non-runaway repeated abnormality related to the valve-opening control is suppressed from providing an effect to the fuel injection control.

The concept of a question-answer abnormality in this SPECIFICATION will specifically be explained below:

For example, it is assumed that the first CPU includes a control program of "adding an input X and an input Y so as to obtain the output Z"; in order to ascertain whether or not this program is correctly implemented, the input X is replaced by a constant A and the input Y is replaced by a constant B so that the addition result Z is answered, and then it is determined whether or not the addition result Z coincides with an expected result C.

There exist various combinations between the constant A and the constant B; the data table number thereof is designated by the question number Qi. When a question-answer abnormality occurs, the first control abnormality signal ERR1 is generated; then, the selection first reset signal RST14, the control first reset signal RST12, and the composite first reset signal RST1 are sequentially generated in that order, so that the first CPU is initialized and then restarted. As a result, in the case where the control abnormality is a temporary one caused by a malfunction attributed to noise, the normal state is restored; however, in the case where a hardware abnormality has caused the control abnormality, the same control abnormality occurs recurrently even when the first CPU is reset.

In this case, because the addition-subtraction counting circuit 40a in FIGS. 2A and 2B perform sequential addition of the addition variation value Δ2 (=3), the upper limit value 13 of the addition-subtraction counting circuit 40a is exceeded at a time when the fifth abnormality occurs; then, the first storage circuit 134a stores the occurrence of an abnormality, so that the driving of the intake valve opening degree control motor 106 is stopped by way of the first cutoff circuit 133a and the first gate circuit 45a prohibits the first control abnormality signal ERR1 from resetting the first CPU.

In the case of the addition-subtraction counting circuit 40a, when the occurrence frequency of an abnormality, including the first control abnormality signal ERR1 and the first memory error ERM1, that is related to the valve-opening control is the same as or smaller than 25% (the occurrence of an abnormality and the normal operation are sequentially repeated once and thrice, respectively), the first storage circuit 134a does not decisively store the occurrence of an abnormality; when the occurrence frequency of an abnormality is the same as or larger than 33% (the occurrence of an abnormality and the normal operation are sequentially repeated once and twice, respectively), the first storage circuit 134a decisively stores the occurrence of an abnormality.

In contrast, the composite reset signal RST1 including the first reset signal RST11 generated by the first watchdog timer 131a is simply counted by the reset signal counting circuit 39a; when the counted value reaches a predetermined threshold value, the first storage circuit 134a stores the occurrence of an abnormality. In this regard, however, the reset signal counting circuit 39a may count only the first reset signal RST11; alternatively, the occurrence frequency of an abnormality may be detected through a method utilizing an addition-subtraction counting circuit that replaces the reset signal counting circuit 39a.

In the foregoing description, a question-answer abnormality related to the valve-opening control has been explained; however, in the case where the explanation is expanded to the fuel injection control region, the first region determination circuit 38a becomes effective; in the case where the first control abnormality signal ERR1 is related to the first address region (fuel injection control region) of the first memory MEM1, the first region determination circuit 38a generates the continuity first reset signal RST13 so as to always initialize and then restart the first CPU, regardless of how large the occurrence count or the occurrence frequency is.

Next, in FIGS. 1A and 1B through FIGS. 3A and 3B, the second CPU performs driving control of the second electric load group 204 in response to the operation states of the second input-sensor group 202 and the third input-sensor group 203 (103) and the contents of the control program in the second memory MEM2; the back-and-forth selection electromagnetic valve 205 in the second electric load group 204 responds to the selection control program; the gear-shifting electromagnet valve 206 responds to the transmission control program.

The transmission to be controlled by the second CPU includes a transmission ratio fixation mechanism that makes it possible to travel at least forward at a fixed transmission ratio suitable for middle- or high-speed driving when the second CPU stops its operation. The second CPU has a self-diagnosis function of detecting a wire-breaking or short-circuit abnormality in the input/output wiring leads related to the transmission control so as to generate the second H/W abnormality signal ERH2 and performing code checking in the memory region related to the transmission control so as to generate the second memory abnormality signal ERM2.

The runaway monitoring means 231b that is formed of the second monitoring control means 230A and corresponds to the second watchdog timer measures the ON-time width and the OFF-time width of the second pulse train signal WDS2 to be generated by the second CPU; when the time width of the second pulse train signal WDS2 becomes the same as or longer than the second threshold-value time, the runaway monitoring means 231b generates the second reset signal RST21 so as to initialize and restart the second CPU; in the case where both the first and second pulse train signals WDS1 and WDS2 are normal, the runaway monitoring means 231b generates the output permission signal OUTE so as to maintain the driving state of the power supply relay 109c by way of the self-holding circuit 118.

As illustrated in FIGS. 3A and 3B, the second monitoring control means 230A has the correct answer information data memory 34b for the transmission question data 30b, sequentially transmits a plurality of question information pieces related to at least a transmission control output creation program to the second CPU in driving operation, receives from the first CPU answer information corresponding to the question information, and then compares the answer information with the correct answer information preliminarily stored in the first monitoring control circuit unit 130A; the second monitoring control circuit unit 230A also has the second gate circuit 45b and the second control abnormality determination circuits 35b and 36b for determining whether or not a code check abnormality and an answering-response delay exist in the answer information so as to determine whether or not the second control abnormality including a communication abnormality and a question-answer abnormality exists and then to create the second control abnormality signal ERR2.

The second storage circuit 234a is set when a second state is established in which the occurrence count or the occurrence frequency of each of the second reset signal RST21 and the second control abnormality signal ERR2 becomes the same as or larger than a predetermined threshold value; the second storage circuit 234a is initialized by the reset circuit 235a when the power switch 108 is closed.

When the second storage circuit 234a stores the occurrence of an abnormality, the second cutoff circuit 233a stops power supply to the gear-shifting electromagnet valve 206. When the second storage circuit 234a has not yet stored the occurrence of an abnormality, the second gate means 45b resets the second CPU through the second reset signal RST21 and the second control abnormality signal ERR2; after the second storage circuit 234a has stored the occurrence of an abnormality, the second gate means 45b prohibits the second control abnormality signal ERR2 from performing reset processing of the second CPU so that a continuous non-runaway repeated abnormality related to the transmission control is suppressed from providing an effect to the back-and-forth selection control.

The composite reset signal RST2 including the second reset signal RST21 generated by the runaway monitoring means 231b is simply counted by the reset signal counting circuit 39b; when the counted value reaches a predetermined threshold value, the second storage circuit 234a stores the occurrence of an abnormality. In this regard, however, the reset signal counting circuit 39b may count only the second reset signal RST21; alternatively, the occurrence frequency of an abnormality may be detected through a method utilizing an addition-subtraction counting circuit that replaces the reset signal counting circuit 39b.

In the foregoing description, a question-answer abnormality related to the transmission control has been explained; however, in the case where the explanation is expanded to the back-and-forth selection control region, the second region determination circuit 38b becomes effective; in the case where the second control abnormality signal ERR2 is related to the first address region (selection control region) of the second memory MEM2, the second region determination means 38b generates the continuity second reset signal RST23 so as to always initialize and then restart the second CPU, regardless of how large the occurrence count or the occurrence frequency is.

(3) Gist and Feature of Embodiment 1

As is clear from the foregoing explanation, in the vehicle electronic control apparatus 100A according to Embodiment 1 of the present invention, the first CPU and the second CPU, which are microprocessors provided in the engine control circuit unit 110A and the transmission control circuit unit 220A, respectively, collaborate with each other; the vehicle electronic control apparatus 100A is configured in such a way that the first CPU and the second CPU are mounted on a common circuit board and are contained in the common case 100a; the first monitoring control circuit unit 130A including at least the first watchdog timer 131a is connected with the first CPU; the first CPU operates with opening/closing signals or analogue signals, as input signals, to be obtained from the first input-sensor group 101 dedicated to the engine control and the third input-sensor group 103 utilized commonly in the engine control and the transmission control, and generates at least a fuel injection control output for the fuel-injection electromagnetic valve 105 and a valve-opening control output for the intake valve opening degree control motor 106 for the intake valve provided in the intake throttle; the valve-opening drive mechanism of the intake valve includes an initial-position returning mechanism that can perform saving operation based on a fixed intake valve opening degree when power supply to the intake valve opening degree control motor 106 is stopped; the operation of the second CPU is monitored by the runaway monitoring means 231*b* included in the second monitoring control means 230A; the runaway monitoring means 231*b* monitors the watchdog signal WDS2 to be generated by the second CPU by use of the first CPU.

The transmission to be controlled by the second CPU includes a transmission ratio fixation mechanism that makes it possible to travel at least forward at a fixed transmission ratio suitable for middle- or high-speed driving when the second CPU stops its operation; the first watchdog timer 131*a* measures the ON-time width and the OFF-time width of the first pulse train signal WDS1 generated by the first CPU; when the pulse width becomes the same as or longer than the first threshold-value time, the first watchdog timer 131*a* generates the first reset signal RST11 so as to initialize and restart the first CPU; the first monitoring control circuit unit 130A is provided with the first control abnormality determination circuit 35*a*/36*a* including the communication abnormality determination circuit 35*a* and the question-answer abnormality determination circuit 36*a*, a mode selection first circuit, and the first gate circuit 45*a*; the first control abnormality determination circuit 35*a*/36*a* has the correct answer information data memory 34*a* for the transmission question data 30*a*, sequentially transmits a plurality of question information pieces related to at least the valve-opening control output creation program to the first CPU in driving operation, receives from the first CPU answer information corresponding to the question information, and then compares the answer information with the correct answer information preliminarily stored in the first monitoring control circuit unit 130A; the first control abnormality determination circuit 35*a*/36*a* determines whether or not a code check abnormality and an answering-response delay exist in the answer information so as to determine whether or not the first control abnormality including a communication abnormality and a question-answer abnormality exists and then to create the first control abnormality signal ERR1.

The mode selection first circuit has the first storage circuit 134*a* that is set when a first state is established in which the occurrence count or the occurrence frequency of each of the first reset signal RST11 and the first control abnormality signal ERR1 becomes the same as or larger than a predetermined threshold value, the first cutoff circuit 133*a* that stops power supply to the intake valve opening degree control motor 106 when the first storage circuit stores the occurrence of an abnormality, and the reset circuit 135*a* that preliminarily initializes the first storage circuit 134*a* when the power switch 108 for starting power supply to the first CPU is closed; the first gate circuit 45*a* resets the first CPU through the first reset signal RST11 and the first control abnormality signal ERR1 when the first state has not been established; after the first storage circuit 134*a* has stored the occurrence of an abnormality, the first gate circuit 45*a* prohibits the first control abnormality signal ERR1 from performing reset processing of the first CPU so that a continuous non-runaway repeated abnormality related to the valve-opening control is suppressed from providing an effect to the fuel injection control.

As described above, the vehicle electronic control apparatus according to Embodiment 1 of the present invention is configured with the first CPU that performs engine control and the second CPU that performs transmission control; when an abnormality in the first CPU becomes the first state, valve-opening control is stopped and followed by saving operation based on a fixed intake valve opening degree and the first control abnormality signal is stopped from performing reset processing of the first CPU; the transmission to be controlled by the second CPU includes a transmission ratio fixation mechanism that makes it possible to travel at least forward at a fixed transmission ratio when the second CPU stops its operation.

Accordingly, the watchdog timer or the runaway monitoring means for the first CPU and the second CPU is always effective; because when the valve-opening control is followed by the saving operation, the first control abnormality signal related to the valve-opening control is prohibited from performing reset processing of the first CPU, the fuel injection control by the first CPU becomes effective for a contingent and sporadic control abnormality and a continuous erroneous determination control abnormality and hence there is demonstrated an effect that it is made possible to perform diverse saving operation. In other words, when the control at the first CPU side is abnormal, although saving operation at the fixed intake valve opening degree is implemented, the transmission control is effective; thus, for example, in the case of a 5-step automatic transmission, it is made possible to implement high-load driving such as low-speed slope climbing or escaping from a run-off with the first transmission step and in the case of a light load such as slope descending or flat-ground driving, it is made possible to implement long-distance saving operation with the second or third transmission step; thus, there is demonstrated an effect that saving operation is facilitated.

In particular, when during high-speed driving, an abnormality in the first CPU leads to the fixed intake valve opening degree, the engine brake may operate in a rapid and abrupt manner when the transmission step is a low step; however, because the second CPU in the normal operation is provided with a transmission control means for preventing rapid deceleration, this problem is avoided.

Moreover, when the control at the second CPU side is abnormal, the transmission is fixed, for example, to a state of the third-speed forward driving at the middle transmission ratio or higher; however, because the engine control is effective, there is demonstrated an effect that it is made possible to implement saving operation that is more advantageous than third-speed saving operation at the fixed intake valve opening degree.

When although its provability is very low, both the first and second CPUs are abnormal, it is required to implement saving operation with a fixed intake valve opening degree and at the third-speed transmission ratio, and escape from a run-off may require human auxiliary power; however, because in flat-ground driving, it is made possible to perform self-operation, there is demonstrated an effect that saving operation according to the situation of the occurrence of an abnormality can be implemented by use of various saving-operation means. In particular, when during high-speed driving, both the first and second CPUs become abnormal, the high-speed driving is followed by the third-speed-fixed driving with a fixed throttle valve opening degree; because the transmission ratio is the middle-speed ratio or higher, for example, the third speed, the engine brake does not operate in a rapid and abrupt manner. The foregoing effects are demonstrated also in each of other embodiments.

The second CPU operates with opening/closing signals or analogue signals, as input signals, to be obtained from the second input-sensor group 202 dedicated to the transmission control and the third input-sensor group 203 utilized commonly in the engine control and the transmission control, and generates a selection control output for the back-and-forth selection electromagnetic valve 205 that responds to the selection position of the shift lever and a transmission control output for the gear-shifting electromagnet valve 206 that determines a no-step or at least multistep transmission ratio; the transmission includes the transmission ratio fixation mechanism that sets the transmission ratio to the fixed transmission ratio for the middle- or high-speed driving with the middle transmission ratio or higher when power supply to the gear-shifting electromagnet valve 206 is stopped and that sets the transmission ratio to the fixed transmission ratio for fixed forward driving when the operation of the second CPU is stopped; the runaway monitoring means 231b to be implemented by the first CPU measures the ON-time width and the OFF-time width of the second pulse train signal WDS2 generated by the second CPU; when the pulse width becomes the same as or longer than the second threshold-value time, the runaway monitoring means 231b generates the second reset signal RST21 so as to initialize and restart the second CPU.

The second monitoring control means 230A is provided with the second control abnormality determination means 35b/36b including the communication abnormality determination means 35b and the question-answer abnormality determination means 36b, a mode selection second circuit, and the second gate means 45b; the second control abnormality determination means 35b/36b is provided with a correct answer information data memory 34b corresponding to the transmission question data 30b, sequentially transmits a plurality of question information pieces related to at least a transmission control output creation program to the second CPU in driving operation, receives from the second CPU answer information corresponding to the question information, and then compares the answer information with the correct answer information preliminarily stored in the first memory MEM1 that collaborates with the first CPU; the second control abnormality determination means 35b/36b determines whether or not a code check abnormality and an answering-response delay exist in the answer information so as to determine whether or not the second control abnormality including a communication abnormality and a question-answer abnormality exists and then to create the second control abnormality signal ERR2.

The mode selection second circuit has the second storage circuit 234a that is set when the second state is established in which the occurrence count or the occurrence frequency of each of the second reset signal RST21 and the second control abnormality signal ERR2 becomes the same as or larger than a predetermined threshold value, the second cutoff circuit 233a that stops power supply to the gear-shifting electromagnet valve 206 when the second storage circuit stores the occurrence of an abnormality, and the reset circuit 235a that preliminarily initializes the second storage circuit 234a when the power switch 108 for starting power supply to the second CPU is closed; the second gate circuit 45b resets the second CPU through the second reset signal RST21 and the second control abnormality signal ERR2 when the second state has not been established; after the second storage circuit 234a has stored the occurrence of an abnormality, the second gate means 45b prohibits the second control abnormality signal ERR2 from performing reset processing of the second CPU so that a continuous non-runaway repeated abnormality related to the transmission control is suppressed from providing an effect to the back-and-forth selection control.

As described above, with regard to claim 4 of the present invention, the second CPU collaborates with the first CPU; the second storage circuit stores the occurrence of an abnormality when the second state is established in which the occurrence count or the occurrence frequency of each of the second reset signal generated by the runaway monitoring means implemented through the first CPU and the second control abnormality signal generated by the second control abnormality determination means becomes the same as or larger than a predetermined threshold value, and stops power supply to the gear-shifting electromagnet valve so as to set the transmission ratio to the fixed transmission ratio for middle- or high-speed driving; until the second storage circuit stores the occurrence of an abnormality, the second reset signal and the second control abnormality signal implements reset processing of the second CPU; after the second storage circuit has stored the occurrence of an abnormality, the second reset signal continues the reset processing of the second CPU; however, the second control abnormality signal is prohibited from implementing the reset processing of the second CPU.

Accordingly, abnormality monitoring by the runaway monitoring means on a sporadic abnormality or a continuous abnormality in the second CPU and initialization/restarting processing based on the abnormality monitoring are always effective; in the case where after the driving is started, the occurrence count or the occurrence frequency of an abnormality is smaller than a predetermined value, the second control abnormality signal generated by the second control abnormality determination means, related to the transmission control, initializes and restarts the second CPU so as to perform recovery processing for the sporadic abnormality, so that the back-and-forth selection control and the transmission control can normally be implemented; in the case where the occurrence of an abnormality continues, the recovery processing is stopped and hence the second CPU is not reset for a non-runaway repeated abnormality that is a continuous abnormality but does not cause any runaway abnormality in the second CPU. As a result, there is demonstrated a characteristic that although the transmission control by the second CPU cannot be implemented, the back-and-forth selection control can be implemented so that back-and-forth saving operation becomes effective.

When a runaway abnormality in the second CPU occurs, the first CPU performs initialization and restarting; therefore, in the case where the runaway abnormality is contingent and sporadic, at least back-and-forth selection control can be restored to the normal state. Embodiment 2 also demonstrates the same characteristic.

The first CPU is bus-connected with the first RAM, which is a calculation-processing RAM, a nonvolatile first data memory, and the first memory MEM1 including a nonvolatile first program memory; the first memory MEM1 is divided into a first address region including control data and control programs related to a fuel injection control means for the fuel-injection electromagnetic valve 105, a power supply control means for the power source relay for auxiliary apparatuses including a fuel injection pump, and an ignition control means for the ignition coil of a gasoline engine, a second address region including control data and control programs related to the valve-opening control means for the intake valve opening degree control motor 106, and a third address region including others; the third address region or the first address region further includes a pulse generating means that generates the first pulse train signal WDS1 and an abnormality monitoring program that works as the runaway monitoring means 231b at a time when the first CPU monitors the operation of the second CPU or as the second control abnormality determination means 35*b*/36*b*; moreover, the third address region or the first address region includes a valve-opening control stopping means, which is a program that switches the control flow so that when the first storage circuit 134*a* stores the occurrence of an abnormality, the control program related to the valve-opening control means is not implemented; the valve-opening control stopping means is implemented before the valve-opening program is implemented after the first CPU has been initialized.

As described above, with regard to claim 5 of the present invention, the first memory bus-connected with the first CPU is divided into the first address region related to fuel injection, the second address region related to valve-opening control, and the third address region related to other control items; the third or the first address region includes a valve-opening control stopping program that disconnects the control program which works as an unnecessary valve-opening control means, when due to the occurrence of an abnormality, control based on a fixed intake valve opening degree is implemented. Accordingly, there is demonstrated a characteristic that when the contents of an abnormality determined by the first control abnormality determination means is a runaway abnormality in the first CPU, the control program is disconnected so that the contributing factor of the runaway of the first CPU is removed, the fuel injection control becomes effective, and hence saving operation based on a fixed intake valve opening degree can be implemented. Each of Embodiments 2 and 3 demonstrates the same characteristic.

A plurality of question information pieces generated by the first monitoring control circuit unit 130A are a plurality of question numbers, which are different numbers divided in accordance with the address regions of the first memory MEM1; the first monitoring control circuit unit 130A is provided with the first region determination circuit 38*a*; the first control abnormality determination circuit 35*a*/36*a* generates the first control abnormality signal ERR1 and an identification signal corresponding to the address region where the abnormality has occurred; when the first control abnormality signal ERR1 is related to the first address region of the first memory MEM1, the first region determination circuit 38*a* always initializes and restarts the first CPU, regardless of how large the occurrence count or the occurrence frequency of the first control abnormality signal ERR1 is.

As described above, with regard to claim 6 of the present invention, the region of the question-answer abnormality determination by the first monitoring control circuit unit is expanded from the valve-opening control region to the fuel injection control region, and the first control abnormality signal generated in the expanded region always resets, initializes, and restarts the first CPU. Therefore, there is demonstrated a characteristic that for a contingent and sporadic abnormality in the fuel injection control region, which does not lead to a runaway abnormality and hence cannot be detected by the first watchdog timer, and an abnormality in which the contingent and sporadic abnormality recurrently continues, the first control abnormality signal initializes and restarts the first CPU so that the normal state can be recovered or for an abnormality under which the normal state cannot be recovered, the first CPU can be stopped. Each of Embodiments 2 and 3 demonstrates the same characteristic.

The third or the second address region of the first program memory contains a monitoring control program that includes a disconnection/short-circuit abnormality detection means for the driving circuit of the intake valve opening degree control motor 106, a disconnection/short-circuit abnormality detection means for the accelerator position sensor detecting an accelerator pedal step-on degree, and a disconnection/short-circuit abnormality detection means for a throttle position sensor detecting an intake valve opening degree and that functions as a self-check means for generating the first H/W abnormality signal ERH1 when an abnormality is detected; monitoring control operation by the self-check means is monitored by the first control abnormality determination circuit 35*a*/36*a* of the first monitoring control circuit unit 130A; when the self-check means detects the occurrence of an abnormality, the first storage circuit 134*a* stores the occurrence of an abnormality and stops power supply to the intake valve opening degree control motor 106; even when after that, the first control abnormality signal ERR1 for the second address region occurs, the first control abnormality signal ERR1 is prohibited from performing reset processing of the first CPU.

As described above, with regard to claim 7 of the present invention, the first CPU has a self-check means that determines whether or not there exists a hardware abnormality related to valve-opening control, and stops power supply to the intake valve opening degree control motor when a self-check abnormality occurs; even when after that, the first control abnormality signal occurs, the first control abnormality signal is prohibited from performing reset processing of the first CPU. Therefore, there is demonstrated a characteristic that with regard to the valve-opening control, there is detected a hardware abnormality and a control abnormality in which a hardware abnormality, even though occurring, cannot be detected so that the mode can be moved to saving operation with a fixed valve-opening degree. Moreover, there is demonstrated a characteristic that in the case where a control abnormality, even though continuing, is related at least to the second address region, the first CPU is not reset and hence the fuel injection control required for saving operation can be continued. Each of Embodiments 2 and 3 demonstrates the same characteristic.

The third address region of the first program memory contains a control program that functions as a first memory abnormality determination means for applying a sum check or a code check represented by a CRC check to the first memory MEM1 and generating the first memory abnormality signal ERM1; the first memory abnormality determination means also creates an identification signal corresponding to the address region where the first memory abnormality signal ERM1 is generated; the first memory abnormality signal ERM1, as part of the first control abnormality signal ERR1, undergoes logical sum processing.

As described above, with regard to claim 8 of the present invention, the first CPU is provided with the first memory abnormality determination means corresponding to the first, second, and third address regions of the first memory; there are generated the first memory abnormality signal and an identification signal for the address region for which the first memory abnormality signal is generated; then, a logical sum operation is applied to the first memory abnormality signal, the identification signal, and the first control abnormality signal. Therefore, there is demonstrated a characteristic that for a contingent and sporadic abnormality in the fuel injection control region, which does not lead to a runaway abnormality and hence cannot be detected by the first watchdog timer, and an abnormality in which the contingent and sporadic abnormality recurrently continues, the first memory abnormality signal initializes and restarts the first CPU so that the normal state can be recovered or for an abnormality under which the normal state cannot be recovered, the first CPU can be stopped. Moreover, there is demonstrated a characteristic that in the case where a memory abnormality, even though continuing, is related at least to the second address region, the first CPU is not reset and hence the fuel injection control required for saving operation can be continued. Each of Embodiments 2 and 3 demonstrates the same characteristic.

The second CPU is bus-connected with the second RAM, which is a calculation-processing RAM, a nonvolatile second data memory, and the second memory MEM1 including a nonvolatile second program memory; the second memory MEM2 is divided into an address first region including control data and control programs related to a selection control means for the selection electromagnetic valve 205 and a power supply control means for the power source relay for auxiliary apparatuses including a hydraulic pump, an address second region including control data and control programs related to the gear-shift control means for the gear-shifting electromagnet valve 206, and an address third region including others; the address third region or the address first region contains a program that functions as a pulse generation means for generating the second pulse train signal and a transmission control stopping means, which is a program that switches the control flow so that the control program related to the transmission control means is not implemented when the second storage circuit stores the occurrence of an abnormality; the transmission control stopping means is implemented before the transmission control program is implemented after the second CPU has been initialized.

As described above, with regard to claim 9 of the present invention, the second memory bus-connected with the second CPU is divided into the address first region related to the back-and-forth selection control, the address second region related to the transmission control, and the address third region related to other control items; the address third region or the address first region includes a transmission control stopping program that disconnects the control program which works as an unnecessary transmission control means, when due to the occurrence of an abnormality, control based on a fixed transmission ratio is implemented. Accordingly, there is demonstrated a characteristic that when the contents of an abnormality determined by the second control abnormality determination means is a runaway abnormality in the second CPU, the control program is disconnected so that the contributing factor of the runaway of the second CPU is removed, the back-and-forth selection control becomes effective, and hence saving operation based on a fixed transmission ratio can be implemented. When the operation of the second CPU is stopped, forward-fixed saving operation with a fixed transmission ratio can be implemented. Embodiment 2 also demonstrates the same characteristic.

A plurality of question information pieces generated by the second monitoring control means 230A are a plurality of question numbers, which are different numbers divided in accordance with the address regions of the second memory MEM2; the second monitoring control circuit unit 230A is provided with the second region determination circuit 38b; the second control abnormality determination circuit 35b/36b generates the second control abnormality signal ERR2 and an identification signal corresponding to the address region where the abnormality has occurred; when the second control abnormality signal ERR2 is related to the address first region of the second memory MEM2, the second region determination means 38b always initializes and restarts the second CPU, regardless of how large the occurrence count or the occurrence frequency of the second control abnormality signal ERR2 is.

As described above, with regard to claim 10 of the present invention, the region of the question-answer abnormality determination by the second monitoring control means is expanded from the transmission control region to the selection control region, and the second control abnormality signal generated in the expanded region always resets, initializes, and restarts the second CPU. Therefore, there is demonstrated a characteristic that for a contingent and sporadic abnormality in the fuel injection control region, which does not lead to a runaway abnormality and hence cannot be detected by the runaway monitoring means implemented by the first CPU, and an abnormality in which the contingent and sporadic abnormality recurrently continues, the second control abnormality signal initializes and restarts the second CPU so that the normal state can be recovered or for an abnormality under which the normal state cannot be recovered, the second CPU can be stopped. Embodiment 2 also demonstrates the same characteristic.

The third or the second address region of the second program memory contains a monitoring control program that includes a disconnection/short-circuit abnormality detection means for the gar-shifting electromagnet valve 206 and a disconnection/short-circuit abnormality detection means for the gear-shift sensor and the vehicle speed sensor and that functions as a self-check means for generating the second H/W abnormality signal ERH2 when an abnormality is detected; monitoring control operation by the self-check means is monitored by the second control abnormality determination circuit 35b/36b of the second monitoring control circuit unit 230A; when the self-check means detects the occurrence of an abnormality, the second storage circuit 234a stores the occurrence of an abnormality and stops power supply to the gar-shifting electromagnet valve 206; even when after that, the second control abnormality signal ERR2 for the second address region occurs, the second control abnormality signal ERR2 is prohibited from performing reset processing of the second CPU.

As described above, with regard to claim 11 of the present invention, the second CPU has a self-check means that determines whether or not there exists a hardware abnormality related to transmission control, and stops power supply to the gear-shifting electromagnet valve when a self-check abnormality occurs; even when after that, the second control abnormality signal occurs, the second control abnormality signal is prohibited from performing reset processing of the second CPU. Therefore, there is demonstrated a characteristic that with regard to the transmission control, there is detected a hardware abnormality and a control abnormality in which a hardware abnormality, even though occurring, cannot be detected so that the mode can be moved to saving operation with a fixed transmission ratio. Moreover, there is demonstrated a characteristic that in the case where a control abnormality, even though continuing, is related at least to the address second region, the second CPU is not reset and hence the back-and-forth selection control useful for saving operation can be continued. Embodiment 2 also demonstrates the same characteristic.

The address third region of the second program memory contains a control program that functions as a second memory abnormality determination means for applying a sum check or a code check represented by a CRC check to the second memory MEM2 and generating the second memory abnormality signal ERM2; the second memory abnormality determination means also creates an identification signal corresponding to the address region where the second memory abnormality signal ERM2 is generated; the second memory abnormality signal ERM2, as part of the second control abnormality signal ERR2, undergoes logical sum processing.

As described above, with regard to claim 12 of the present invention, the second CPU is provided with the second memory abnormality determination means corresponding to the address first, address second, and address third regions of the second memory; there are generated the second memory abnormality signal and an identification signal for the address region for which the second memory abnormality signal is generated; then, a logical sum operation is applied to the second memory abnormality signal, the identification signal, and the second control abnormality signal. Therefore, there is demonstrated a characteristic that for a contingent and sporadic abnormality in the back-and-forth selection control region, which does not lead to a runaway abnormality and hence cannot be detected by the runaway monitoring means implemented by the first CPU, and an abnormality in which the contingent and sporadic abnormality recurrently continues, the second control abnormality signal initializes and restarts the second CPU so that the normal state can be recovered or for an abnormality under which the normal state cannot be recovered, the second CPU can be stopped. Moreover, there is demonstrated a characteristic that in the case where a memory abnormality, even though continuing, is related at least to the address second region, the second CPU is not reset and hence the back-and-forth selection control useful for saving operation can be continued. Embodiment 2 also demonstrates the same characteristic.

Letting T1 and T2 denote the respective allowable times, for the first CPU and the second CPU, of the question-answer period from a time when the question information is transmitted to a time when answer information is received, the equation T1 T2 is established.

As described above, with regard to claim 13 of the present invention, the question-answer-period allowable time T2 for the second CPU that performs transmission control is the same as or shorter than the question-answer period allowable time T1 for the first CPU that performs engine control; respective pluralities of question information pieces for the first CPU and the second CPU are separately stored in the monitoring control circuit unit. Accordingly, there is demonstrated a characteristic that for the first CPU that needs to perform high-speed control in synchronization with the operation of the crank angle sensor and in response to the engine rotation speed, question information is transmitted at a low frequency so as to reduce the load of question-answer control or the same question is recurrently transmitted so as to reduce the transmission frequency of new question information and that for the second CPU whose control-operation responsiveness does not synchronize with the operation of the crank angle sensor and is not directly related to the engine rotation speed, new question information is transmitted at a frequency higher than that for the first CPU so that the response time of the abnormality determination can be shortened. When the engine rotation speed is low, the transmission frequency of new question information can be raised to a high frequency that is equivalent to the transmission frequency for the first CPU. Embodiment 2 also demonstrates the same characteristic.

Embodiment 2

Next, a vehicle electronic control apparatus according to Embodiment 2 of the present invention will be explained.

Hereinafter, first and second practical examples of a vehicle electronic control apparatus according to Embodiment 2 of the present invention will be explained.

(1) Detailed Explanation for 1st Practical Example

Figure 4A:
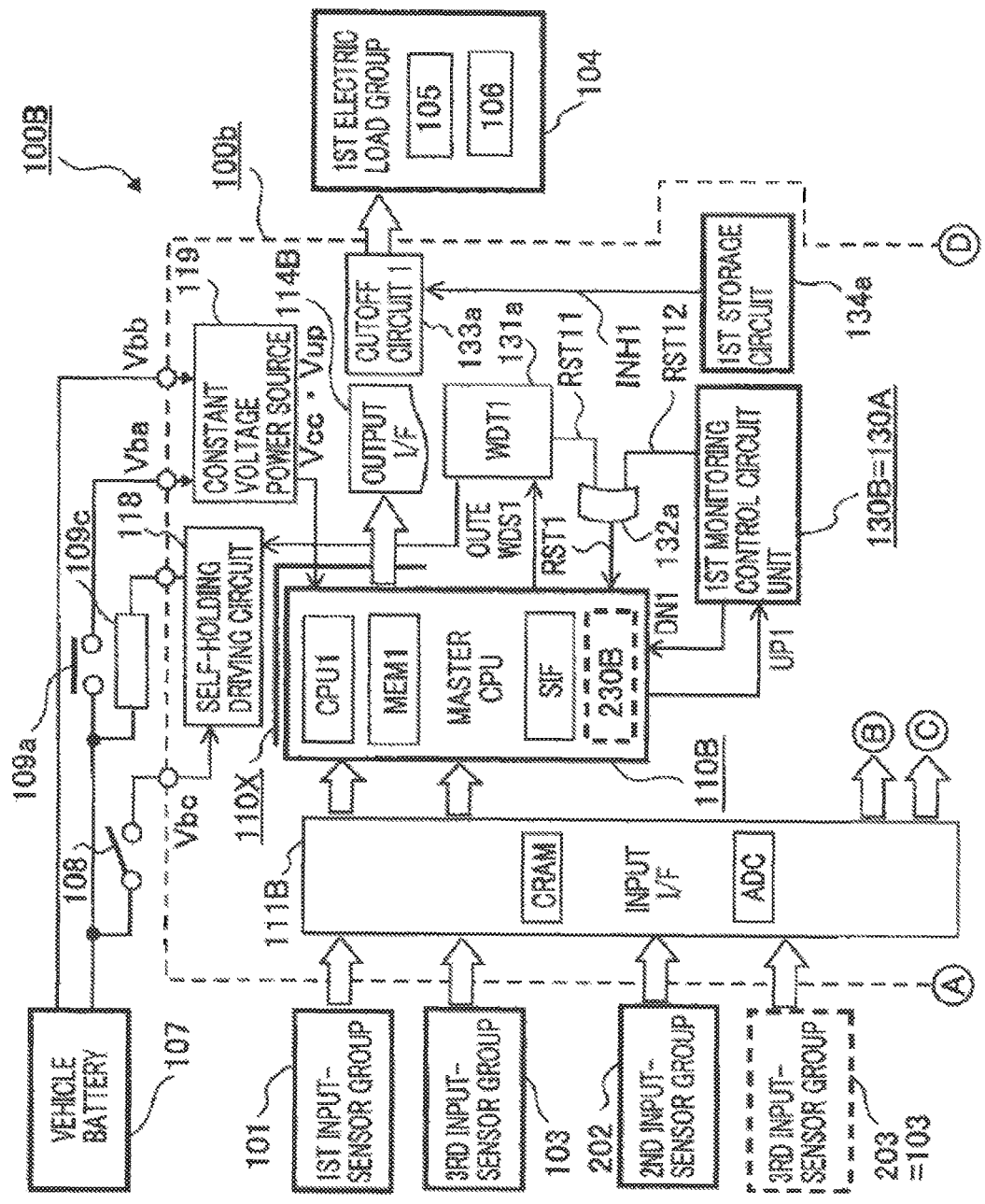
FIGS. 4A and 4B are block diagram illustrating the overall configuration of a first practical example in a vehicle electronic control apparatus according to Embodiment 2 of the present invention.
Figure 4B:
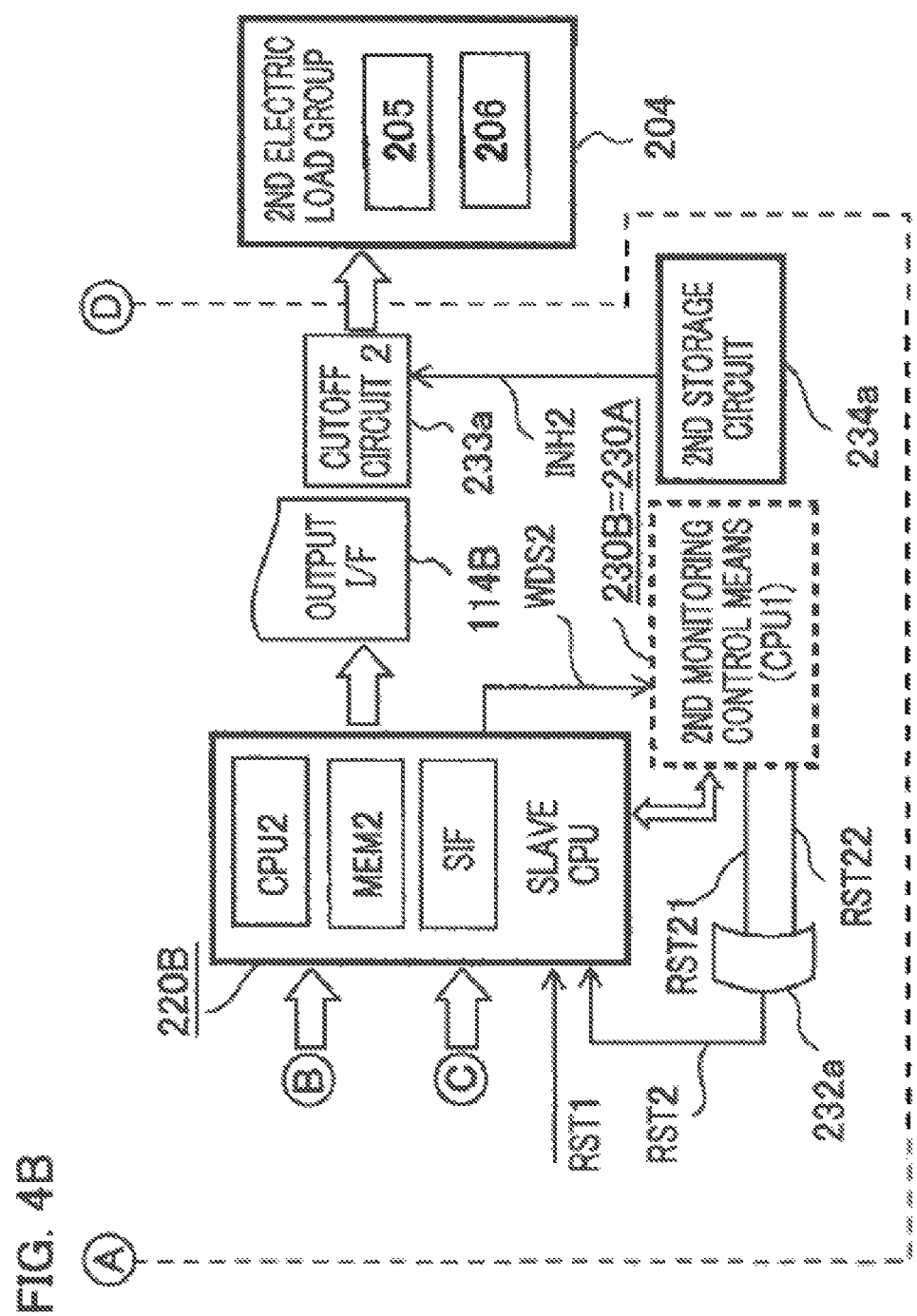

FIGS. 4A and 4B are block diagram illustrating the overall configuration of the first practical example of a vehicle electronic control apparatus according to Embodiment 2 of the present invention. Hereinafter, the operation and action of the first practical example will be explained in detail, focusing on the difference thereof from Embodiment 1 illustrated in FIGS. 1A and 1B. In each of the drawings, the same reference characters denote the same or equivalent constituent elements, and the characters A and B denote constituent elements in Embodiment 1 and the first practical example of Embodiment 2, respectively; Embodiment 2 differs from Embodiment 1 mainly in that as each of the first and second CPUs, a multicore CPU including a master CPU and a slave CPU is utilized.

In FIGS. 4A and 4B, a vehicle electronic control apparatus 100B includes an engine control circuit unit 110B and a transmission control circuit unit 220B that are incorporated in a common case 100b; the vehicle electronic control apparatus 100B is provided with a constant voltage power source 119 that is supplied with the electric power by way of a main power source terminal Vba, which is connected with the vehicle battery 107 by way of the output device 109a of the power supply relay 109c when the power switch 108 is closed, and the auxiliary power source terminal Vbb directly connected with the vehicle battery 107; the vehicle electronic control apparatus 100B is activated when the stabilized control voltage Vcc to be generated by the constant voltage power source 119 and the back-up voltage Vup for retaining the storage contents of a RAM are supplied thereto.

The first input-sensor group 101 includes various kinds of sensors inherent to engine control such as a crank angle sensor for detecting the rotation angle and the rotation speed of an engine, an air flow sensor for measuring the intake amount of air that passes through a throttle intake valve, a throttle position sensor for detecting the intake valve opening degree, and a gas sensor for detecting the oxygen concentration in an exhaust-gas sensor. The third input-sensor group 103 includes various kinds of sensors to be utilized in both engine control and transmission control such as a vehicle speed sensor, an accelerator position sensor for detecting the step-on degree of an accelerator pedal, and a gearshift sensor for detecting the selection position of a gearshift lever.

The second input-sensor group 202 includes various kinds of sensors inherent to transmission control such as an oil temperature sensor or an oil pressure sensor in a transmission. The third input-sensor group 203 is the same as the third input-sensor group 103, described above. The first electric load group 104 is an engine control load to be controlled in response to the respective operation states of the first and third input-sensor groups 101 and 103 and includes at least the fuel-injection electromagnetic valve 105 and the intake valve opening degree control motor 106 that are disposed for each cylinder; in the case where the control subject is an gasoline engine, the first electric load group 104 further includes an ignition plug disposed for each cylinder.

In addition, there is provided a fail-safe mechanism for compulsory and mechanical resetting so that when power supply to the intake valve opening degree control motor 106 is stopped, the opening degree is set to the fixed intake valve opening degree at which a rotation speed higher than the idling rotation speed can be obtained.

The second electric load group 204 is a transmission control load to be controlled in response to the respective operation states of the second and third input-sensor groups 202 and 203 (103) and includes at least the selection electromagnetic valve 205 for selecting forward or backward movement and the gear-shifting electromagnet valve 206 for changing the transmission ratio continuously or in a multi-step manner.

In addition, when power supply to the gear-shifting electromagnet valve 206 is stopped, a middle- or high-speed driving transmission ratio higher than the middle transmission ratio in the gear-shift range can be obtained.

The engine control circuit unit 110B is configured mainly with the first CPU (although in FIGS. 4A and 4B, illustrated as the reference character "CPU1", the first CPU is described simply as the first CPU in the following explanation for the sake of avoiding the complexity and the reference character "CPU1" will be omitted), which is the master CPU of a multicore CPU, and includes the first memory MEM1 including a nonvolatile program memory, which is, for example, a flash memory, a data memory, which is part of the region of the program memory or another nonvolatile memory that can electrically perform reading and writing, and a volatile RAM, and the communication interface circuit SIF.

The transmission control circuit unit 220B is configured mainly with the second CPU (although in FIGS. 4A and 4B, illustrated as the reference character "CPU2", the second CPU is described simply as the second CPU in the following explanation for the sake of avoiding the complexity and the reference character "CPU2" will be omitted), which is the slave CPU of the multicore CPU, and contains the second memory MEM2 including a nonvolatile program memory, which is, for example, a flash memory, a data memory, which is part of the region of the program memory or another nonvolatile memory that can electrically perform reading and writing, and a volatile RAM.

The multicore CPU is an integrated circuit device provided with a master CPU and a slave CPU that can perform mutual high-speed communication between them by way of a common RAM CRAM and a checker CPU 110X that implements the same control program as at least the master CPU implements, at a timing that is not the same as the timing at which the master CPU implements the control program, and generates a comparison abnormality signal when the different-timing calculation outputs do not coincide with each other; an input interface circuit 111B includes an interface circuit for all sensors in the first input-sensor group 101, the second input-sensor group 202, and the third input-sensor group 103 (203) related to the first CPU and the second CPU, a multi-channel A/D converter ADC, and the common RAM CRAM; an output interface circuit 114B includes all output interface circuits for the first electric load group 104 and the second electric load group 204.

As a result, each of the first CPU and the second CPU can access an arbitrary input sensor and electric load; however, in practice, the accessible inputs and outputs are restricted so that erroneous control is not implemented. The first watchdog timer 131a measures the pulse width of the first pulse train signal WDS1 generated by the first CPU; when the pulse width becomes the same as or longer than the first threshold-value time, the first watchdog timer 131a generates the first reset signal RST11 so as to initialize and restart the first CPU.

A first monitoring control circuit unit 130B is the same as the first monitoring control circuit unit 130A, described with reference to FIGS. 2A and 2B; while performing serial communication with the first CPU through the downstream signal DN1 and the upstream signal UP1, the first monitoring control circuit unit 130B determines whether or not the first CPU normally performing its control operation; in the case where a control abnormality is detected, the first monitoring control circuit unit 130B generates the control first reset signal RST12 so as to reset the first CPU.

When any one of the first reset signal RST11 and the control first reset signal RST12 is generated, the first logical sum circuit 132a generates the composite first reset signal RST1 so as to reset the first CPU.

When the power switch 108 is closed, the self-holding circuit 118 energizes the power supply relay 109c; however, in the case where the first CPU is once activated and the first watchdog timer 131a generates an output permission signal OUTE, the power supply is continued by the operation of the self-holding circuit 118 even when the power switch 108 is opened. Accordingly, after the power switch 108 is opened, the first CPU and an after-mentioned second CPU stop the operation thereof, and the respective CPUs perform saving storage of learning information and the like; then, the first CPU stops the first pulse train signal WDS1, so that the power supply relay 109c is de-energized. In this regard, however, the first CPU stops the first pulse train signal WDS1 after the second CPU stops the second pulse train signal WDS2.

When the count or the frequency of abnormalities detected by the first monitoring control circuit unit 130B exceeds a predetermined threshold value, the first storage circuit 134a stores the count or the frequency and supplies the first cutoff signal INH1 to the first cutoff circuit 133a; the first cutoff circuit 133a stops supply of the electric power, out of the whole electric power for the output interface circuit 114B, that is for the intake valve opening degree control motor 106.

A second monitoring control means 230B, which is the same as the second monitoring control means 230A described with reference to FIGS. 3A and 3B, is configured with software to be implemented by the first CPU; while the first CPU including the second monitoring control means 230B and the second CPU, which is a monitoring subject, perform high-speed communication with each other by way of the common RAM CRAM, the second monitoring control means 230B determines whether or not the second CPU normally performing its control operation; in the case where a control abnormality is detected, the second monitoring control means 230B generates the control second reset signal RST22 so as to reset the second CPU.

The second monitoring control means 230B is provided with the runaway monitoring means 231b corresponding to a second watchdog timer; the runaway monitoring means 231b measures the pulse width of the second pulse train signal WDS2 generated by the second CPU; when the pulse width becomes the same as or longer than a second threshold-value time, the runaway monitoring means 231b generates the second reset signal RST21 so as to initialize and restart the second CPU. When any one of the second reset signal RST21 and the control second reset signal RST22 is generated, the second logical sum circuit 232a generates a composite second reset signal RST2 so as to reset the second CPU.

When the count or the frequency of abnormalities detected by the second monitoring control means 230B exceeds a predetermined threshold value, the second storage circuit 234a stores the count or the frequency and supplies the second cutoff signal INH2 to the second cutoff circuit 233a; the second cutoff circuit 233a stops supply of the electric power, out of the whole electric power for the output interface circuit 114B, that is for the gear-shifting electromagnet valve 206.

The multicore CPU described herein is of a type in which when the first CPU, which is a master CPU, is reset by the composite first reset signal RST1, the second CPU, which is a slave CPU, is concurrently reset. However, the first monitoring control circuit unit 130B (130A) and the second monitoring control means 230B (230A) are the same as those described with reference to FIGS. 2A and 2B, FIGS. 3A and 3B; the operations and the actions thereof are the same as those in Embodiment 1.

(2) Detailed Explanation for 2nd Practical Example

Figure 5A:
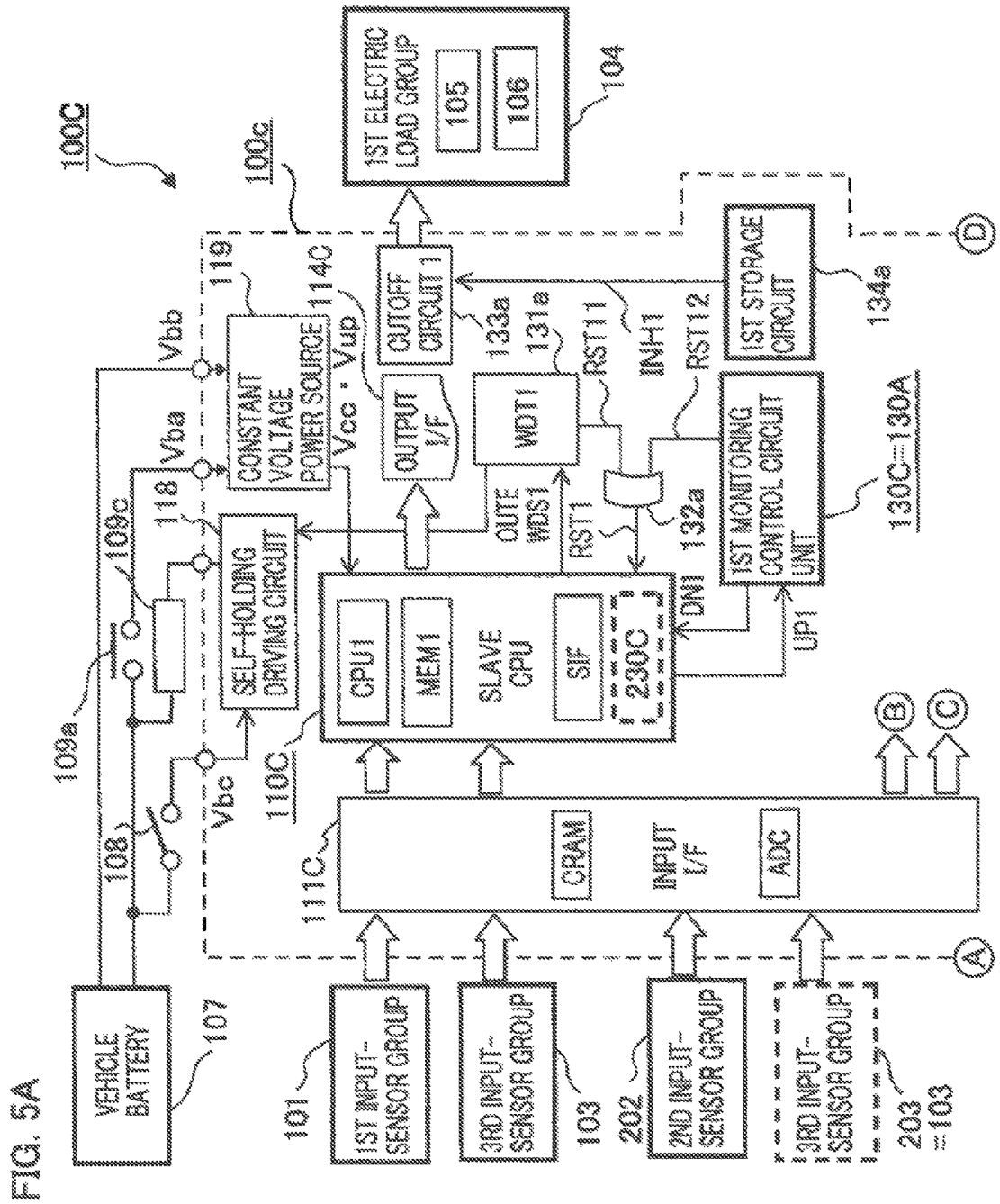
FIGS. 5A and 5B are block diagram illustrating the overall configuration of a second practical example in the vehicle electronic control apparatus according to Embodiment 2 of the present invention.
Figure 5B:
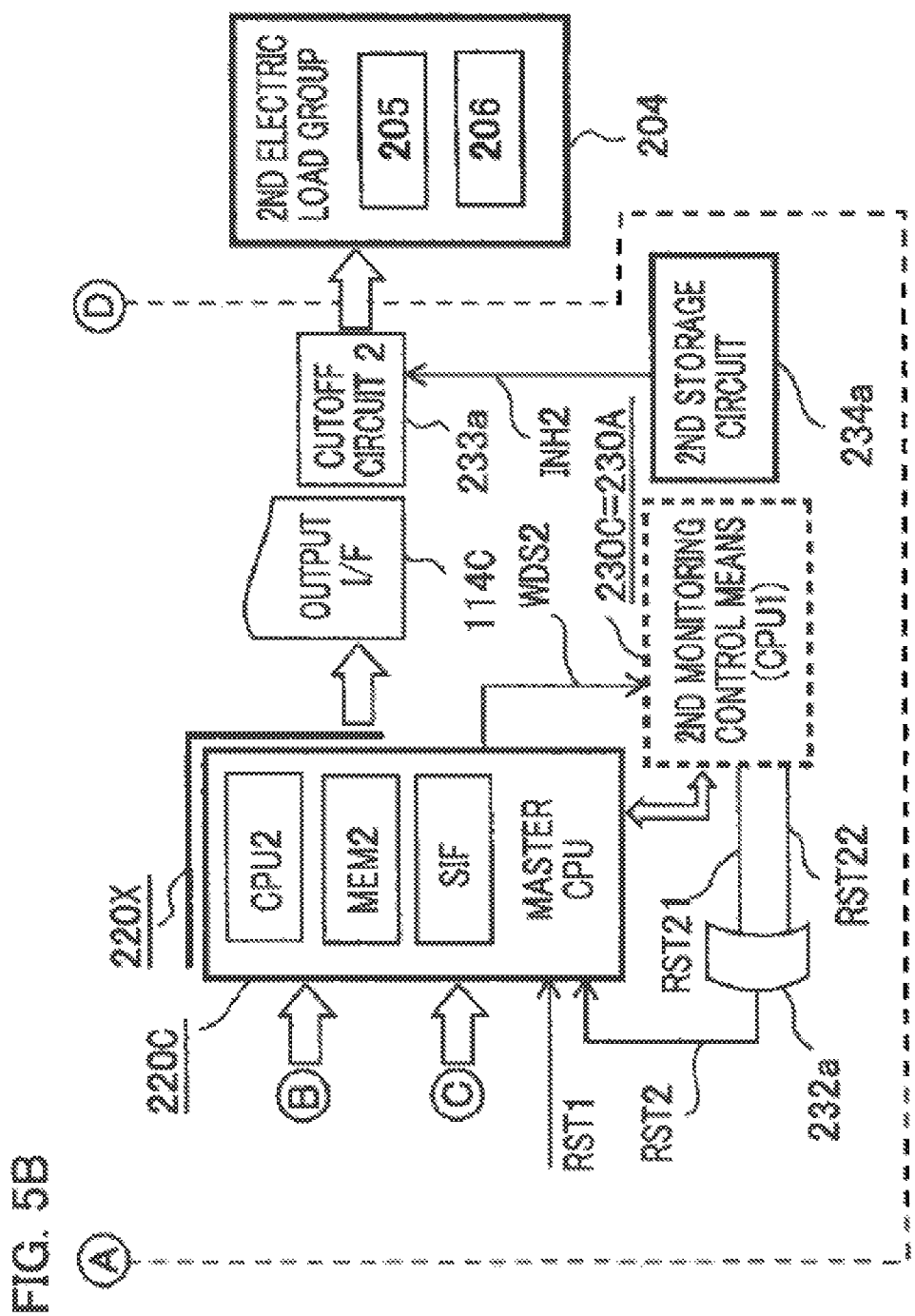

FIGS. 5A and 5B are block diagram illustrating the overall configuration of the second practical example of a vehicle electronic control apparatus according to Embodiment 2 of the present invention. Hereinafter, the operation and action of the second practical example of a vehicle electronic control apparatus according to Embodiment 2 of the present invention will be explained in detail, focusing on the difference thereof from that illustrated in each of FIGS. 1A and 1B through FIGS. 4A and 4B. In each of the drawings, the same reference characters denote the same or equivalent constituent elements, and the characters A, B, and C denote the constituent elements in Embodiment 1, the first practical example of Embodiment 2, and the second practical example of Embodiment 2, respectively. In the first practical example of Embodiment 2, as the first CPU and the second CPU in Embodiment 1, a multicore CPU including a master CPU and a slave CPU is utilized; however, in the second practical example of Embodiment 2, the first CPU for engine control is a slave CPU and the second CPU for transmission control is a master CPU, i.e., the first and second CPUs exchanges their roles.

In FIGS. 5A and 5B, a vehicle electronic control apparatus 100C includes an engine control circuit unit 110C and a transmission control circuit unit 220C that are incorporated in a common case 100c; the vehicle electronic control apparatus 100C is provided with the constant voltage power source 119 that is supplied with the electric power byway of the main power source terminal Vba, which is connected with the vehicle battery 107 by way of the output device 109a of the power supply relay 109c when the power switch 108 is closed, and the auxiliary power source terminal Vbb directly connected with the vehicle battery 107; the vehicle electronic control apparatus 100B is activated when the stabilized control voltage Vcc to be generated by the constant voltage power source 119 and the back-up voltage Vup for retaining the storage contents of a RAM are supplied thereto.

The first input-sensor group 101 includes various kinds of sensors inherent to engine control such as a crank angle sensor for detecting the rotation angle and the rotation speed of an engine, an air flow sensor for measuring the intake amount of air that passes through a throttle intake valve, a throttle position sensor for detecting the intake valve opening degree, and a gas sensor for detecting the oxygen concentration in an exhaust-gas sensor. The third input-sensor group 103 includes various kinds of sensors to be utilized in both engine control and transmission control such as a vehicle speed sensor, an accelerator position sensor for detecting the step-on degree of an accelerator pedal, and a gearshift sensor for detecting the selection position of a gearshift lever.

The second input-sensor group 202 includes various kinds of sensors inherent to transmission control such as an oil temperature sensor or an oil pressure sensor in a transmission. The third input-sensor group 203 is the same as the third input-sensor group 103, described above. The first electric load group 104 is an engine control load to be controlled in response to the respective operation states of the first and third input-sensor groups 101 and 103 and includes at least the fuel-injection electromagnetic valve 105 and the intake valve opening degree control motor 106 that are disposed for each cylinder; in the case where the control subject is an gasoline engine, the first electric load group 104 further includes an ignition plug disposed for each cylinder.

In addition, there is provided a fail-safe mechanism for compulsory and mechanical resetting so that when power supply to the intake valve opening degree control motor 106 is stopped, the opening degree is set to the fixed intake valve opening degree at which a rotation speed higher than the idling rotation speed can be obtained.

The second electric load group 204 is a transmission control load to be controlled in response to the respective operation states of the second and third input-sensor groups 202 and 203 (103) and includes at least the selection electromagnetic valve 205 for selecting forward or backward movement and the gear-shifting electromagnet valve 206 for changing the transmission ratio continuously or in a multi-step manner.

In addition, when power supply to the gear-shifting electromagnet valve 206 is stopped, a middle- or high-speed driving transmission ratio higher than the middle transmission ratio in the gear-shift range can be obtained.

The engine control circuit unit 110C is configured mainly with the first CPU (although in FIGS. 5A and 5B, illustrated as the reference character "CPU1", the first CPU is described simply as the first CPU in the following explanation for the sake of avoiding the complexity and the reference character "CPU1" will be omitted), which is the slave CPU of a multicore CPU, and includes the first memory MEM1 including a nonvolatile program memory, which is, for example, a flash memory, a data memory, which is part of the region of the program memory or another nonvolatile memory that can electrically perform reading and writing, and a volatile RAM, and the communication interface circuit SIF.

The transmission control circuit unit 220C is configured mainly with the second CPU (although in FIGS. 5A and 5B, illustrated as the reference character "CPU2", the second CPU is described simply as the second CPU in the following explanation for the sake of avoiding the complexity and the reference character "CPU2" will be omitted), which is the master CPU of the multicore CPU, and contains the second memory MEM2 including a nonvolatile program memory, which is, for example, a flash memory, a data memory, which is part of the region of the program memory or another nonvolatile memory that can electrically perform reading and writing, and a volatile RAM.

The multicore CPU is an integrated circuit device provided with a master CPU and a slave CPU that can perform mutual high-speed communication between them by way of a common RAM CRAM and a checker CPU 220X that implements the same control program as at least the master CPU implements, at a timing that is not the same as the timing at which the master CPU implements the control program, and generates a comparison abnormality signal when the different-timing calculation outputs do not coincide with each other; an input interface circuit 111C includes an interface circuit for all sensors in the first input-sensor group 101, the second input-sensor group 202, and the third input-sensor group 103 (203) related to the first CPU and the second CPU, a multi-channel A/D converter ADC, and the common RAM CRAM; an output interface circuit 114C includes all output interface circuits for the first electric load group 104 and the second electric load group 204.

As a result, each of the first CPU and the second CPU can access an arbitrary input sensor and electric load; however, in practice, the accessible inputs and outputs are restricted so that erroneous control is not implemented.

The first watchdog timer 131a measures the pulse width of the first pulse train signal WDS1 generated by the first CPU; when the pulse width becomes the same as or longer than the first threshold-value time, the first watchdog timer 131a generates the first reset signal RST11 so as to initialize and restart the first CPU.

A first monitoring control circuit unit 130C is the same as the first monitoring control circuit unit 130A, described with reference to FIGS. 2A and 2B; while performing serial communication with the first CPU through the downstream signal DN1 and the upstream signal UP1, the first monitoring control circuit unit 130B determines whether or not the first CPU normally performing its control operation; in the case where a control abnormality is detected, the first monitoring control circuit unit 130B generates the control first reset signal RST12 so as to reset the first CPU.

When any one of the first reset signal RST11 and the control first reset signal RST12 is generated, the first logical sum circuit 132a generates the composite first reset signal RST1 so as to reset the first CPU.

When the power switch 108 is closed, the self-holding circuit 118 energizes the power supply relay 109c; however, in the case where the first CPU is once activated and the first watchdog timer 131a generates an output permission signal OUTE, the power supply is continued by the operation of the self-holding circuit 118 even when the power switch 108 is opened. Accordingly, after the power switch 108 is opened, the first CPU and an after-mentioned second CPU stop the operation thereof, and the respective CPUs perform saving storage of learning information and the like; then, the first CPU stops the first pulse train signal WDS1, so that the power supply relay 109c is de-energized.

In this regard, however, the first CPU stops the first pulse train signal WDS1 after the second CPU stops the second pulse train signal WDS2.

When the count or the frequency of abnormalities detected by the first monitoring control circuit unit 130C exceeds a predetermined threshold value, the first storage circuit 134a stores the count or the frequency and supplies the first cutoff signal INH1 to the first cutoff circuit 133a; the first cutoff circuit 133a stops supply of the electric power, out of the whole electric power for the output interface circuit 114C, that is for the intake valve opening degree control motor 106.

A second monitoring control means 230C, which is the same as the second monitoring control means 230A described with reference to FIGS. 3A and 3B, is configured with software to be implemented by the first CPU; while the first CPU including the second monitoring control means 230C and the second CPU, which is a monitoring subject, perform high-speed communication with each other by way of the common RAM CRAM, the second monitoring control means 230C determines whether or not the second CPU normally performing its control operation; in the case where a control abnormality is detected, the second monitoring control means 230C generates the control second reset signal RST22 so as to reset the second CPU.

The second monitoring control means 230C is provided with the runaway monitoring means 231b corresponding to a second watchdog timer; the runaway monitoring means 231b measures the pulse width of the second pulse train signal WDS2 generated by the second CPU; when the pulse width becomes the same as or longer than a second threshold-value time, the runaway monitoring means 231b generates the second reset signal RST21 so as to initialize and restart the second CPU.

When any one of the second reset signal RST21 and the control second reset signal RST22 is generated, the second logical sum circuit 232a generates the composite second reset signal RST2 so as to reset the second CPU.

When the count or the frequency of abnormalities detected by the second monitoring control means 230C exceeds a predetermined threshold value, the second storage circuit 234a stores the count or the frequency and supplies the second cutoff signal INH2 to the second cutoff circuit 233a; the second cutoff circuit 233a stops supply of the electric power, out of the whole electric power for the output interface circuit 114C, that is for the gear-shifting electromagnet valve 206.

The multicore CPU described herein is of a connection type in which when the slave CPU (the first CPU) is reset by the composite first reset signal RST1, the master CPU (the second CPU) is concurrently reset. However, the first CPU is provided with a synthesizing means that measures the ON/OFF period of the second pulse train signal WDS2 generated by the second CPU and performs correction so that the ON time or the OFF time of the first pulse train signal becomes the same as or longer than the first threshold-value time, when the ON/OFF period of the second pulse train signal WDS2 is the same as or longer than the second threshold-value time; as a result, when the second pulse train signal WDS2 is abnormal, the first reset signal RST11 generated by the first watchdog timer 131a initializes and restarts both the first CPU and the second CPU.

When the checker CPU 220X generates a comparison abnormality signal, the second CPU moves to a predetermined initial step, where the second CPU immediately restarts its control operation.

In addition, the first monitoring control circuit unit 130C (=130B=130A) and the second monitoring control means 230C (=230B=230A) are the same as those described with reference to FIGS. 2A and 2B, FIGS. 3A and 3B; the operations and the actions thereof are the same as those in Embodiment 1.

(3) Gist and Feature of Embodiment 2

As is clear from the foregoing explanation, in the vehicle electronic control apparatus 100B/100C according to Embodiment 2 of the present invention, the first CPU and the second CPU, which are microprocessors provided in the engine control circuit unit 110B/110C and the transmission control circuit unit 220B/220C, respectively, collaborate with each other; the vehicle electronic control apparatus 100B/100C is configured in such a way that the first CPU and the second CPU are collectively mounted on a common circuit board contained in a common case; the first monitoring control circuit unit 130B/130C including at least the first watchdog timer 131a is connected with the first CPU; the first CPU operates with opening/closing signals or analogue signals, as input signals, to be obtained from the first input-sensor group 101 dedicated to the engine control and the third input-sensor group 103 utilized commonly in the engine control and the transmission control, and generates at least a fuel injection control output for the fuel-injection electromagnetic valve 105 and a valve-opening control output for the intake valve opening degree control motor 106 for the intake valve provided in the intake throttle; the valve-opening drive mechanism of the intake valve includes an initial-position returning mechanism that can perform saving operation based on a fixed intake valve opening degree when power supply to the intake valve opening degree control motor 106 is stopped.

The operation of the second CPU is monitored by the runaway monitoring means 231*b* included in the second monitoring control means 230B/230C; the runaway monitoring means 231*b* monitors the watchdog signal WDS2 to be generated by the second CPU by use of the first CPU; the transmission to be controlled by the second CPU includes a transmission ratio fixation mechanism that makes it possible to travel at least forward at a fixed transmission ratio suitable for middle- or high-speed driving when the second CPU stops its operation; the first watchdog timer 131*a* measures the ON-time width and the OFF-time width of the first pulse train signal WDS1 generated by the first CPU; when the pulse width becomes the same as or longer than the first threshold-value time, the first watchdog timer 131*a* generates the first reset signal RST11 so as to initialize and restart the first CPU; the first monitoring control circuit unit 130B/130C is provided with the first control abnormality determination circuits 35*a*/36*a* including the communication abnormality determination circuit 35*a* and the question-answer abnormality determination circuit 36*a*, the mode selection first circuit, and the first gate circuit 45*a*; the first control abnormality determination circuit 35*a*/36*a* has the correct answer information data memory 34*a* for the transmission question data 30*a*, sequentially transmits a plurality of question information pieces related to at least the valve-opening control output creation program to the first CPU in driving operation, receives from the first CPU answer information corresponding to the question information, and then compares the answer information with the correct answer information preliminarily stored in the first monitoring control circuit unit 130B/130C; the first control abnormality determination circuit 35*a*/36*a* determines whether or not a code check abnormality and an answering-response delay exist in the answer information so as to determine whether or not the first control abnormality including a communication abnormality and a question-answer abnormality exists and then to create the first control abnormality signal ERR1.

The mode selection first circuit has the first storage circuit 134*a* that is set when a first state is established in which the occurrence count or the occurrence frequency of each of the first reset signal RST11 and the first control abnormality signal ERR1 becomes the same as or larger than a predetermined threshold value, the first cutoff circuit 133*a* that stops power supply to the intake valve opening degree control motor 106 when the first storage circuit stores the occurrence of an abnormality, and the reset circuit 135*a* that preliminarily initializes the first storage circuit 134*a* when the power switch 108 for starting power supply to the first CPU is closed; the first gate circuit 45*a* resets the first CPU through the first reset signal RST11 and the first control abnormality signal ERR1 when the first state has not been established; after the first storage circuit 134*a* has stored the occurrence of an abnormality, the first gate circuit 45*a* prohibits the first control abnormality signal ERR1 from performing reset processing of the first CPU so that a continuous non-runaway repeated abnormality related to the valve-opening control is suppressed from providing an effect to the fuel injection control.

As described above, the vehicle electronic control apparatus according to Embodiment 2 of the present invention is integrally configured with the first CPU that performs engine control and the second CPU that performs transmission control; with regard to the first CPU, when the first state is established in which the occurrence count or the occurrence frequency of each of the first reset signal generated by the first watchdog timer and the first control abnormality signal generated by the first control abnormality determination means becomes the same as or larger than a predetermined threshold value, the first storage circuit stores the occurrence of an abnormality and stops power supply to the intake valve opening degree control motor so as to set the valve-opening degree to a fixed intake valve opening degree; until the first storage circuit stores the occurrence of an abnormality, the first reset signal and the first control abnormality signal implements reset processing of the first CPU; after the first storage circuit has stored the occurrence of an abnormality, the first reset signal continues the reset processing of the first CPU; however, the first control abnormality signal is prohibited from implementing the reset processing of the first CPU. The second CPU is monitored by the second monitoring control means formed of the first CPU.

Accordingly, abnormality monitoring by the first watchdog timer on a sporadic abnormality or a continuous abnormality in the first CPU and initialization/restarting processing based on the abnormality monitoring are always effective; in the case where after the driving is started, the occurrence count or the occurrence frequency of an abnormality is smaller than a predetermined value, the first control abnormality signal generated by the first control abnormality determination means, related to the valve-opening control for the intake valve, initializes and restarts the first CPU so as to perform recovery processing for the sporadic abnormality, so that the fuel injection control and the valve-opening control can normally be implemented; in the case where the occurrence of an abnormality continues, the recovery processing is stopped and hence the first CPU is not reset for a non-runaway repeated abnormality that is a continuous abnormality but does not cause any runaway abnormality in the first CPU. As a result, there is demonstrated an effect that although the valve-opening control by the first CPU cannot be implemented, the fuel injection control can be implemented so that saving operation based on the fixed intake valve opening degree becomes effective.

When a runaway abnormality in the first CPU occurs, the first watchdog timer performs initialization and restarting; therefore, in the case where the runaway abnormality is contingent and sporadic, at least the fuel injection control can be restored to the normal state. Moreover, there is demonstrated an effect that because the monitoring control of the second CPU is implemented by use of the first CPU, the hardware configuration is downsized and becomes inexpensive.

The microprocessor is a multicore CPU, which is an integrated circuit device provided with a master CPU and a slave CPU that can perform mutual high-speed communication between them by way of a common RAM and the checker CPU 110X that implements the same control program as at least the master CPU implements, at a timing that is not the same as the timing at which the master CPU implements the control program, and generates a comparison abnormality signal when the different-timing calculation outputs do not coincide with each other; the first CPU is the master CPU and the second CPU is the slave CPU, and alternatively, the first CPU is the slave CPU and the second CPU is the master CPU; the first CPU is connected with the first watchdog timer 131*a* and the first monitoring control circuit unit 130B/130C and includes a control program that functions as the second monitoring control means 230B/230C for the second CPU.

As described above, with regard to claim 14 of the present invention, the first CPU and the second CPU configure a multicore CPU formed of a single integrated circuit device. Accordingly, there is demonstrated a characteristic that a pair of microprocessors is integrated so that the apparatus is downsized and the abnormality detection function is improved so that a control abnormality can be suppressed from becoming tangible. Moreover, almost all input signals to be utilized in transmission control are also required in engine control; therefore, there is demonstrated a characteristic that in comparison with a vehicle electronic control apparatus in which the transmission control apparatus is separated from the engine control apparatus and is integrated with the transmission, the number of wiring leads for the input signals can drastically be reduced and that in comparison with a vehicle electronic control apparatus in which input signals are transmitted and received through serial communication, the reliability of mutual cooperative control is raised.

The first CPU is the master CPU of the multicore CPU and the second CPU is the slave CPU of the multicore CPU; the first monitoring control circuit unit 130B further includes the first watchdog timer 131*a* that measures the ON/OFF period of the first pulse train signal WDS1 generated by the first CPU and generates the first reset signal RST11 so as to initialize and restart both the first and second CPUs when the ON/OFF period is the same as or longer than the first threshold-value time; when the checker CPU 110X generates the comparison abnormality signal, the first CPU moves to a predetermined initial step, where the first CPU immediately restarts its control operation; the first CPU further includes the runaway monitoring means 231*b* that measures the ON/OFF period of the second pulse train signal WDS2 generated by the second CPU and generates the second reset signal RST21 so as to initialize and restart the second CPU when the ON/OFF period is the same as or longer than the second threshold-value time.

As described above, with regard to claim 15 of the present invention, the first pulse train signal generated by the first CPU, which is the master CPU of a multicore CPU, is inputted, as a watchdog monitoring subject signal, to the first watchdog timer, and when a watchdog abnormality occurs, the first and second CPUs are reset; however, the second pulse train signal generated by the second CPU, which is the slave CPU, is monitored by the runaway monitoring means in the first CPU and is reset by the first CPU when a runaway abnormality occurs. Accordingly, there is demonstrated a characterized that even when the runaway state of the second CPU continues and the transmission control function is stopped, driving with a fixed transmission step can be implemented when the first CPU is not in the runaway-abnormality state. The first CPU having a fuel injection control function, which is indispensable for performing saving operation, is utilized along with the checker CPU so as to perform sequential determination on a control abnormality; thus, high-reliability control is implemented.

The first CPU is the slave CPU of the multicore CPU and the second CPU is the master CPU of the multicore CPU; the first monitoring control circuit unit 130C further includes the first watchdog timer 131*a* that measures the ON/OFF period of the first pulse train signal WDS1 generated by the first CPU and generates the first reset signal RST11 so as to initialize and restart both the first and second CPUs when the ON/OFF period is the same as or longer than the first threshold-value time; when the checker CPU 220X generates the comparison abnormality signal, the second CPU moves to a predetermined initial step, where the second CPU immediately restarts its control operation; the first CPU is provided with a synthesizing means that measures the ON/OFF period of the second pulse train signal WDS2 generated by the second CPU and performs correction so that the ON time or the OFF time of the first pulse train signal becomes the same as or longer than the first threshold-value time, when the ON/OFF period of the second pulse train signal WDS2 is the same as or longer than the second threshold-value time; as a result, when the second pulse train signal WDS2 is abnormal, the first reset signal RST11 generated by the first watchdog timer 131*a* initializes and restarts both the first CPU and the second CPU.

As described above, with regard to claim 16 of the present invention, the first pulse train signal generated by the first CPU, which is the slave CPU of a multicore CPU, is inputted, as a watchdog monitoring subject signal, to the watchdog timer, and when a watchdog abnormality occurs, the first and second CPUs are reset; however, the second pulse train signal generated by the second CPU, which is the master CPU, is monitored by the runaway monitoring means in the first CPU; when a runaway abnormality occurs, the first pulse train signal is stopped or its period is made extremely long so that the monitoring control circuit unit resets the first and second CPUs.

Therefore, when a runaway abnormality in the first CPU continues and the engine control function is stopped, the operation of the second CPU is also stopped and hence the transmission control cannot be implemented; however, when the engine is stopped, the transmission control is not required. In contrast, when a runaway abnormality in the second CPU continues and the transmission control function is stopped, the operation of the first CPU is also stopped and hence the fuel injection control is not implemented; thus, saving operation with a fixed transmission step cannot be implemented.

However, because when due to a malfunction attributed to noise or the like, a calculation abnormality temporarily occurs, the checker CPU controls the second CPU in such a way as to restore the second CPU to the initial step, the normal state is recovered before the second pulse train signal is stopped and hence the monitoring control circuit unit does not reset the first and second CPUs; provided an abnormality in the second CPU, which is the master CPU, continues, it is appropriate that the slave CPU is preliminarily reset, regardless of whether or not an abnormality exists therein. As a result, there is demonstrated a characteristic that it is made possible to cope with the fact that because when during high-speed driving, the transmission step erroneously moves to an abnormally low step, the engine brake works in a rapid and abrupt manner, resulting in a rear-end-collision accident or a spinning accident, a high reliability is required in the transmission control, in comparison with the engine control.

Embodiment 3

Figure 6A:
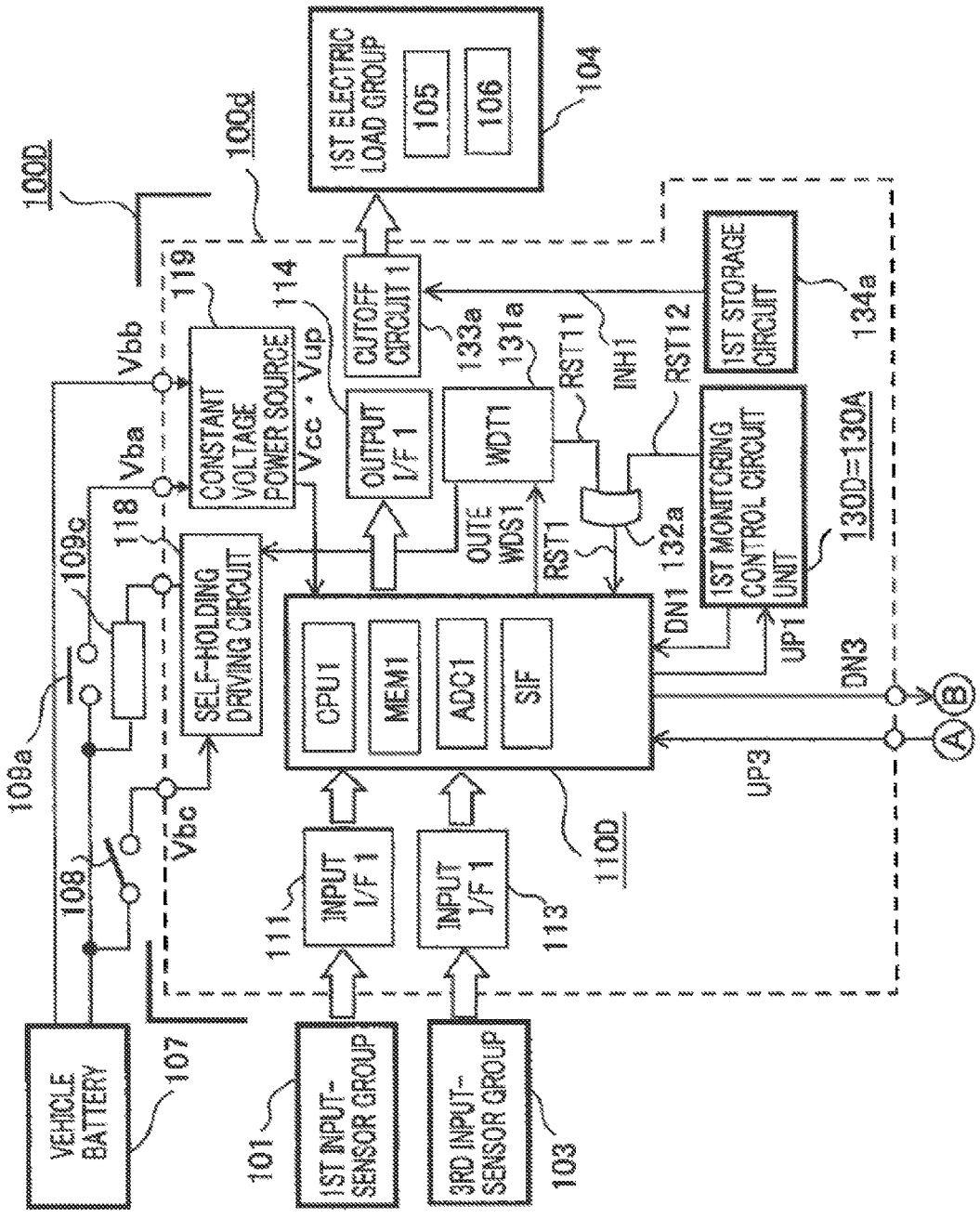
FIGS. 6A and 6B are block diagram illustrating the overall configuration of a vehicle electronic control apparatus according to Embodiment 3 of the present invention.
Figure 6B:
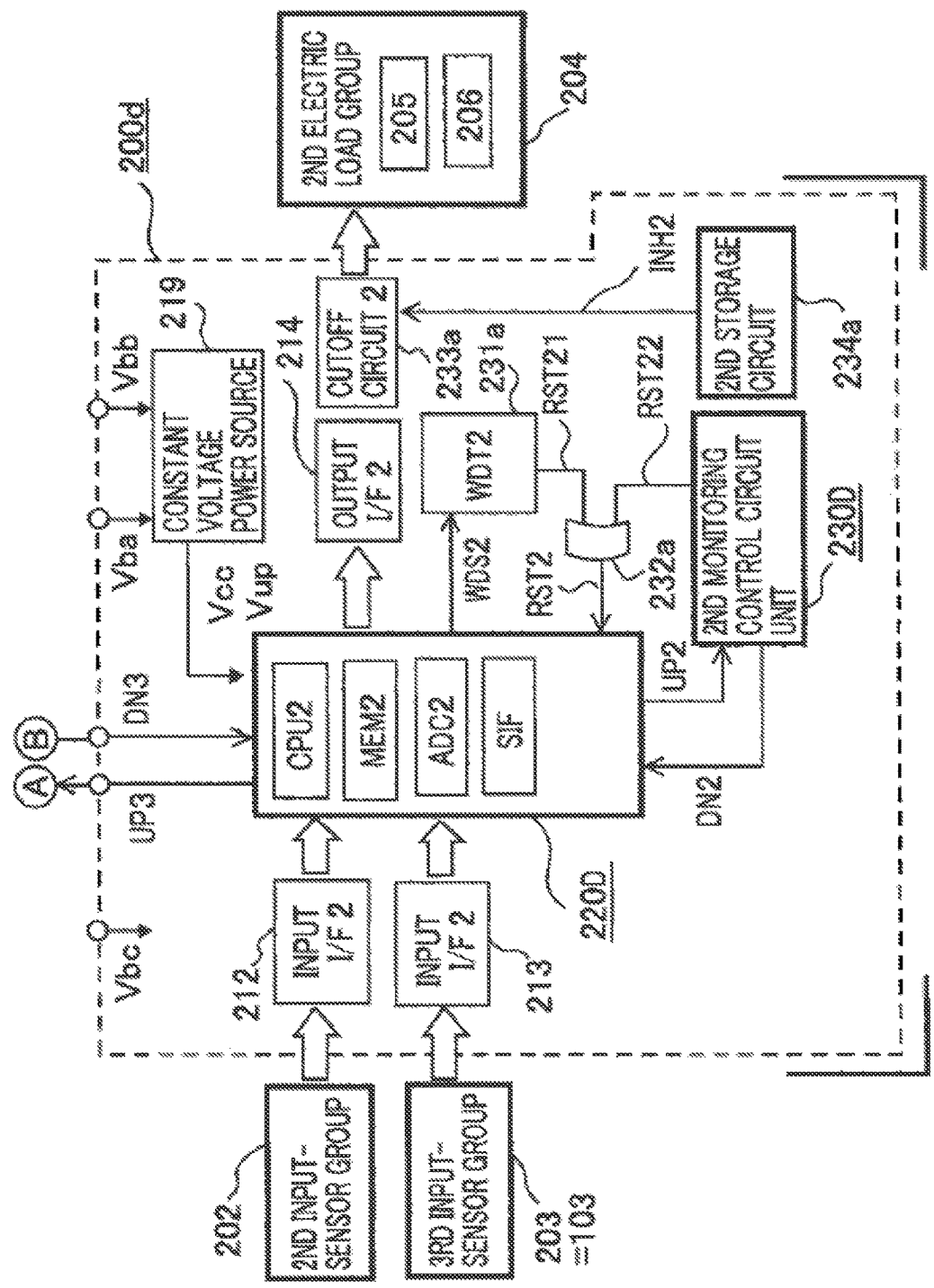

Next, a vehicle electronic control apparatus according to Embodiment 3 of the present invention will be explained. FIGS. 6A and 6B are block diagram representing the overall configuration of a vehicle electronic control apparatus according to Embodiment 3 of the present invention. The action and operation thereof, mainly the difference from the vehicle electronic control apparatus in FIGS. 1A and 1B, will be explained in detail, with reference to FIGS. 6A and 6B. In each of the drawings, the same reference characters denote the same or equivalent constituent elements, and the characters A and D denote constituent elements in Embodiment 1 and Embodiment 3, respectively; however, in Embodiment 3, the first and second CPUs are separately provided in different cases.

In FIGS. 6A and 6B, a vehicle electronic control apparatus 100D includes an engine control circuit unit 110D contained in a first case 100d and a transmission control circuit unit 220D contained in a second case 200d; the vehicle electronic control apparatus 100D is provided with a constant voltage power source 119/219 that is supplied with the electric power by way of the main power source terminal Vba, which is connected with the vehicle battery 107 by way of the output device 109a of the power supply relay 109c when the power switch 108 is closed, and the auxiliary power source terminal Vbb directly connected with the vehicle battery 107; the vehicle electronic control apparatus 100D is activated when the stabilized control voltage Vcc to be generated by the constant voltage power source 119/219 and the back-up voltage Vup for retaining the storage contents of a RAM are supplied thereto.

The first input-sensor group 101 includes various kinds of sensors inherent to engine control such as a crank angle sensor for detecting the rotation angle and the rotation speed of an engine, an air flow sensor for measuring the intake amount of air that passes through a throttle intake valve, a throttle position sensor for detecting the intake valve opening degree, and a gas sensor for detecting the oxygen concentration in an exhaust-gas sensor. The third input-sensor group 103 includes various kinds of sensors to be utilized in both engine control and transmission control such as a vehicle speed sensor, an accelerator position sensor for detecting the step-on degree of an accelerator pedal, and a gearshift sensor for detecting the selection position of a gearshift lever. The second input-sensor group 202 includes various kinds of sensors inherent to transmission control such as an oil temperature sensor or an oil pressure sensor in a transmission.

The third input-sensor group 203 is the same as the third input-sensor group 103, described above. The first electric load group 104 is an engine control load to be controlled in response to the respective operation states of the first and third input-sensor groups 101 and 103 and includes at least the fuel-injection electromagnetic valve 105 and the intake valve opening degree control motor 106 that are disposed for each cylinder; in the case where the control subject is an gasoline engine, the first electric load group 104 further includes an ignition plug disposed for each cylinder.

In addition, there is provided a fail-safe mechanism for compulsory and mechanical resetting so that when power supply to the intake valve opening degree control motor 106 is stopped, the opening degree is set to the fixed intake valve opening degree at which a rotation speed higher than the idling rotation speed can be obtained. A second electric load group 204 is a transmission control load to be controlled in response to the respective operation states of the second and third input-sensor groups 202 and 203 (103) and includes at least a selection electromagnetic valve 205 for selecting forward or backward movement and a gear-shifting electromagnet valve 206 for changing the transmission ratio continuously or in a multi-step manner.

In addition, when power supply to the gear-shifting electromagnet valve 206 is stopped, a middle- or high-speed driving transmission ratio higher than the middle transmission ratio in the gear-shift range can be obtained. The engine control circuit unit 110D is configured mainly with the first CPU (although in FIGS. 6A and 6B, illustrated as the reference character "CPU1", the first CPU is described simply as the first CPU in the following explanation for the sake of avoiding the complexity and the reference character "CPU1" will be omitted) and includes the first memory MEM1 including a nonvolatile program memory, which is, for example, a flash memory, a data memory, which is part of the region of the program memory or another nonvolatile memory that can electrically perform reading and writing, and a volatile RAM, a multi-channel A/D converter ADC1, and the communication interface circuit SIF.

The engine control circuit unit 220D is configured mainly with the second CPU (although in FIGS. 6A and 6B, illustrated as the reference character "CPU2", the second CPU is described simply as the second CPU in the following explanation for the sake of avoiding the complexity and the reference character "CPU2" will be omitted) and includes the second memory MEM2 including a nonvolatile program memory, which is, for example, a flash memory, a data memory, which is part of the region of the program memory or another nonvolatile memory that can electrically perform reading and writing, and a volatile RAM, a multi-channel A/D converter ADC2, and the communication interface circuit SIF.

In the foregoing explanation, the third input-sensor group that is commonly utilized by the first and second CPUs is separately connected with the first and second CPUs; however, it may be allowed that part of the third input-sensor group is connected with only one of the first and second CPUs and sensor signals are transmitted to the other one by way of the serial interface circuit SIF.

The first watchdog timer 131a measures the pulse width of the first pulse train signal WDS1 generated by the first CPU; when the pulse width becomes the same as or longer than the first threshold-value time, the first watchdog timer 131a generates the first reset signal RST11 so as to initialize and restart the first CPU. A first monitoring control circuit unit 130D is the same as the first monitoring control circuit unit 130A, described with reference to FIGS. 2A and 2B; while performing serial communication with the first CPU through the downstream signal DN1 and the upstream signal UP1, the first monitoring control circuit unit 130D determines whether or not the first CPU normally performing its control operation; in the case where a control abnormality is detected, the first monitoring control circuit unit 130D generates the control first reset signal RST12 so as to reset the first CPU.

When any one of the first reset signal RST11 and the control first reset signal RST12 is generated, the first logical sum circuit 132a generates the composite first reset signal RST1 so as to reset the first CPU.

When the power switch 108 is closed, the self-holding circuit 118 energizes the power supply relay 109c; however, in the case where the first CPU is once activated and the first watchdog timer 131a generates an output permission signal OUTE, the power supply is continued by the operation of the self-holding circuit 118 even when the power switch 108 is opened. Accordingly, after the power switch 108 is opened, the first CPU and an after-mentioned second CPU stop the operation thereof, and the respective CPUs perform saving storage of learning information and the like; then, the first CPU stops the first pulse train signal WDS1, so that the power supply relay 109c is de-energized. In this regard, however, when the second CPU is stopped and the serial-communication signal is stopped, the first CPU stops the first pulse train signal WDS1.

When the count or the frequency of abnormalities detected by the first monitoring control circuit unit 130D exceeds a predetermined threshold value, the first storage circuit 134a stores the count or the frequency and supplies the first cutoff signal INH1 to the first cutoff circuit 133a; the first cutoff circuit 133a stops supply of the electric power, out of the whole electric power for the output interface circuit 114, that is for the intake valve opening degree control motor 106.

A second watchdog timer 231a measures the pulse width of the second pulse train signal WDS2 generated by the second CPU; when the pulse width becomes the same as or longer than the second threshold-value time, the second watchdog timer 231a generates the second reset signal RST21 so as to initialize and restart the second CPU. A second monitoring control circuit unit 230D corresponds to the second monitoring control circuit unit 230A, described with reference to FIGS. 3A and 3B; the second monitoring control means 230A is configured with software to be implemented by the first CPU, but, the second monitoring control circuit unit 230D is configured with the same hardware as the first monitoring control circuit unit 130D is configured.

While performing serial communication with the second CPU through the downstream signal DN2 and the upstream signal UP2, the second monitoring control circuit unit 230D determines whether or not the second CPU normally performing its control operation; in the case where a control abnormality is detected, the second monitoring control circuit unit 230D generates the control second reset signal RST22 so as to reset the second CPU. When any one of the second reset signal RST21 and the control second reset signal RST22 is generated, the second logical sum circuit 232a generates the composite second reset signal RST2 so as to reset the second CPU.

When the count or the frequency of abnormalities detected by the second monitoring control means 230D exceeds a predetermined threshold value, the second storage circuit 234a stores the count or the frequency and supplies the second cutoff signal INH2 to the second cutoff circuit 233a; the second cutoff circuit 233a stops supply of the electric power, out of the whole electric power for the output interface circuit 214, that is for the gear-shifting electromagnet valve 206.

Figure 7A:
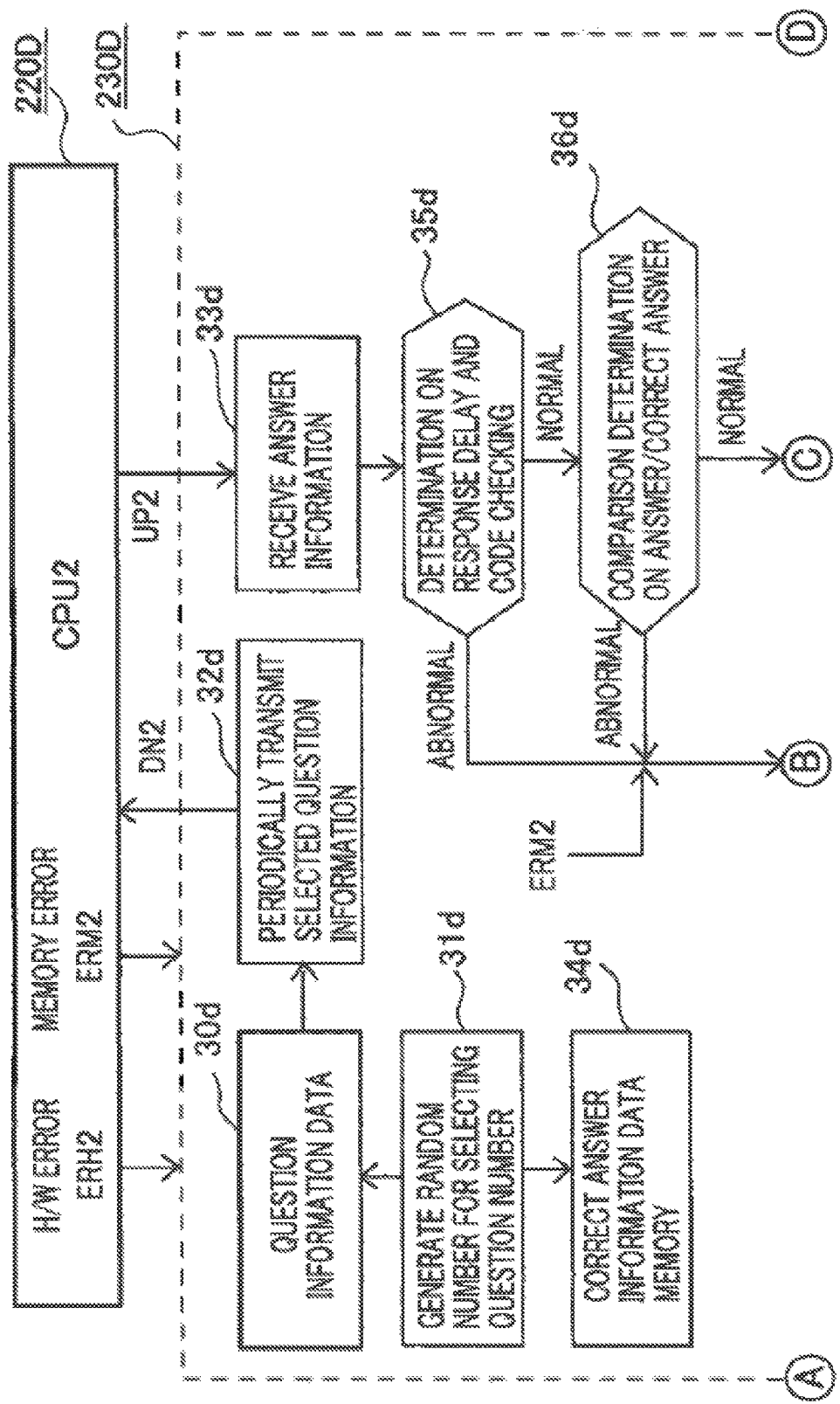
FIGS. 7A and 7B are block diagram illustrating the configuration of a second monitoring control circuit unit in the vehicle electronic control apparatus according to Embodiment 3 of the present invention.
Figure 7B:
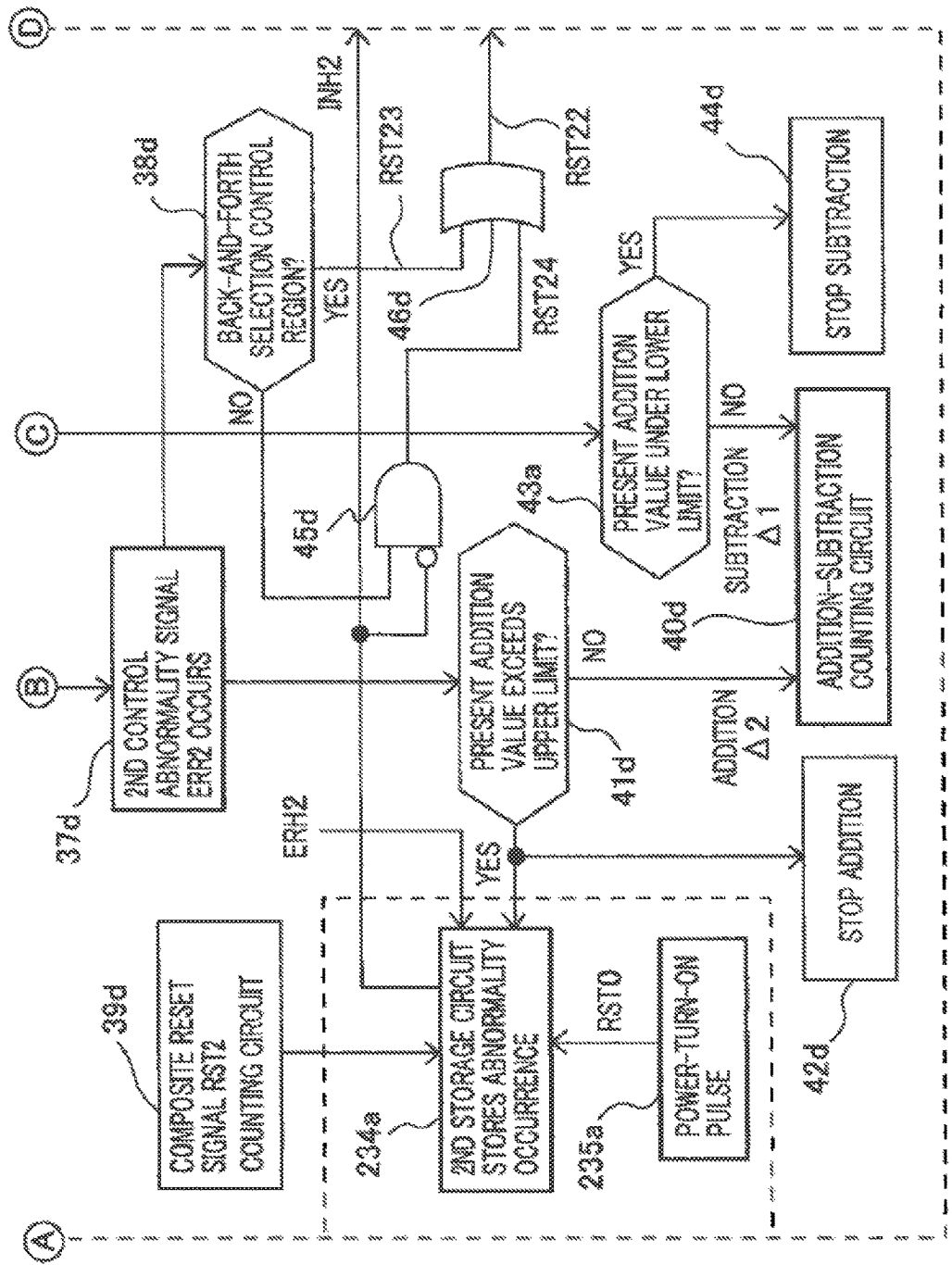

Next, the configuration of the second monitoring control circuit unit 230D will be explained. FIGS. 7A and 7B are block diagram illustrating the configuration of the second monitoring control circuit unit in the vehicle electronic control apparatus according to Embodiment 3 of the present invention. Hereinafter, the difference from the second monitoring control means 230A illustrated in FIGS. 3A and 3B will mainly be explained with reference to FIGS. 7A and 7B. The second monitoring control means 230A in FIGS. 3A and 3B have constituent elements 30b through 46b that are each configured with software; however, the second monitoring control means 230D in FIGS. 7A and 7B are configured with constituent elements 30d through 46d that are each formed mainly of hardware; the same reference characters denote the same or equivalent constituent elements. The main difference between the second monitoring control means 230A and the second monitoring control circuit unit 230D is the fact that although the second monitoring control means 230A includes the runaway monitoring means 231b corresponding to the second watchdog timer, the second monitoring control circuit unit 230D collaborates with the second watchdog timer 231a.

(2) Detailed Description of Operation and Action

Next, the operation and the action of the vehicle electronic control apparatus according to Embodiment 3 of the present invention, configured as illustrated in FIGS. 6A and 6B, FIGS. 7A and 7B, will be explained in detail. The first monitoring control circuit unit 130D applied to the vehicle electronic control apparatus in FIGS. 6A and 6B will be explained with reference to FIGS. 2A and 2B in which the first monitoring control circuit unit 130A is illustrated.

At first, in FIGS. 6A and 6B, FIGS. 2A and 2B, when the power switch 108 is closed, the power supply relay 109c is driven by way of the self-holding circuit 118 and hence the output device 109a thereof is closed; thus, the vehicle battery 107 starts power supply to the main power source circuit of the constant voltage power source 119/219; then, the control power source Vcc is applied to the first CPU included in the engine control circuit unit 110D and the second CPU included in the transmission control circuit unit 220D so as to make them start their control operation.

The first CPU performs driving control of the first electric load group 104 in response to the operation states of the first input-sensor group 101 and the third input-sensor group 103 and the contents of the control program in the first memory MEM1; the fuel-injection electromagnetic valve 105 in the first electric load group 104 responds to a fuel injection control program; the intake valve opening degree control motor 106 responds to a valve-opening control program. The valve-opening drive mechanism of the intake valve includes an initial-position returning mechanism that can perform saving operation based on a fixed intake valve opening degree when power supply to the intake valve opening degree control motor 106 is stopped.

The first CPU has a self-diagnosis function of detecting a wire-breaking or short-circuit abnormality in the input/output wiring leads related to the valve-opening control so as to generate the first H/W abnormality signal ERH1 and performing code checking in the memory region related to the valve-opening control so as to generate the first memory abnormality signal ERM1. The first watchdog timer 131a measures the ON-time width and the OFF-time width of the first pulse train signal WDS1 generated by the first CPU; when the time width of the first pulse train signal WDS1 becomes the same as or longer than the first threshold-value time, the first watchdog timer 131a generates the first reset signal RST11 so as to initialize and restart the first CPU; in the case where the first pulse train signal WDS1 is normal, the first watchdog timer 131a generates the output permission signal OUTE so as to maintain the driving state of the power supply relay 109c by way of the self-holding circuit 118.

As illustrated in FIGS. 2A and 2B, the first monitoring control circuit unit 130D has the correct answer information data memory 34a for the transmission question data 30a, sequentially transmits a plurality of question information pieces related to at least a valve-opening control output creation program to the first CPU in driving operation, receives from the first CPU answer information corresponding to the question information, and then compares the answer information with the correct answer information preliminarily stored in the first monitoring control circuit unit 130D; the first monitoring control circuit unit 130D also has the first gate circuit 45a and the first control abnormality determination circuits 35a/36a for determining whether or not a code check abnormality and an answering-response delay exist in the answer information so as to determine whether or not the first control abnormality including a communication abnormality and a question-answer abnormality exists and then to create the first control abnormality signal ERR1.

The first storage circuit 134a is set when a first state is established in which the occurrence count or the occurrence frequency of each of the first reset signal RST11 and the first control abnormality signal ERR1 becomes the same as or larger than a predetermined threshold value; the first storage circuit 134a is initialized by the reset circuit 135a when the power switch 108 is closed. When the first storage circuit 134a stores the occurrence of an abnormality, the first cutoff circuit 133a stops power supply to the intake valve opening degree control motor 106.

When the first storage circuit 134a has not yet stored the occurrence of an abnormality, the first gate circuit 45a resets the first CPU through the first reset signal RST11 and the first control abnormality signal ERR1; after the first storage circuit 134a has stored the occurrence of an abnormality, the first gate circuit 45a prohibits the first control abnormality signal ERR1 from performing reset processing of the first CPU so that a continuous non-runaway repeated abnormality related to the valve-opening control is suppressed from providing an effect to the fuel injection control.

The concept of a question-answer abnormality in this SPECIFICATION is as explained already; however, for example, provided in the first CPU, there exists a monitoring control program that functions as a self-check means of "adding inputs X and Y so as to obtain an output Z and then determining whether or not the output Z is a normal value within a threshold value range Z1 to Z2", whether or not this determination has been correctly performed is determined on an assumption that in the normal state, the addition calculation and the comparison calculation are correctly implemented. Therefore, when the result of the comparison calculation is "abnormal", it is determined that the state of being "abnormal" can correctly be detected, and whether or not a control abnormality has occurred is not asked.

However, strictly speaking, a comparison determination calculation is performed by utilizing known algebraic inputs A and B and an algebraic threshold value CO, and then the result is compared with the known correct answer information, so that the authenticity of the calculation is testified; provided the authenticity is not testified, it cannot be concluded that the inputs X and Y are abnormal, and hence it becomes clear that a control abnormality has occurred in the calculation processing. In such a manner as described above, when a question-answer abnormality occurs, the first control abnormality signal ERR1 is generated; then, the selection first reset signal RST14, the control first reset signal RST12, and the composite first reset signal RST1 are sequentially generated in that order, so that the first CPU is initialized and then restarted.

As a result, in the case where the control abnormality is a temporary one caused by a malfunction attributed to noise, the normal state is restored; however, in the case where a hardware abnormality in the first CPU has caused the control abnormality, the first CPU moves into a runaway abnormality from which the first CPU cannot return to the initial step and hence the first watchdog timer may be activated. Even when the abnormality does not lead to a runaway abnormality, there occurs a non-runaway repeated abnormality in which even when the first CPU is reset, the same control abnormality recurrently occurs. In this case, because the addition-subtraction counting circuit 40a in FIGS. 2A and 2B perform sequential addition of the addition variation value Δ2 (=3), the upper limit value 13 of the addition-subtraction counting circuit 40a is exceeded at a time when the fifth abnormality occurs; then, the first storage circuit 134a stores the occurrence of an abnormality, so that the driving of the intake valve opening degree control motor 106 is stopped by way of the first cutoff circuit 133a and the first gate circuit 45a prohibits the first control abnormality signal ERR1 from resetting the first CPU.

As a result, it is prevented that the non-runaway repeated abnormality substantially stops the first CPU and hence fuel injection cannot be implemented. In the case of the addition-subtraction counting circuit 40a, when the occurrence frequency of an abnormality, including the first control abnormality signal ERR1 and the first memory error ERM1, that is related to the valve-opening control is the same as or smaller than 25% (the occurrence of an abnormality and the normal operation are sequentially repeated once and thrice, respectively), the first storage circuit 134a does not decisively store the occurrence of an abnormality; when the occurrence frequency of an abnormality is the same as or larger than 33% (the occurrence of an abnormality and the normal operation are sequentially repeated once and twice, respectively), the first storage circuit 134a decisively stores the occurrence of an abnormality.

In contrast, the composite reset signal RST1 including the first reset signal RST11 generated by the first watchdog timer 131a is simply counted by the reset signal counting circuit 39a; when the counted value reaches a predetermined threshold value, the first storage circuit 134a stores the occurrence of an abnormality. In this regard, however, the reset signal counting circuit 39a may count only the first reset signal RST11; alternatively, the occurrence frequency of an abnormality may be detected through a method utilizing an addition-subtraction counting circuit that replaces the reset signal counting circuit 39a.

In the foregoing description, a question-answer abnormality related to the valve-opening control has been explained; however, in the case where the explanation is expanded to the fuel injection control region, the first region determination circuit 38a becomes effective; in the case where the first control abnormality signal ERR1 is related to the first address region (fuel injection control region) of the first memory MEM1, the first region determination circuit 38a generates the continuity first reset signal RST13 so as to always initialize and then restart the first CPU, regardless of how large the occurrence count or the occurrence frequency is.

Next, in FIGS. 6A and 6B, FIGS. 7A and 7B, the second CPU performs driving control of the second electric load group 204 in response to the operation states of the second input-sensor group 202 and the third input-sensor group 203 (103) and the contents of the control program in the second memory MEM2; the back-and-forth selection electromagnetic valve 205 in the second electric load group 204 responds to the selection control program; the gear-shifting electromagnet valve 206 responds to the transmission control program.

The transmission to be controlled by the second CPU includes a transmission ratio fixation mechanism that makes it possible to travel at least forward at a fixed transmission ratio suitable for middle- or high-speed driving when the second CPU stops its operation. The second CPU has a self-diagnosis function of detecting a wire-breaking or short-circuit abnormality in the input/output wiring leads related to the transmission control so as to generate the second H/W abnormality signal ERH2 and performing code checking in the memory region related to the transmission control so as to generate the second memory abnormality signal ERM2.

The second watchdog timer 231*a* measures the ON-time width and the OFF-time width of the second pulse train signal WDS2 generated by the second CPU; when the pulse width becomes the same as or longer than the second threshold-value time, the second watchdog timer 231*a* generates the second reset signal RST21 so as to initialize and restart the second CPU.

As illustrated in FIGS. 7A and 7B, the second monitoring control circuit unit 230D has the correct answer information data memory 34*d* for the transmission question data 30*d*, sequentially transmits a plurality of question information pieces related to at least a transmission control output creation program to the second CPU in driving operation, receives from the second CPU answer information corresponding to the question information, and then compares the answer information with the correct answer information preliminarily stored in the second monitoring control circuit unit 230D; the second monitoring control circuit unit 230D also has the second gate circuit 45*d* and the second control abnormality determination circuits 35*d* and 36*d* for determining whether or not a code check abnormality and an answering-response delay exist in the answer information so as to determine whether or not the second control abnormality including a communication abnormality and a question-answer abnormality exists and then to create the second control abnormality signal ERR2.

The second storage circuit 234*a* is set when a second state is established in which the occurrence count or the occurrence frequency of each of the second reset signal RST21 and the second control abnormality signal ERR2 becomes the same as or larger than a predetermined threshold value; the second storage circuit 234*a* is initialized by the reset circuit 235*a* when the power switch 108 is closed. When the second storage circuit 234*a* stores the occurrence of an abnormality, the second cutoff circuit 233*a* stops power supply to the gear-shifting electromagnet valve 206.

When the second storage circuit 234*a* has not yet stored the occurrence of an abnormality, the second gate means 45*d* resets the second CPU through the second reset signal RST21 and the second control abnormality signal ERR2; after the second storage circuit 234*a* has stored the occurrence of an abnormality, the second gate means 45*d* prohibits the second control abnormality signal ERR2 from performing reset processing of the second CPU so that a continuous non-runaway repeated abnormality related to the transmission control is suppressed from providing an effect to the back-and-forth selection control.

The composite reset signal RST2 including the second reset signal RST21 generated by the second watchdog timer 231*a* is simply counted by the reset signal counting circuit 39*d*; when the counted value reaches a predetermined threshold value, the second storage circuit 234*a* stores the occurrence of an abnormality. In this regard, however, the reset signal counting circuit 39*d* may count only the second reset signal RST21; alternatively, the occurrence frequency of an abnormality may be detected through a method utilizing an addition-subtraction counting circuit that replaces the reset signal counting circuit 39*d*.

In the foregoing description, a question-answer abnormality related to the transmission control has been explained; however, in the case where the explanation is expanded to the back-and-forth selection control region, the second region determination circuit 38*d* becomes effective; in the case where the second control abnormality signal ERR2 is related to the first address region (selection control region) of the second memory MEM2, the second region determination means 38*d* generates the continuity second reset signal RST23 so as to always initialize and then restart the second CPU, regardless of how large the occurrence count or the occurrence frequency is.

(3) Gist and Feature of Embodiment 3

As is clear from the foregoing explanation, in the vehicle electronic control apparatus 100D according to Embodiment 3 of the present invention, the first CPU and the second CPU, which are microprocessors provided in the engine control circuit unit 110D and the transmission control circuit unit 220D, respectively, collaborate with each other; the vehicle electronic control apparatus 100D is configured in such a way that the first CPU and the second CPU are separately mounted on the first circuit board contained in the first case 100*d* and on the second circuit board contained in the second case 200*d*, respectively; the first monitoring control circuit unit 130D including at least the first watchdog timer 131*a* is connected with the first CPU; the first CPU operates with opening/closing signals or analogue signals, as input signals, to be obtained from the first input-sensor group 101 dedicated to the engine control and the third input-sensor group 103 utilized commonly in the engine control and the transmission control, and generates at least a fuel injection control output for the fuel-injection electromagnetic valve 105 and a valve-opening control output for the intake valve opening degree control motor 106 for the intake valve provided in the intake throttle; the valve-opening drive mechanism of the intake valve includes an initial-position returning mechanism that can perform saving operation based on a fixed intake valve opening degree when power supply to the intake valve opening degree control motor 106 is stopped.

The operation of the second CPU is monitored by the second watchdog timer 231*a* included in the second monitoring control circuit unit 230D; the transmission to be controlled by the second CPU includes a transmission ratio fixation mechanism that makes it possible to travel at least forward at a fixed transmission ratio suitable for middle- or high-speed driving when the second CPU stops its operation; the first watchdog timer 131*a* measures the ON-time width and the OFF-time width of the first pulse train signal WDS1 generated by the first CPU; when the pulse width becomes the same as or longer than the first threshold-value time, the first watchdog timer 131*a* generates the first reset signal RST11 so as to initialize and restart the first CPU; the first monitoring control circuit unit 130D is provided with the first control abnormality determination circuits 35*a*/36*a* including the communication abnormality determination circuit 35*a* and the question-answer abnormality determination circuit 36*a*, a mode selection first circuit, and the first gate circuit 45*a*.

The first control abnormality determination circuit 35*a*/36*a* has the correct answer information data memory 34*a* for the transmission question data 30*a*, sequentially transmits a plurality of question information pieces related to at least the valve-opening control output creation program to the first CPU in driving operation, receives from the first CPU answer information corresponding to the question information, and then compares the answer information with the correct answer information preliminarily stored in the first monitoring control circuit unit 130D; the first control abnormality determination circuit 35*a*/36*a* determines whether or not a code check abnormality and an answering-response delay exist in the answer information so as to determine whether or not the first control abnormality including a communication abnormality and a question-answer abnormality exists and then to create the first control abnormality signal ERR1.

The mode selection first circuit has the first storage circuit 134a that is set when a first state is established in which the occurrence count or the occurrence frequency of each of the first reset signal RST11 and the first control abnormality signal ERR1 becomes the same as or larger than a predetermined threshold value, the first cutoff circuit 133a that stops power supply to the intake valve opening degree control motor 106 when the first storage circuit stores the occurrence of an abnormality, and the reset circuit 135a that preliminarily initializes the first storage circuit 134a when the power switch 108 for starting power supply to the first CPU is closed; the first gate circuit 45a resets the first CPU through the first reset signal RST11 and the first control abnormality signal ERR1 when the first state has not been established; after the first storage circuit 134a has stored the occurrence of an abnormality, the first gate circuit 45a prohibits the first control abnormality signal ERR1 from performing reset processing of the first CPU so that a continuous non-runaway repeated abnormality related to the valve-opening control is suppressed from providing an effect to the fuel injection control.

The second CPU operates with opening/closing signals or analogue signals, as input signals, to be obtained from the second input-sensor group 202 dedicated to the transmission control and the third input-sensor group 203 utilized commonly in the engine control and the transmission control, and generates a selection control output for the back-and-forth selection electromagnetic valve 205 that responds to the selection position of the shift lever and a transmission control output for the gear-shifting electromagnet valve 206 that determines a no-step or at least multistep transmission ratio; the transmission includes the transmission ratio fixation mechanism that sets the transmission ratio to the fixed transmission ratio for the middle- or high-speed driving with the middle transmission ratio or higher when power supply to the gear-shifting electromagnet valve 206 is stopped and that sets the transmission ratio to the fixed transmission ratio for fixed forward driving when the operation of the second CPU is stopped; the second watchdog timer 231a measures the ON-time width and the OFF-time width of the second pulse train signal WDS2 generated by the second CPU; when the pulse width becomes the same as or longer than the second threshold-value time, the second watchdog timer 231a generates the second reset signal RST21 so as to initialize and restart the second CPU.

The monitoring control circuit unit 230D is provided with the second control abnormality determination circuit 35d/36d including the communication abnormality determination circuit 35d and the question-answer abnormality determination circuit 36d, the mode selection second circuit, and the second gate circuit 45d; the second control abnormality determination circuit 35d/36d has the correct answer information data memory 34d for the transmission question data 30d, sequentially transmits a plurality of question information pieces related to at least the transmission control output creation program to the second CPU in driving operation, receives from the second CPU answer information corresponding to the question information, and then compares the answer information with the correct answer information preliminarily stored in the second monitoring control circuit unit 230D; the second control abnormality determination circuit 35b/36b determines whether or not a code check abnormality and an answering-response delay exist in the answer information so as to determine whether or not the second control abnormality including a communication abnormality and a question-answer abnormality exists and then to create the second control abnormality signal ERR2; the mode selection second circuit has the second storage circuit 234a that is set when the second state is established in which the occurrence count or the occurrence frequency of each of the second reset signal RST21 and the second control abnormality signal ERR2 becomes the same as or larger than a predetermined threshold value, the second cutoff circuit 233a that stops power supply to the gear-shifting electromagnet valve 206 when the second storage circuit stores the occurrence of an abnormality, and the reset circuit 235a that preliminarily initializes the second storage circuit 234a when the power switch 108 for starting power supply to the second CPU is closed; the second gate circuit 45b resets the second CPU through the second reset signal RST21 and the second control abnormality signal ERR2 when the second state has not been established; after the second storage circuit 234a has stored the occurrence of an abnormality, the second gate means 45b prohibits the second control abnormality signal ERR2 from performing reset processing of the second CPU so that a continuous non-runaway repeated abnormality related to the transmission control is suppressed from providing an effect to the back-and-forth selection control.

As described above, with regard to claim 4 of the present invention, the second CPU collaborates with the first CPU; the second storage circuit stores the occurrence of an abnormality when the second state is established in which the occurrence count or the occurrence frequency of each of the second reset signal generated by the second watchdog timer and the second control abnormality signal generated by the second control abnormality determination circuit becomes the same as or larger than a predetermined threshold value, and stops power supply to the gear-shifting electromagnet valve so as to set the transmission ratio to the fixed transmission ratio for middle- or high-speed driving; until the second storage circuit stores the occurrence of an abnormality, the second reset signal and the second control abnormality signal implements reset processing of the second CPU; after the second storage circuit has stored the occurrence of an abnormality, the second reset signal continues the reset processing of the second CPU; however, the second control abnormality signal is prohibited from implementing the reset processing of the second CPU.

Accordingly, abnormality monitoring by the second watchdog timer on a sporadic abnormality or a continuous abnormality in the second CPU and initialization/restarting processing based on the abnormality monitoring are always effective; in the case where after the driving is started, the occurrence count or the occurrence frequency of an abnormality is smaller than a predetermined value, the second control abnormality signal generated by the second control abnormality determination circuit, related to the transmission control, initializes and restarts the second CPU so as to perform recovery processing for the sporadic abnormality, so that the back-and-forth selection control and the transmission control can normally be implemented; in the case where the occurrence of an abnormality continues, the recovery processing is stopped and hence the second CPU is not reset for a non-runaway repeated abnormality that is a continuous abnormality but does not cause any run-away abnormality in the second CPU. As a result, there is demonstrated a characteristic that although the transmission control by the second CPU cannot be implemented, the back-and-forth selection control can be implemented so that back-and-forth saving operation becomes effective.

When a run-away abnormality in the second CPU occurs, the second watchdog timer performs initialization and restarting; therefore, in the case where the run-away abnormality is contingent and sporadic, at least back-and-forth selection control can be restored to the normal state. Embodiment 4 also demonstrates the same characteristic.

The second CPU is bus-connected with the second RAM, which is a calculation-processing RAM, a nonvolatile second data memory, and the second memory MEM2 including a nonvolatile second program memory; the second memory MEM2 is divided into an address first region including control data and control programs related to a selection control means for the selection electromagnetic valve 205 and a power supply control means for the power source relay for auxiliary apparatuses including a hydraulic pump, an address second region including control data and control programs related to the gear-shift control means for the gear-shifting electromagnet valve 206, and an address third region including others; the address third region or the address first region contains a program that functions as a pulse generation means for generating the second pulse train signal and a transmission control stopping means, which is a program that switches the control flow so that the control program related to the transmission control means is not implemented when the second storage circuit stores the occurrence of an abnormality; the transmission control stopping means is implemented before the transmission control program is implemented after the second CPU has been initialized.

As described above, with regard to claim 9 of the present invention, the second memory bus-connected with the second CPU is divided into the address first region related to the back-and-forth selection control, the address second region related to the transmission control, and the address third region related to other control items; the address third region or the address first region includes a transmission control stopping program that disconnects the control program which works as an unnecessary transmission control means, when due to the occurrence of an abnormality, control based on a fixed transmission ratio is implemented. Accordingly, there is demonstrated a characteristic that when the contents of an abnormality determined by the second control abnormality determination circuit is a run-away abnormality in the second CPU, the control program is disconnected so that the contributing factor of the runaway of the second CPU is removed, the back-and-forth selection control becomes effective, and hence saving operation based on a fixed transmission ratio can be implemented. When the operation of the second CPU is stopped, forward-fixed saving operation with a fixed transmission ratio can be implemented. Embodiment 4 also demonstrates the same characteristic.

A plurality of question information pieces generated by the second monitoring control circuit unit 230D are a plurality of question numbers, which are different numbers divided in accordance with the address regions of the second memory MEM2; the second monitoring control circuit unit 230D is provided with the second region determination circuit 38d; the second control abnormality determination circuit 35d/36d generates the second control abnormality signal ERR2 and an identification signal corresponding to the address region where the abnormality has occurred; when the second control abnormality signal ERR2 is related to the address first region of the second memory MEM2, the second region determination circuit 38d always initializes and restarts the second CPU, regardless of how large the occurrence count or the occurrence frequency of the second control abnormality signal ERR2 is.

As described above, with regard to claim 10 of the present invention, the region of the question-answer abnormality determination by the second monitoring control circuit unit is expanded from the transmission control region to the selection control region, and the second control abnormality signal generated in the expanded region always resets, initializes, and restarts the second CPU. Therefore, there is demonstrated a characteristic that for a contingent and sporadic abnormality in the fuel injection control region, which does not lead to a run-away abnormality and hence cannot be detected by the second watchdog timer, and an abnormality in which the contingent and sporadic abnormality recurrently continues, the second control abnormality signal initializes and restarts the second CPU so that the normal state can be recovered or for an abnormality under which the normal state cannot be recovered, the second CPU can be stopped. Embodiment 4 also demonstrates the same characteristic.

The third or the second address region of the second program memory contains a monitoring control program that includes a disconnection/short-circuit abnormality detection means for the gar-shifting electromagnet valve 206 and a disconnection/short-circuit abnormality detection means for the gear-shift sensor and the vehicle speed sensor and that functions as a self-check means for generating the second H/W abnormality signal ERH2 when an abnormality is detected; monitoring control operation by the self-check means is monitored by the second control abnormality determination circuit 35d/36d of the second monitoring control circuit unit 230D; when the self-check means detects the occurrence of an abnormality, the second storage circuit 234a stores the occurrence of an abnormality and stops power supply to the gar-shifting electromagnet valve 206; even when after that, the second control abnormality signal ERR2 for the second address region occurs, the second control abnormality signal ERR2 is prohibited from performing reset processing of the second CPU.

As described above, with regard to claim 11 of the present invention, the second CPU has a self-check means that determines whether or not there exists a hardware abnormality related to transmission control, and stops power supply to the gear-shifting electromagnet valve when a self-check abnormality occurs; even when after that, the second control abnormality signal occurs, the second control abnormality signal is prohibited from performing reset processing of the second CPU. Therefore, there is demonstrated a characteristic that with regard to the transmission control, there is detected a hardware abnormality and a control abnormality in which a hardware abnormality, even though occurring, cannot be detected so that the mode can be moved to saving operation with a fixed transmission ratio. Moreover, there is demonstrated a characteristic that in the case where a control abnormality, even though continuing, is related at least to the address second region, the second CPU is not reset and hence the back-and-forth selection control useful for saving operation can be continued. Embodiment 4 also demonstrates the same characteristic.

The address third region of the second program memory contains a control program that functions as a second memory abnormality determination means for applying a sum check or a code check represented by a CRC check to the second memory MEM2 and generating the second memory abnormality signal ERM2; the second memory abnormality determination means also creates an identification signal corresponding to the address region where the second memory abnormality signal ERM2 is generated; the second memory abnormality signal ERM2, as part of the second control abnormality signal ERR2, undergoes logical sum processing.

As described above, with regard to claim 12 of the present invention, the second CPU is provided with the second memory abnormality determination means corresponding to the address first, address second, and address third regions of the second memory; there are generated the second memory abnormality signal and an identification signal for the address region for which the second memory abnormality signal is generated; then, a logical sum operation is applied to the second memory abnormality signal, the identification signal, and the second control abnormality signal. Therefore, there is demonstrated a characteristic that for a contingent and sporadic abnormality in the back-and-forth selection control region, which does not lead to a run-away abnormality and hence cannot be detected by the second watchdog timer, and an abnormality in which the contingent and sporadic abnormality recurrently continues, the second control abnormality signal initializes and restarts the second CPU so that the normal state can be recovered or for an abnormality under which the normal state cannot be recovered, the second CPU can be stopped. Moreover, there is demonstrated a characteristic that in the case where a memory abnormality, even though continuing, is related at least to the address second region, the second CPU is not reset and hence the back-and-forth selection control useful for saving operation can be continued. Embodiment 4 also demonstrates the same characteristic.

Letting T1 and T2 denote the respective allowable times, for the first CPU and the second CPU, of the question-answer period from a time when the question information is transmitted to a time when answer information is received, the equation T1≥T2 is established.

As described above, with regard to claim 13 of the present invention, the question-answer-period allowable time T2 for the second CPU that performs transmission control is the same as or shorter than the question-answer period allowable time T1 for the first CPU that performs engine control; respective pluralities of question information pieces for the first CPU and the second CPU are separately stored in the monitoring control circuit unit. Accordingly, there is demonstrated a characteristic that for the first CPU that needs to perform high-speed control in synchronization with the operation of the crank angle sensor and in response to the engine rotation speed, question information is transmitted at a low frequency so as to reduce the load of question-answer control or the same question is recurrently transmitted so as to reduce the transmission frequency of a new question information and that for the second CPU whose control-operation responsiveness does not synchronize with the operation of the crank angle sensor and is not directly related to the engine rotation speed, a new question information is transmitted at a frequency higher than that for the first CPU so that the response time of the abnormality determination can be shortened. When the engine rotation speed is low, the transmission frequency of new question information can be raised to a high frequency that is equivalent to the transmission frequency for the first CPU. Embodiment 4 also demonstrates the same characteristic.

Embodiment 4

(1) Detailed Description of Configuration

Next, a vehicle electronic control apparatus according to Embodiment 4 of the present invention will be explained.

Figure 8A:
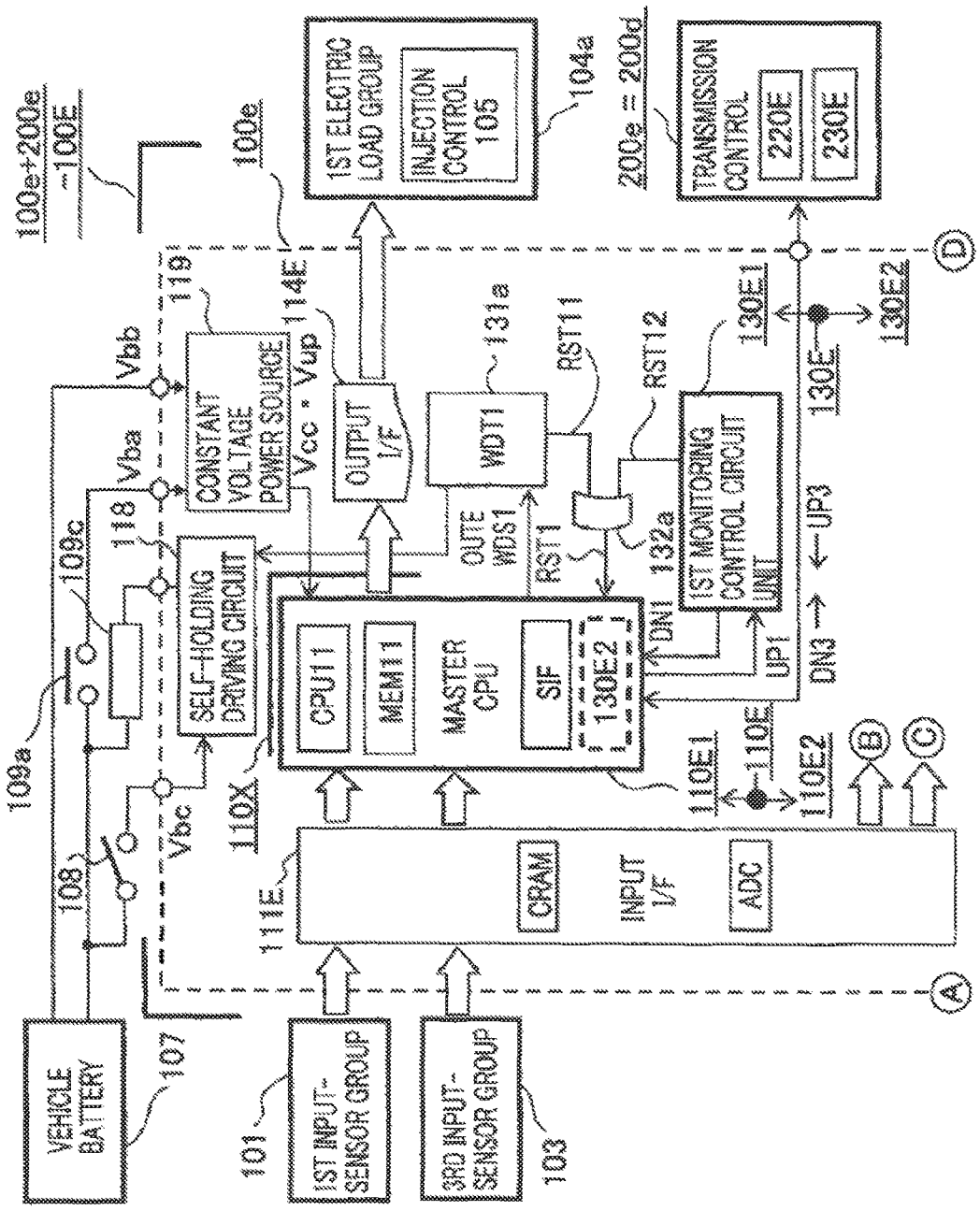
FIGS. 8A and 8B are block diagram illustrating the overall configuration of a vehicle electronic control apparatus according to Embodiment 4 of the present invention.
Figure 8B:
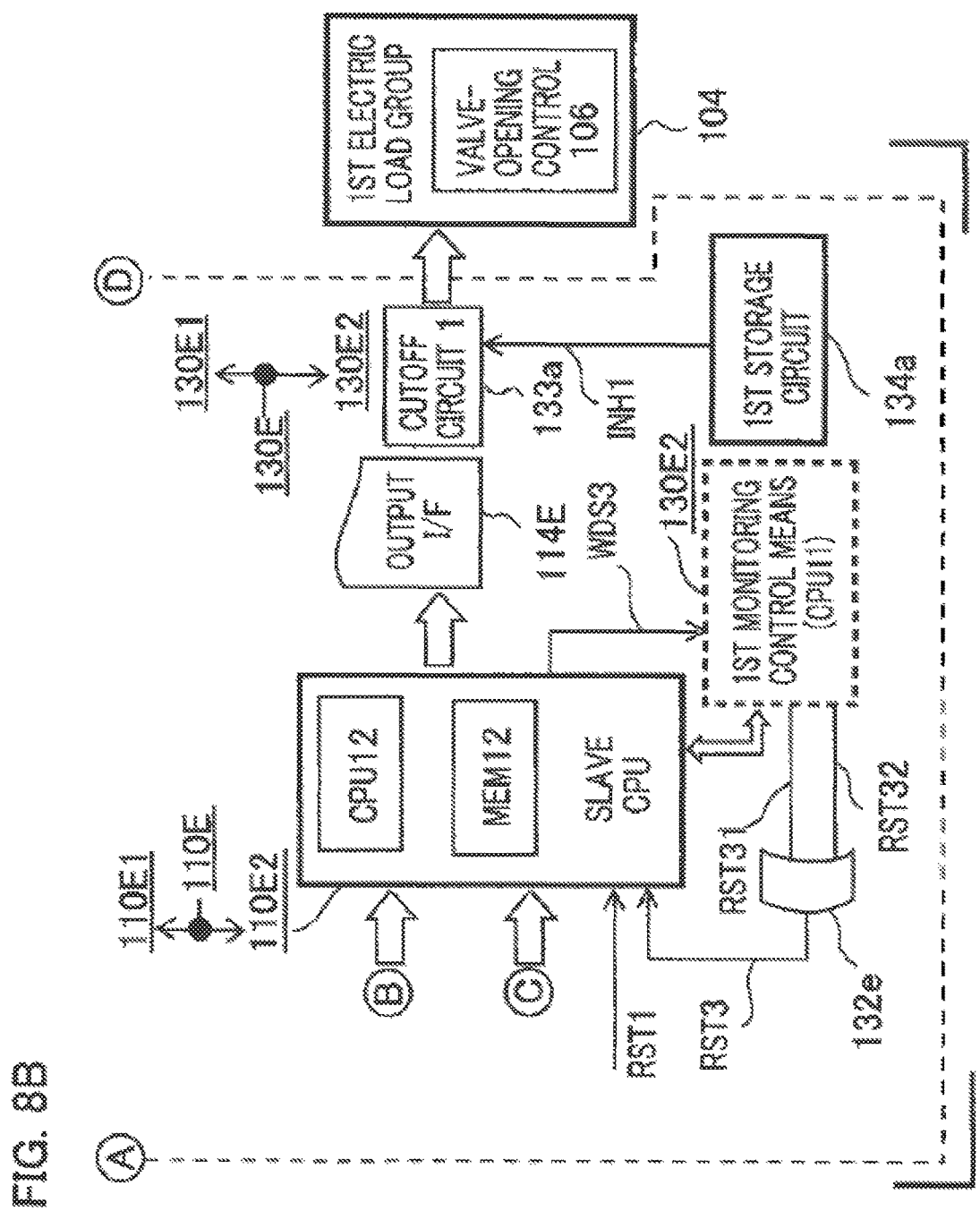

FIGS. 8A and 8B are block diagram representing the overall configuration of a vehicle electronic control apparatus according to Embodiment 4 of the present invention. Hereinafter, the difference from the vehicle electronic control apparatus according to Embodiment 1 will mainly be explained with reference to FIGS. 8A and 8B. In each of the drawings, the same reference characters denote the same or equivalent constituent elements, and the characters A and E denote constituent elements in Embodiment 1 and Embodiment 4, respectively; however, in Embodiment 4, the first and second CPUs are separately provided in different cases, and the first CPU is divided into a higher-hierarchy first CPU for fuel injection control and a lower-hierarchy first CPU for valve-opening control.

In FIGS. 8A and 8B, a vehicle electronic control apparatus 100E includes an engine control circuit unit 110E contained in a first case 100e and a transmission control circuit unit 220E contained in a second case 200e; the vehicle electronic control apparatus 100E is provided with a constant voltage power source 119/219 that is supplied with the electric power by way of the main power source terminal Vba, which is connected with the vehicle battery 107 by way of the output device 109a of the power supply relay 109c when the power switch 108 is closed, and the auxiliary power source terminal Vbb directly connected with the vehicle battery 107; the vehicle electronic control apparatus 100E is activated when the stabilized control voltage Vcc to be generated by the constant voltage power source 119/219 (refer to FIGS. 11A and 11B) and the back-up voltage Vup for retaining the storage contents of a RAM are supplied thereto.

As the first CPU included in the engine control circuit unit 110E, a multicore CPU is utilized; the master CPU, as the higher-hierarchy first CPU (for the sake of avoiding the complexity, it is simply described as the "higher-hierarchy first CPU" and the reference character "CPU11" is omitted in the following explanation, although indicated by a reference character "CPU11" in FIGS. 8A and 8B), that can perform mutual high-speed communication by way of a common RAM CRAM is included in a fuel injection control unit 110E1; the slave CPU, as the lower-hierarchy first CPU (for the sake of avoiding the complexity, it is simply described as the "lower-hierarchy first CPU" and the reference character "CPU12" is omitted in the following explanation, although indicated by a reference character "CPU12" in FIGS. 8A and 8B), is included in a valve-opening control unit 110E2 for the throttle intake valve.

After the master CPU implements a control program, the checker CPU 110X implements the same control program and then generates a comparison abnormality signal when the respective outputs of the calculation performed by the master and checker CPUs do not coincide with each other. An input interface circuit 111E includes the first input-sensor group 101 related to the higher-hierarchy first CPU and the lower-hierarchy first CPU, an interface circuit for the third input-sensor group 103, the multi-channel A/D converter ADC, and a common RAM; an output interface circuit 114E includes all output interface circuits for the first electric load group 104. As a result, each of the higher-hierarchy first CPU and the lower-hierarchy first CPU can access an arbitrary input sensor and electric load; however, in practice, the accessible inputs and outputs are restricted so that erroneous control is not implemented.

The first input-sensor group 101 includes various kinds of sensors inherent to engine control such as a crank angle sensor for detecting the rotation angle and the rotation speed of an engine, an air flow sensor for measuring the intake amount of air that passes through a throttle intake valve, a throttle position sensor for detecting the intake valve opening degree, and a gas sensor for detecting the oxygen concentration in an exhaust-gas sensor. The third input-sensor group 103 includes various kinds of sensors to be utilized in both engine control and transmission control such as a vehicle speed sensor, an accelerator position sensor for detecting the step-on degree of an accelerator pedal, and a gearshift sensor for detecting the selection position of a gearshift lever.

The first electric load group 104 is an engine control load to be controlled in response to the respective operation states of the first and third input-sensor groups 101 and 103 and includes at least the fuel-injection electromagnetic valve 105 and the intake valve opening degree control motor 106 that are disposed for each cylinder; in the case where the control subject is an gasoline engine, the first electric load group 104 further includes an ignition plug disposed for each cylinder. In addition, there is provided a fail-safe mechanism for compulsory and mechanical resetting so that when power supply to the intake valve opening degree control motor 106 is stopped, the opening degree is set to the fixed intake valve opening degree at which a rotation speed higher than the idling rotation speed can be obtained.

Figure 9:
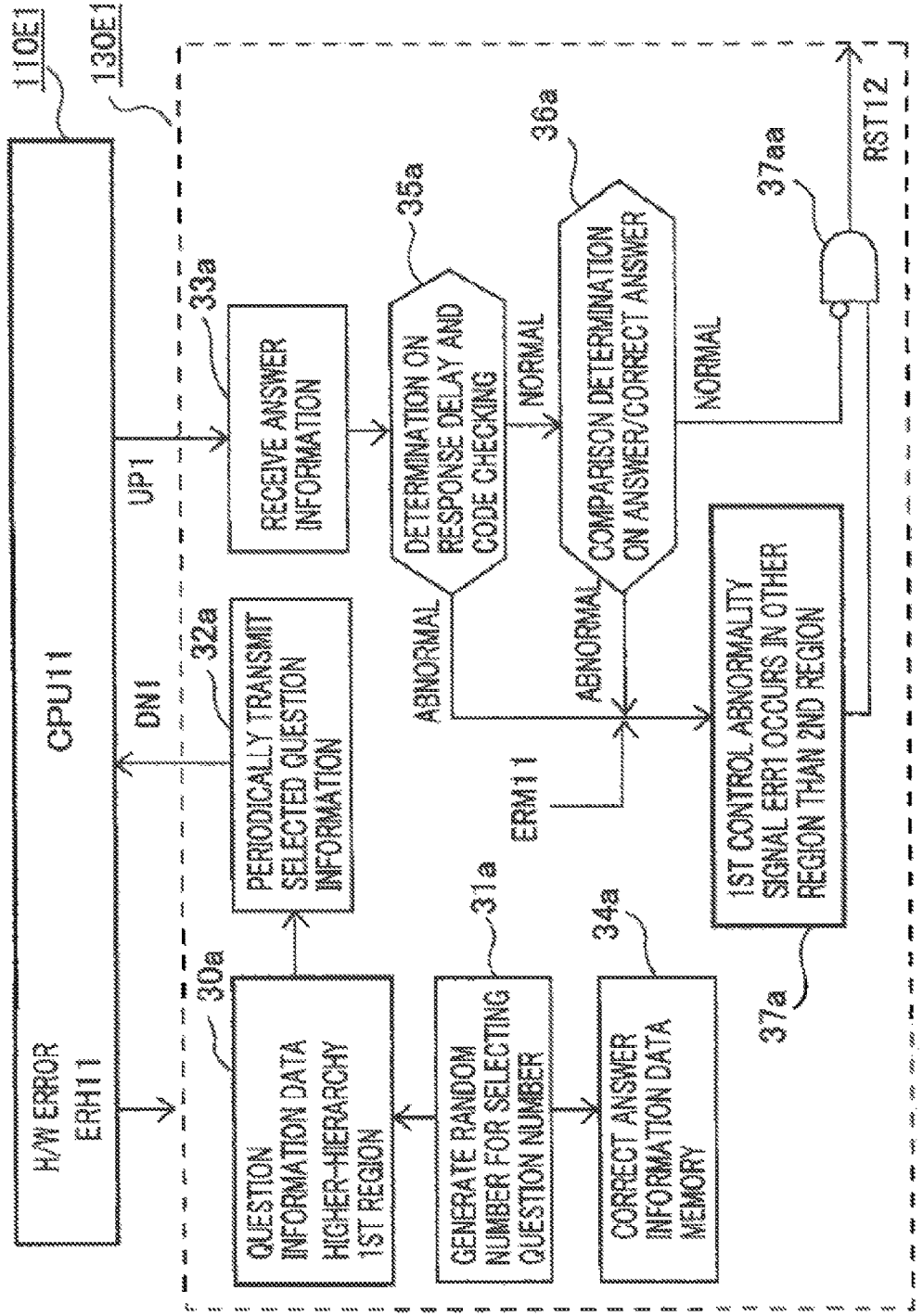
FIG. 9 is a block diagram illustrating the configuration of a first monitoring control circuit unit in the vehicle electronic control apparatus according to Embodiment 4 of the present invention.

The first watchdog timer 131a measures the pulse width of the first pulse train signal WDS1 generated by the higher-hierarchy first CPU; when the pulse width becomes the same as or longer than the first threshold-value time, the first watchdog timer 131a generates the first reset signal RST11 so as to initialize and restart the higher-hierarchy first CPU. while performing serial communication with the higher-hierarchy first CPU through the downstream signal DN1 and the upstream signal UP1, the first monitoring control circuit unit 130E1, described later with respect to FIG. 9, determines whether or not the higher-hierarchy first CPU normally performing its control operation; in the case where a control abnormality is detected, the first monitoring control circuit unit 130E1 generates the control first reset signal RST12 so as to reset the higher-hierarchy first CPU.

When any one of the first reset signal RST11 and the control first reset signal RST12 is generated, the first logical sum circuit 132a generates the composite first reset signal RST1 so as to reset the higher-hierarchy first CPU.

When the power switch 108 is closed, the self-holding circuit 118 energizes the power supply relay 109c; however, in the case where the higher-hierarchy first CPU is once activated and the first watchdog timer 131a generates an output permission signal OUTE, the power supply is continued by the operation of the self-holding circuit 118 even when the power switch 108 is opened. Accordingly, after the power switch 108 is opened, the first CPU and an after-mentioned second CPU stop the operation thereof, and the respective CPUs perform saving storage of learning information and the like; then, the higher-hierarchy first CPU stops the first pulse train signal WDS1, so that the power supply relay 109c is de-energized. In this regard, however, when the second CPU is stopped and the serial-communication signal is stopped, the first CPU stops the first pulse train signal WDS1.

A first monitoring control means 130E2, described later with reference to FIGS. 10A and 10B, includes a runaway monitoring means 131e; the runaway monitoring means 131e measures the pulse width of a third pulse train signal WDS3 generated by the lower-hierarchy first CPU; when the pulse width becomes the same as or longer than a third threshold-value time, the runaway monitoring means 131e generates a third reset signal RST31 so as to initialize and restart the lower-hierarchy first CPU. As described later with reference to FIGS. 10A and 10B, while performing serial communication with the lower-hierarchy first CPU, the first monitoring control means 130E2 determines whether or not the lower-hierarchy first CPU normally performing its control operation; in the case where a control abnormality is detected, the first monitoring control means 130E2 generates a control third reset signal RST32 so as to reset the lower-hierarchy first CPU.

When any one of the third reset signal RST31 and the control third reset signal RST32 is generated, a second logical sum circuit 132e generates a composite third reset signal RST3 so as to reset the lower-hierarchy first CPU.

When the count or the frequency of abnormalities detected by the first monitoring control means 130E2 exceeds a predetermined threshold value, the first storage circuit 134a stores the count or the frequency and supplies the first cutoff signal INH1 to the first cutoff circuit 133a; the first cutoff circuit 133a stops supply of the electric power, out of the whole electric power for the output interface circuit 114, that is for the intake valve opening degree control motor 106.

Next, the configuration of the first monitoring control circuit unit 130E1 will be explained. FIG. 9 is a block diagram illustrating the configuration of the first monitoring control circuit unit in the vehicle electronic control apparatus according to Embodiment 4 of the present invention. In FIG. 9, for example, any one of question numbers (Qi=0 to 127) is temporarily stored in transmission question data 30a for the higher-hierarchy first CPU; the number value of the question number Qi is periodically updated by the pseudo-random number generation circuit 31a. The question number Qi is dedicated to the fuel injection control region.

The correct answer information data memory 34a is a data table that stores numerical data Ri that changes in accordance with the question number Qi; the numerical date Ri designated by the pseudorandom number generation circuit 31a is the correct answer data corresponding to expected answer data Ai. The serialization transmission circuit 32a periodically repeats twice or more times the question number Qi stored in the transmission data 30a so as to transmit the question number Qi as the first monitoring downstream signal DN1 to the higher-hierarchy first CPU.

The parallelization reception circuit 33a receives answer data Ai, as the first monitoring upstream signal UP1, obtained from the higher-hierarchy first CPU and then converts the answer data Ai into parallel data to be stored in the first monitoring control circuit unit 130E1. The communication abnormality determination circuit 35a determines whether or not the response time of the answer data Ai obtained from the parallelization reception circuit 33a is the same as or longer than a predetermined threshold value time from the time when the first question number Qi has been transmitted and whether or not there exists a code check error.

The question-answer abnormality determination circuit 36a determines whether or not normal answer data Ai obtained from the communication abnormality determination circuit 35a coincides with the correct data Ri, in the correct answer information data memory 34a, that corresponds to the present question number Qi. Each of the communication abnormality determination circuit 35a and the question-answer abnormality determination circuit 36a functions as a first control abnormality determination circuit; when at least one of them determines that an abnormality exists, the first control abnormality signal generation circuit 37a generates the first control abnormality signal ERR1.

When any one of the results of determinations by the first control abnormality determination circuit 35a and the first control abnormality determination circuit 36a is abnormal and the first control abnormality signal generation circuit 37a generates the first control abnormality signal ERR1, a logic circuit 37aa generates the control first reset signal RST12 so as to reset the higher-hierarchy first CPU. Also when the self-check means of the higher-hierarchy first CPU generates a higher-hierarchy first memory error signal ERM11, the control first reset signal RST12 is generated.

Next, the configuration of the first monitoring control means 130E2 will be explained. FIGS. 10A and 10B are equivalent block diagram illustrating the configuration of the first monitoring control means in the vehicle electronic control apparatus according to Embodiment 4 of the present invention. Hereinafter, the difference between the first monitoring control means according to Embodiment 4 and the first monitoring control circuit unit, in FIGS. 2A and 2B, according to Embodiment 1 will mainly be explained with reference to FIGS. 10A and 10B. The first monitoring control circuit unit 130A represented in FIGS. 2A and 2B is configured with hardware and monitors the whole first CPU; in contrast, the first monitoring control means 130E2 represented in FIGS. 10A and 10B is implemented by the higher-hierarchy first CPU, monitors the control operation of the lower-hierarchy first CPU, and includes the runaway monitoring means 131e, described above. Accordingly, the transmission question data 30e related to the valve-opening control program of the lower-hierarchy first CPU is the determination subject.

Moreover, a third gate means 45e is not necessary; it is only necessary that each time a third control abnormality signal ERR3 is generated, the reset signal RST32 always resets the lower-hierarchy first CPU. In this regard, however, when the first storage circuit 134a stores the occurrence of an abnormality, a monitoring control stopping means 45ee is activated so as to stop the monitoring operation of the first monitoring control means 130E2.

The operation and action of an addition-subtraction counting circuit 40e for detecting the occurrence frequencies of a lower-hierarchy first memory abnormality signal ERM12 and the third control abnormality signal ERR3 are the same as those of the addition-subtraction counting circuit 40a in FIGS. 2A and 2B. The first storage circuit 134a is set by a lower-hierarchy first H/W abnormality signal ERH12 when the counting value of the reset signal counting circuit 39e that counts the number of occurrence instances of the composite third reset signal RST3 becomes a predetermined threshold value; the first storage circuit 134a is reset by the reset circuit 135a that generates a power-turn-on pulse. A first monitoring control unit 130E is configured with the first monitoring control circuit unit 130E1 and the first monitoring control means 130E2.

Figure 11A:
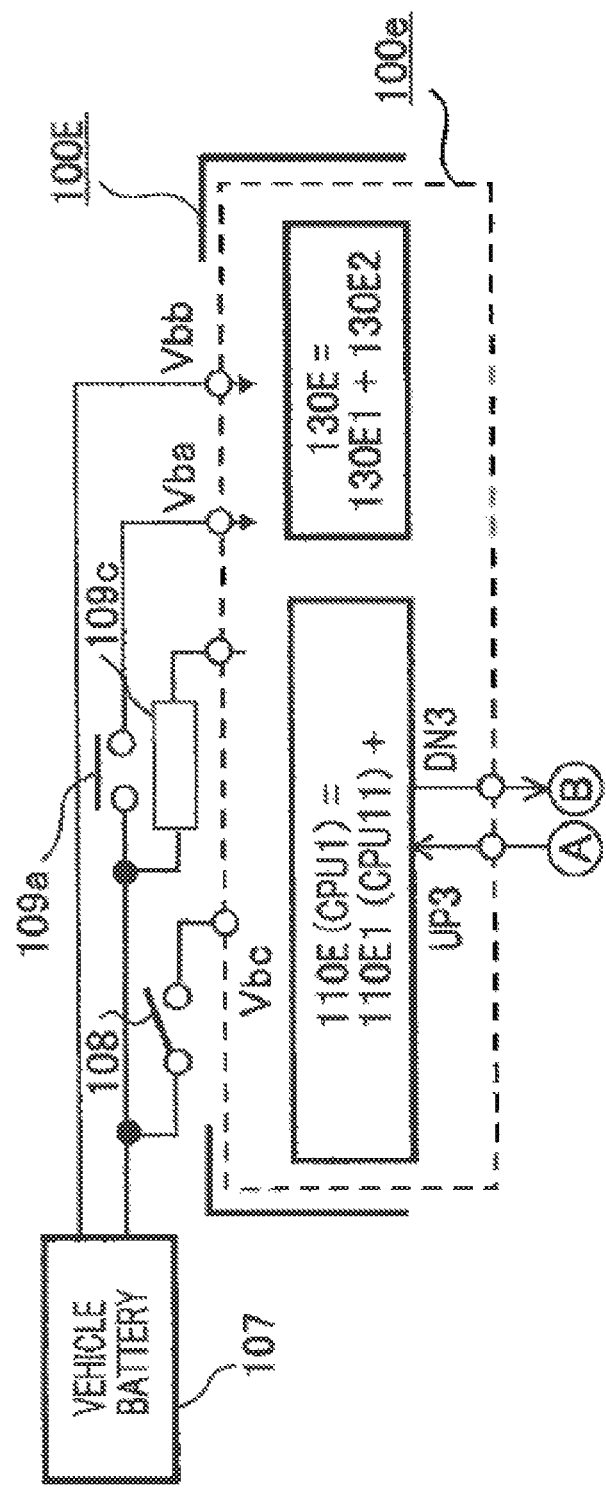
FIGS. 11A and 11B are block diagram illustrating the overall configuration of a transmission control circuit unit in the vehicle electronic control apparatus according to Embodiment 4 of the present invention.
Figure 11B:
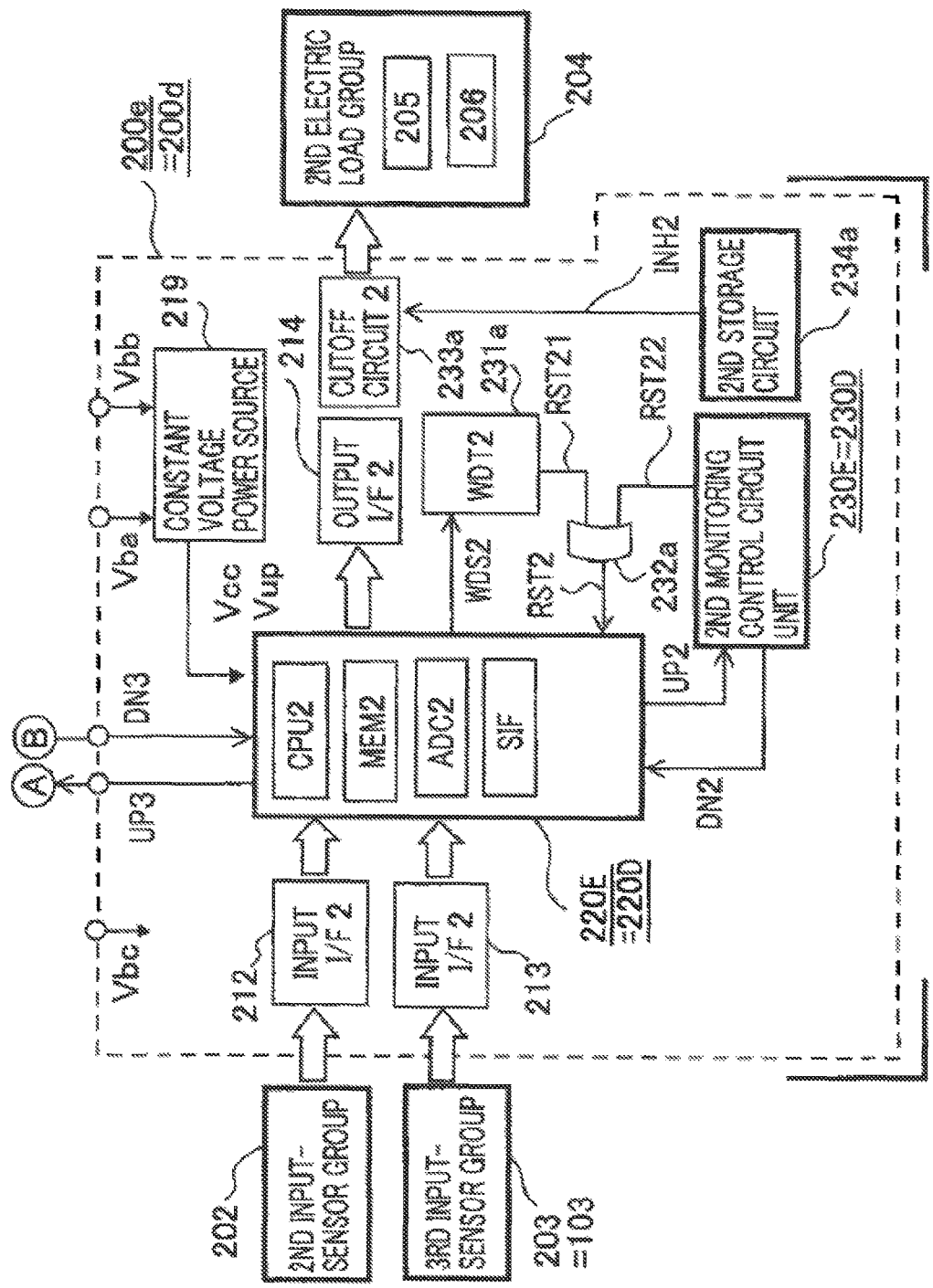

Next, the configuration of the transmission control circuit unit 220E will be explained. FIGS. 11A and 11B are block diagram illustrating the overall configuration of the transmission control circuit unit in the vehicle electronic control apparatus according to Embodiment 4 of the present invention. Hereinafter, the configuration of the transmission control circuit unit 220E, mainly the difference from the transmission control circuit unit, in FIGS. 1A and 1B, according to Embodiment 1, will be explained with reference to FIGS. 11A and 11B. In FIGS. 11A and 11B, the engine control circuit unit 220E is configured mainly with the second CPU (although in FIGS. 11A and 11B, illustrated as the reference character "CPU2", the second CPU is described simply as the second CPU in the following explanation for the sake of avoiding the complexity and the reference character "CPU2" will be omitted) and includes the second memory MEM2 including a nonvolatile program memory, which is, for example, a flash memory, a data memory, which is part of the region of the program memory or another nonvolatile memory that can electrically perform reading and writing, and a volatile RAM, a multi-channel A/D converter ADC2, and the communication interface circuit SIF.

The transmission control circuit unit 220E is connected with the second input-sensor group 202 byway of the second input interface circuit 212 and with the third input-sensor group 203 by way of the third input interface circuit 213. The second electric load group 204 is a transmission control load to be controlled in response to the respective operation states of the second and third input-sensor groups 202 and 203 (103) and includes at least the selection electromagnetic valve 205 for selecting forward or backward movement and the gear-shifting electromagnet valve 206 for changing the transmission ratio continuously or in a multi-step manner.

In addition, when power supply to the gear-shifting electromagnet valve 206 is stopped, a middle- or high-speed driving transmission ratio higher than the middle transmission ratio in the gear-shift range can be obtained.

The second watchdog timer 231a measures the pulse width of the second pulse train signal WDS2 generated by the second CPU; when the pulse width becomes the same as or longer than the second threshold-value time, the second watchdog timer 231a generates the second reset signal RST21 so as to initialize and restart the second CPU. The second monitoring control circuit unit 230E corresponds to the second monitoring control circuit unit 230D, described with reference to FIGS. 7A and 7B; while performing serial communication with the second CPU through the downstream signal DN2 and the upstream signal UP2, the second monitoring control circuit unit 230E determines whether or not the second CPU normally performing its control operation; in the case where a control abnormality is detected, the second monitoring control circuit unit 230E generates the control second reset signal RST22 so as to reset the second CPU. When any one of the second reset signal RST21 and the control second reset signal RST22 is generated, the second logical sum circuit 232a generates the composite second reset signal RST2 so as to reset the second CPU.

When the count or the frequency of abnormalities detected by the second monitoring control means 230E exceeds a predetermined threshold value, the second storage circuit 234a stores the count or the frequency and supplies the second cutoff signal INH2 to the second cutoff circuit 233a; the second cutoff circuit 233a stops supply of the electric power, out of the whole electric power for the output interface circuit 214, that is for the gear-shifting electromagnet valve 206.

(2) Detailed Description of Operation and Action

Next, the operation and the action of the vehicle electronic control apparatus according to Embodiment 4 of the present invention, configured as illustrated in FIGS. 8A and 8B, FIGS. 11A and 11B, will be explained in detail. At first, in FIGS. 8A and 8B, FIG. 9, when the power switch 108 is closed, the power supply relay 109c is driven by way of the self-holding circuit 118 and hence the output device 109a thereof is closed; thus, the vehicle battery 107 starts power supply to the main power source circuit of the constant voltage power source 119/219 (refer to FIGS. 11A and 11B); then, the control power source Vcc is applied to the first CPU included in the engine control circuit unit 110E and the second CPU included in the transmission control circuit unit 220E so as to make them start their control operation.

The higher-hierarchy first CPU and the lower-hierarchy first CPU included in the first CPU perform driving control of the first electric load group 104 in response to the operation states of the first input-sensor group 101 and the third input-sensor group 103 and the contents of the control programs in the higher-hierarchy first memory MEM11 and the lower-hierarchy first memory MEM12; the higher-hierarchy first CPU controls the fuel-injection electromagnetic valve 105 in the first electric load group 104 through the fuel injection control program; the lower-hierarchy first CPU controls the intake valve opening degree control motor 106 in the first electric load group 104 through the valve-opening control program.

The valve-opening drive mechanism of the intake valve includes an initial-position returning mechanism that can perform saving operation based on a fixed intake valve opening degree when power supply to the intake valve opening degree control motor 106 is stopped.

The higher-hierarchy first CPU has a self-diagnosis function of performing code checking in the memory region related to the fuel injection control so as to generate the higher-hierarchy first memory abnormality signal ERM11 (refer to FIG. 9). The first watchdog timer 131a measures the ON-time width and the OFF-time width of the first pulse train signal WDS1 generated by the higher-hierarchy first CPU; when the time width of the first pulse train signal WDS1 becomes the same as or longer than the first threshold-value time, the first watchdog timer 131a generates the first reset signal RST11 so as to initialize and restart the first CPU; in the case where the first pulse train signal WDS1 is normal, the first watchdog timer 131a generates the output permission signal OUTE so as to maintain the driving state of the power supply relay 109c by way of the self-holding circuit 118.

As illustrated in FIG. 9, the first monitoring control circuit unit 130E1 has the correct answer information data memory 34a for the transmission question data 30a, sequentially transmits a plurality of question information pieces related to a fuel injection control output creation program to the higher-hierarchy first CPU in driving operation, receives from the higher-hierarchy first CPU answer information corresponding to the question information, and then compares the answer information with the correct answer information preliminarily stored in the first monitoring control circuit unit 130E1; the first monitoring control circuit unit 130E1 also has the first control abnormality determination circuit 35a/36a for determining whether or not a code check abnormality and an answering-response delay exist in the answer information so as to determine whether or not the first control abnormality including a communication abnormality and a question-answer abnormality exists and then to create the first control abnormality signal ERR1; as a result, the control first reset signal RST12 is generated.

Figure 10A:
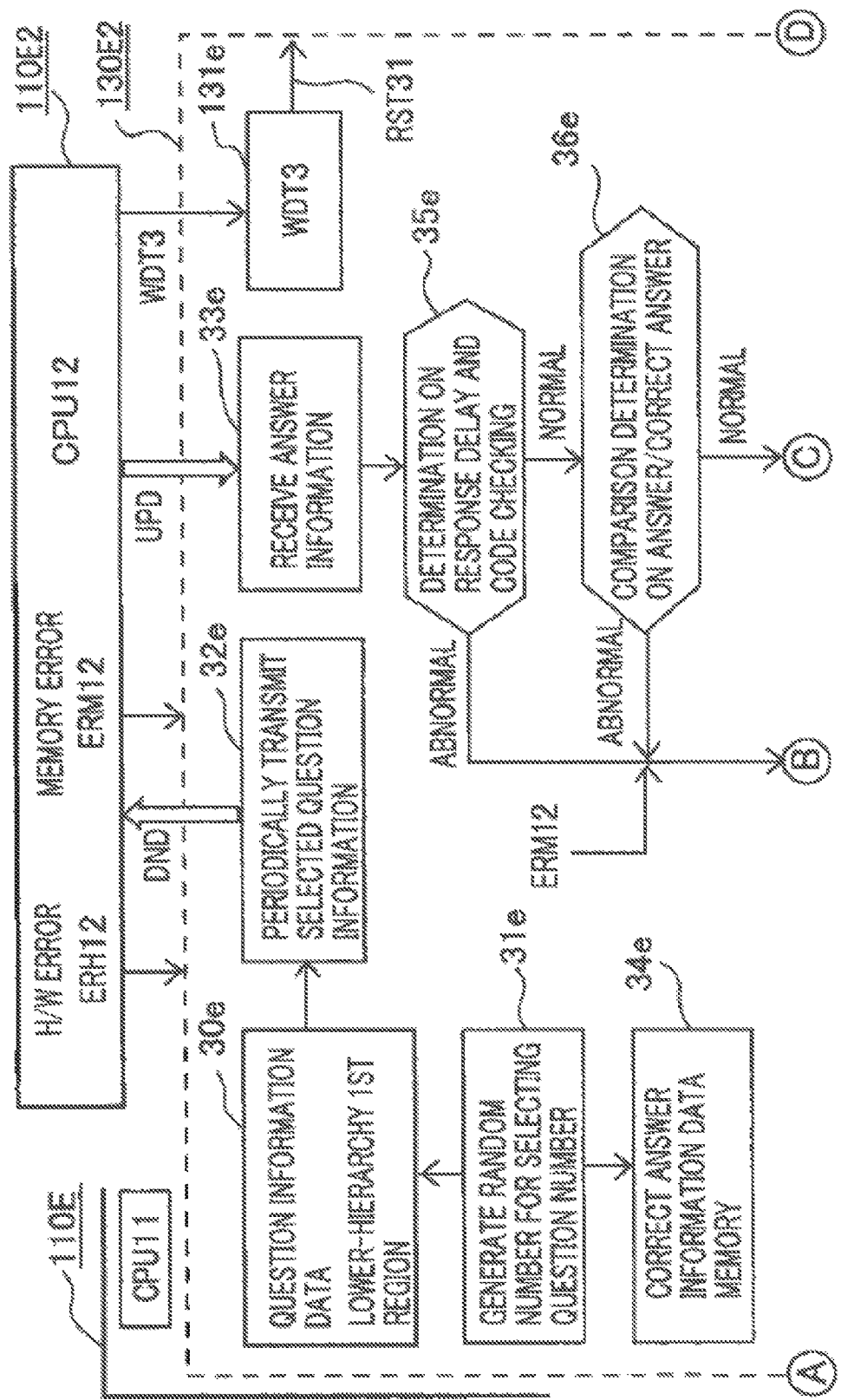
FIGS. 10A and 10B are equivalent block diagram illustrating the configuration of a first monitoring control means in the vehicle electronic control apparatus according to Embodiment 4 of the present invention.
Figure 10B:
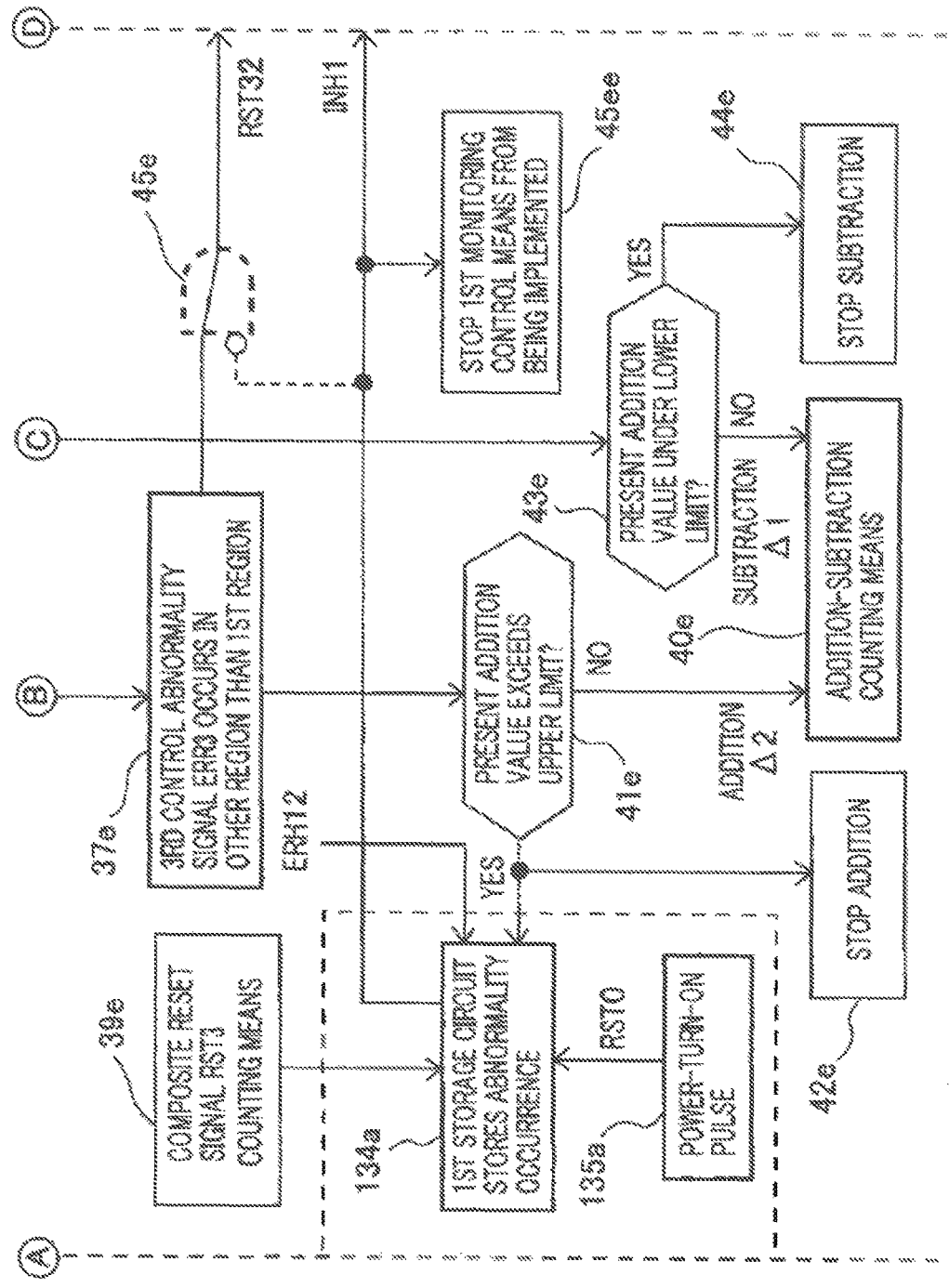

The lower-hierarchy first CPU has a self-diagnosis function of detecting a wire-breaking or short-circuit abnormality in the input/output wiring leads related to the valve-opening control so as to generate the lower-hierarchy first H/W abnormality signal ERH12 (refer to FIGS. 10A and 10B) and performing code checking in the memory region related to the valve-opening control so as to generate the lower-hierarchy first memory abnormality signal ERM12 (refer to FIGS. 10A and 10B).

In FIGS. 8A and 8B, FIGS. 10A and 10B, the first monitoring control means 130E2, as represented in FIGS. 10A and 10B, includes the runaway monitoring means 131e; the runaway monitoring means 131e measures the ON-time width and the OFF-time width of the third pulse train signal WDS3 generated by the lower-hierarchy first CPU; when the pulse width becomes the same as or longer than a third threshold-value time, the runaway monitoring means 131e generates the third reset signal RST31 so as to initialize and restart the lower-hierarchy first CPU; in the case where the first pulse train signal WDS1 and the third pulse train signal WDS3 are normal, the runaway monitoring means 131e generates the output permission signal OUTE so as to maintain the driving state of the power supply relay 109c by way of the self-holding circuit 118.

As illustrated in FIGS. 10A and 10B, the first monitoring control means 130E2 has a correct answer information data memory 34e for the transmission question data 30e, sequentially transmits a plurality of question information pieces related to a valve-opening control region creation program to the lower-hierarchy first CPU in driving operation, receives from the lower-hierarchy first CPU answer information corresponding to the question information, and then compares the answer information with the correct answer information preliminarily stored in the first monitoring control means 130E2; the first monitoring control means 130E2 also has a first control abnormality determination circuit 35e/36e for determining whether or not a code check abnormality and an answering-response delay exist in the answer information so as to determine whether or not a third control abnormality including a communication abnormality and a question-answer abnormality exists and then to create the third control abnormality signal ERR3; as a result, the control third reset signal RST32 is generated.

The first storage circuit 134a is set when a third state is established in which the occurrence count or the occurrence frequency of each of the third reset signal RST31 and the third control abnormality signal ERR3 becomes the same as or larger than a predetermined threshold value; the first storage circuit 134a is initialized by the reset circuit 135a when the power switch 108 is closed. When the first storage circuit 134a stores the occurrence of an abnormality, the first cutoff circuit 133a stops power supply to the intake valve opening degree control motor 106. When the first storage circuit 134a stores the occurrence of an abnormality, the monitoring control stopping means 45ee stop the monitoring operation of the first monitoring control means 130E2.

Next, in FIGS. 11A and 11B, the transmission control circuit unit 220E and the transmission control circuit unit 220D in FIGS. 6A and 6B are configured in the same manner; the second CPU, the main part of the transmission control circuit unit 220E, performs driving control of the second electric load group 204 in response to the operation states of the second input-sensor group 202 and the third input-sensor group 203 (103) and the contents of the control program in the second memory MEM2; the back-and-forth selection electromagnetic valve 205 in the second electric load group 204 responds to the selection control means; the gear-shifting electromagnet valve 206 responds to the transmission control means.

The transmission to be controlled by the second CPU includes a transmission ratio fixation mechanism that makes it possible to travel at least forward at a fixed transmission ratio suitable for middle- or high-speed driving when the second CPU stops its operation. The second CPU has a self-diagnosis function of detecting a wire-breaking or short-circuit abnormality in the input/output wiring leads related to the transmission control so as to generate the second H/W abnormality signal ERH2 and performing code checking in the memory region related to the transmission control so as to generate the second memory abnormality signal ERM2.

The second watchdog timer 231*a* measures the ON-time width and the OFF-time width of the second pulse train signal WDS2 generated by the second CPU; when the pulse width becomes the same as or longer than the second threshold-value time, the second watchdog timer 231*a* generates the second reset signal RST21 so as to initialize and restart the second CPU. The second monitoring control circuit unit 230E and the second monitoring control circuit unit 230D in FIGS. 7A and 7B are configured in the same manner.

In FIGS. 11A and 11B, FIGS. 7A and 7B, the second monitoring control circuit unit 230E (=230D) has the correct answer information data memory 34*d* for the transmission question data 30*d*, sequentially transmits a plurality of question information pieces related to at least a transmission control output creation program to the second CPU in driving operation, receives from the second CPU answer information corresponding to the question information, and then compares the answer information with the correct answer information preliminarily stored in the second monitoring control circuit unit 230E (=230D); the second monitoring control circuit unit 230E also has the second gate circuit 45*d* and the second control abnormality determination circuits 35*d*/36*d* for determining whether or not a code check abnormality and an answering-response delay exist in the answer information so as to determine whether or not the second control abnormality including a communication abnormality and a question-answer abnormality exists and then to create the second control abnormality signal ERR2.

The second storage circuit 234*a* is set when a second state is established in which the occurrence count or the occurrence frequency of each of the second reset signal RST21 and the second control abnormality signal ERR2 becomes the same as or larger than a predetermined threshold value; the second storage circuit 234*a* is initialized by the reset circuit 235*a* when the power switch 108 is closed. When the second storage circuit 234*a* stores the occurrence of an abnormality, the second cutoff circuit 233*a* stops power supply to the gear-shifting electromagnet valve 206.

When the second storage circuit 234*a* has not yet stored the occurrence of an abnormality, the second gate means 45*d* represented in FIGS. 7A and 7B resets the second CPU through the second reset signal RST21 and the second control abnormality signal ERR2; after the second storage circuit 234*a* has stored the occurrence of an abnormality, the second gate means 45*d* prohibits the second control abnormality signal ERR2 from performing reset processing of the second CPU so that a continuous non-runaway repeated abnormality related to the transmission control is suppressed from providing an effect to the back-and-forth selection control.

The composite reset signal RST2 including the second reset signal RST21 generated by the second watchdog timer 231*a* is simply counted by the reset signal counting circuit 39*d* represented in FIGS. 7A and 7B; when the counted value reaches a predetermined threshold value, the second storage circuit 234*a* stores the occurrence of an abnormality. In this regard, however, the reset signal counting circuit 39*d* may count only the second reset signal RST21; alternatively, the occurrence frequency of an abnormality may be detected through a method utilizing an addition-subtraction counting circuit that replaces the reset signal counting circuit 39*d*.

In the foregoing description, a question-answer abnormality related to the transmission control has been explained; however, in the case where the explanation is expanded to the back-and-forth selection control region, the second region determination circuit 38*d* represented in FIGS. 7A and 7B becomes effective; in the case where the second control abnormality signal ERR2 is related to the first address region (selection control region) of the second memory MEM2, the second region determination means 38*d* generates the continuity second reset signal RST23 so as to always initialize and then restart the second CPU, regardless of how large the occurrence count or the occurrence frequency is.

In the foregoing explanation, the higher-hierarchy first CPU in FIG. 9 does not include a higher-hierarchy first abnormality signal ERH11 for a wire-breaking or short-circuit abnormality in the fuel-injection electromagnetic valve 105 or the like; however, in practice, in the case where a wire-breaking or short-circuit abnormality occurs in any one of a plurality of multi-cylinder fuel-injection electromagnetic valves, this abnormality is detected, and then cylinder-lacking drive with odd-number cylinders or even-number cylinders is implemented. Moreover, before saving operation with a fixed intake valve opening degree starts, more simple saving operation can be implemented for a slight abnormality, by performing suppression control of the intake valve opening degree.

(3) Gist and Feature of Embodiment 4

As is clear from the foregoing explanation, in the vehicle electronic control apparatus 100E according to Embodiment 4 of the present invention, the first CPU and the second CPU, which are microprocessors provided in the engine control circuit unit 110E and the transmission control circuit unit 220E, respectively, collaborate with each other; the vehicle electronic control apparatus 100E is configured in such a way that the first CPU and the second CPU are separately mounted on the first circuit board contained in the first case and on the second circuit board contained in the second case, respectively; the first CPU is configured with the higher-hierarchy first CPU connected with the first monitoring control circuit unit 130E1 including at least the first watchdog timer 131*a* and the lower-hierarchy first CPU whose operation state is monitored by the first monitoring control means 130E2 configured with the higher-hierarchy first CPU; the higher-hierarchy first CPU and the lower-hierarchy first CPU each operate with opening/closings signal or analogue signals, as input signals, to be obtained from the first input-sensor group 101 dedicated to the engine control and the third input-sensor group 103 utilized commonly in the engine control and the transmission control; the higher-hierarchy first CPU generates at least a fuel injection control output for the fuel-injection electromagnetic valve 105; the lower-hierarchy first CPU generates a valve-opening control output for the intake valve opening degree control motor 106 for the intake valve provided in the intake throttle; the valve-opening drive mechanism of the intake valve includes an initial-position returning mechanism that can perform saving operation based on a fixed intake valve opening degree when power supply to the intake valve opening degree control motor 106 is stopped.

The second monitoring control circuit unit 230E including at least the second watchdog timer 231*a* is connected with the second CPU; the transmission to be controlled by the second CPU includes a transmission ratio fixation mechanism that makes it possible to travel at least forward at a fixed transmission ratio suitable for middle- or high-speed driving when the second CPU stops its operation; the first watchdog timer 131*a* measures the ON-time width and the OFF-time width of the first pulse train signal WDS1 generated by the higher-hierarchy first CPU; when the pulse width becomes the same as or longer than the first threshold-value time, the first watchdog timer 131a generates the first reset signal RST11 so as to initialize and restart the higher-hierarchy first CPU; the first monitoring control means 130E2 has a runaway monitoring means 131e that measures the ON-time width and the OFF-time width of the third pulse train signal WDS3 generated by the lower-hierarchy first CPU and generates the third reset signal RST31 so as to initialize and restart the lower-hierarchy first CPU when the time width of the third pulse train signal WDS3 becomes the same as or longer the third threshold-value time; the first monitoring control means 130E2 is provided with the third control abnormality determination means 35e/36e including the communication abnormality determination means 35e and the question-answer abnormality determination means 36e, a mode selection third circuit, and the monitoring control stopping means 45ee; the third control abnormality determination circuit 35e/36e has the correct answer information data memory 34e for the transmission question data 30e, sequentially transmits a plurality of question information pieces related to at least the valve-opening control output creation program to the lower-hierarchy first CPU in driving operation, receives from the lower-hierarchy first CPU answer information corresponding to the question information, and then compares the answer information with the correct answer information preliminarily stored in the first monitoring control means 130E2; the third control abnormality determination circuit 35e/36e determines whether or not a code check abnormality and an answering-response delay exist in the answer information so as to determine whether or not a control abnormality including a communication abnormality and a question-answer abnormality exists and then to create the third control abnormality signal ERR3.

The mode selection third circuit has the first storage circuit 134a that is set when a first state is established in which the occurrence count or the occurrence frequency of each of the third reset signal RST31 and the third control abnormality signal ERR3 becomes the same as or larger than a predetermined threshold value, the first cutoff circuit 133a that stops power supply to the intake valve opening degree control motor 106 when the first storage circuit stores the occurrence of an abnormality, and the reset circuit 135a that preliminarily initializes the first storage circuit 134a when the power switch 108 for starting power supply to the first CPU is closed; the monitoring control stopping means 45ee resets the lower-hierarchy first CPU through the third reset signal RST31 and the third control abnormality signal ERR3 when the first state has not been established; after the first storage circuit 134a has stored the occurrence of an abnormality, the monitoring control stopping means 45ee stops the first monitoring control means 130E2 from being implemented and hence reduces the control load on the higher-hierarchy first CPU so that the function of the first CPU is divided and hence a sporadic or continuous abnormality related to the valve-opening control is prevented from providing an effect to the fuel injection control.

As described above, the vehicle electronic control apparatus according to Embodiment 4 of the present invention is configured in such a way as to be divided into the first CPU that performs engine control and the second CPU that performs transmission control; the first CPU is further divided into the higher-hierarchy first CPU that performs fuel injection control and the lower-hierarchy first CPU that performs valve-opening control of an intake valve; at least the first watchdog timer monitors an abnormality in the higher-hierarchy first CPU, and the higher-hierarchy first CPU is initialized and restarted when a runaway abnormality occurs; the lower-hierarchy first CPU is initialized and restarted through the third reset signal generated by the first monitoring control means implemented by the higher-hierarchy first CPU and the third control abnormality signal; when the first state is established in which the occurrence count or the occurrence frequency of each of the third reset signal and the third control abnormality signal becomes the same as or larger than a predetermined threshold value, the first storage circuit stores the occurrence of an abnormality and stops power supply to the intake valve opening degree control motor so as to set the valve-opening degree to a fixed intake valve opening degree, and the first monitoring control by the higher-hierarchy first CPU is stopped.

Accordingly, abnormality monitoring by the first watchdog timer on a sporadic abnormality or a continuous abnormality in the higher-hierarchy first CPU and initialization/restarting processing based on the abnormality monitoring are always effective; therefore, there is demonstrated an effect that in the case where a sporadic abnormality occurs in the lower-hierarchy first CPU, recovery processing based on the initialization makes it possible to continue the normal control operation and that even when a continuous non-runway repeated abnormality or a runway abnormality occurs in the lower-hierarchy first CPU, the higher-hierarchy first CPU can continue its operation so as to perform saving operation with a fixed intake valve opening degree, because the higher-hierarchy first CPU and the lower-hierarchy first CPU work independently from each other.

Moreover, there is demonstrated an effect that when the occurrence of an abnormality in the lower-hierarchy first CPU is stored, the higher-hierarchy first CPU stops monitoring control of the lower-hierarchy first CPU so as to reduce the control load thereon and that when the contributing factor of the occurrence of the abnormality is included in the monitoring control program, an abnormality can be prevented from occurring in the higher-hierarchy first CPU itself.

The higher-hierarchy first CPU is bus-connected with the first RAM, which is a calculation-processing RAM, the nonvolatile first data memory, and the higher-hierarchy first memory MEM11 including a nonvolatile first program memory; the higher-hierarchy first memory MEM11 is configured mainly with a first address region including control data and control programs related to a fuel injection control means for the fuel-injection electromagnetic valve 105, a power supply control means for the power source relay for auxiliary apparatuses including a fuel injection pump, and an ignition control means for the ignition coil of a gasoline engine; the lower-hierarchy first CPU is bus-connected with the first RAM, which is a calculation-processing RAM, the nonvolatile first data memory, and the lower-hierarchy first memory MEM12 including a nonvolatile first program memory; the lower-hierarchy first memory MEM12 is configured mainly with a second address region including control data or control programs related to the valve-opening control means for the intake valve opening degree control motor 106; the first address region further includes a pulse generation control program for generating the first pulse train signal WDS1, the runway monitoring program for monitoring the operation of the lower-hierarchy first CPU, and the abnormality monitoring program that functions as the first control abnormality determination means 35e/36e; the first address region also includes a monitoring control stopping means, which is a program that switches the control flow so that when the first storage circuit 134*a* stores the occurrence of an abnormality, the control program related to the first monitoring control means 130E2 is not implemented; the monitoring control stopping means is implemented before the first monitoring control program is implemented after the higher-hierarchy first CPU has been initialized.

As described above, with regard to claim 17 of the present invention, the higher-hierarchy first memory bus-connected with the higher-hierarchy first CPU mainly includes the first address region related to fuel injection, and the lower-hierarchy first memory bus-connected with the lower-hierarchy first CPU mainly includes the second address region related to valve-opening control; the first address region includes a monitoring control stopping means that separates the control program, which functions as a monitoring control means for the unnecessary lower-hierarchy first CPU, when due to the occurrence of an abnormality, control based on a fixed intake valve opening degree is implemented. Therefore, there is demonstrated a characteristic that when the existence of the first monitoring control means causes an abnormality in the control operation of the higher-hierarchy first CPU, this control program is separated so that the higher-hierarchy first CPU normally operates and hence saving operation based on a fixed throttle valve opening degree can be implemented.

The first CPU, which is an integrated circuit device provided with a master CPU and a slave CPU that can perform mutual high-speed communication between them by way of a common RAM and the checker CPU 110X that implements the same control program as at least the master CPU implements, at a timing that is not the same as the timing at which the master CPU implements the control program, and generates a comparison abnormality signal when the different-timing calculation outputs do not coincide with each other; the master CPU is utilized as the higher-hierarchy first CPU, and the slave CPU is utilized as the lower-hierarchy first CPU.

As described above, with regard to claim 18 of the present invention, the first CPU is a multicore CPU formed of a single integrated circuit device; the master and slave CPUs play a role in fuel injection control and a role in valve-opening control, respectively; a runway in the master CPU is monitored by the first watchdog timer, and a runway in the slave CPU is monitored by the master CPU. Therefore, there is demonstrated a characteristic that the master CPU is doubly monitored by the first watchdog timer and the checker CPU and the slave CPU is doubly monitored by the runaway monitoring means implemented by the master CPU and the first control abnormality determination means so that enhancement of an abnormality detection function can suppress a control abnormality from becoming tangible.

Various modifications and alterations of this invention will be apparent to those skilled in the art without departing from the scope and spirit of this invention, and it should be understood that this is not limited to the illustrative embodiments set forth herein.

What is claimed is:

1. A vehicle electronic control apparatus in which a first central processing unit (CPU) and a second CPU that are microprocessors provided in an engine control circuit unit and a transmission control circuit unit, respectively, collaborate with each other and in which the first CPU and the second CPU are mounted on a common circuit board and are contained in a common case or the first CPU and the second CPU are separately mounted on a first circuit board contained in a first case and on a second circuit board contained in a second case, respectively, wherein a first monitoring control circuit unit including at least a first watchdog timer is connected with the first CPU;

wherein the first CPU operates with opening/closing signals or analogue signals, as input signals, to be obtained from a first input-sensor group dedicated to engine control and a third input-sensor group utilized commonly in the engine control and transmission control, and generates at least a fuel injection control output for a fuel-injection electromagnetic valve and a valve-opening control output for an intake valve opening degree control motor for an intake valve provided in an intake throttle;

wherein a valve-opening drive mechanism of the intake valve includes an initial-position returning mechanism that performs a saving operation based on a fixed intake valve opening degree when power supply to the intake valve opening degree control motor is stopped;

wherein the operation of the second CPU is monitored by a runaway monitoring means included in a second monitoring control means or a second watchdog timer included in a second monitoring control circuit unit, and the runaway monitoring means is a means in which the first CPU monitors a watchdog signal to be generated by the second CPU;

wherein a transmission to be controlled by the second CPU includes a transmission ratio fixation mechanism that controls to travel at least forward at a fixed transmission ratio suitable for middle- or high-speed driving when the second CPU stops its operation;

wherein the first watchdog timer measures an ON-time width and an OFF-time width of a first pulse train signal generated by the first CPU, and generates a first reset signal so as to initialize and restart the first CPU, when the ON-time width becomes greater than or equal to the first threshold-value time;

wherein the first monitoring control circuit unit is provided with a first control abnormality determination circuit including a communication abnormality determination circuit and a question-answer abnormality determination circuit, a mode selection first circuit, and a first gate circuit;

wherein the first control abnormality determination circuit includes a first correct answer information data memory to sequentially transmit a plurality of first questions related to at least a valve-opening control output creation program to the first CPU in a driving operation, receive, from the first CPU, first answer information corresponding to the plurality of first questions, compare the first answer information with correct first answer information preliminarily stored in the first monitoring control circuit unit, determine whether a first control abnormality including a communication abnormality or a question-answer abnormality exists in response to a code check abnormality or an answering-response delay existing in the first answer information, and create a first control abnormality signal in response to determining that the first control abnormality exists;

wherein the first monitoring control circuit unit comprises a first region determination circuit, and the first region determination circuit determines whether the first control abnormality signal is generated from a region other than a fuel injection control region of a first memory connected to the first CPU, generates a continuity first reset signal to reset the first CPU through a logic sum circuit in response to the first control abnormality signal being generated from the fuel injection control region, and transmits a selection first reset signal to the first gate circuit in response to the first control abnormality signal being generated from the region other than the fuel injection control region;

wherein the mode selection first circuit includes a first storage circuit that stores a first state when a number of times or a frequency that each of the first reset signal and the first control abnormality signal becomes greater than or equal to a predetermined threshold value, a first cutoff circuit that stops power supply to the intake valve opening degree control motor when the first storage circuit stores the first state, and a reset circuit that preliminarily initializes the first storage circuit when a power switch for starting power supply to the first CPU is closed; and wherein in response to the first state being stored in the first storage circuit, the first storage circuit activates the first gate circuit that receives the selection first reset signal to prohibit the first control abnormality signal, which is generated from the region other than the fuel injection control region, from resetting the first CPU.

2. The vehicle electronic control apparatus according to claim 1, wherein the second CPU operates with opening/closing signals or analogue signals, as input signals, to be obtained from the second input-sensor group dedicated to the transmission control and the third input-sensor group utilized commonly in the engine control and the transmission control, and generates a selection control output for a back-and-forth selection electromagnetic valve that responds to a selection position of a shift lever and a transmission control output for a gear-shifting electromagnet valve that determines a no-step or at least multistep transmission ratio;

wherein the transmission includes the transmission ratio fixation mechanism that sets the transmission ratio to the fixed transmission ratio for the middle- or high-speed driving with the middle transmission ratio or higher when power supply to the gear-shifting electromagnet valve is stopped and that sets the transmission ratio to the fixed transmission ratio for fixed forward driving when the operation of the second CPU is stopped;

wherein the runway monitoring means implemented by the first CPU or the second watchdog timer measures an ON-time width and an OFF-time width of a second pulse train signal generated by the second CPU, and generates a second reset signal so as to initialize and restart the second CPU, when the ON-time width becomes greater than or equal to a second threshold-value time;

wherein there is provided a second monitoring control means having a second control abnormality determination means including a communication abnormality determination means and a question-answer abnormality determination means, a mode selection second circuit, and a second gate means or there is provided a second monitoring control circuit unit having a second control abnormality determination circuit including a communication abnormality determination circuit and a question-answer abnormality determination circuit, a mode selection second circuit, and a second gate means;

wherein each of the second control abnormality determination means and the second control abnormality determination circuit is provided with a second correct answer information data memory corresponding to transmission question data, sequentially transmits a plurality of second questions related to at least a transmission control output creation program to the second CPU in driving operation, receives, from the second CPU, second answer information corresponding to the plurality of second questions, and then compares the second answer information with second correct answer information preliminarily stored in the first memory or the second monitoring control circuit unit that collaborates with the first CPU, and each of the second control abnormality determination means and the second control abnormality determination circuit determines whether or not a code check abnormality and an answering-response delay exist in the second answer information so as to determine whether or not a second control abnormality including a communication abnormality and a question-answer abnormality exists and then to create a second control abnormality signal;

wherein the mode selection second circuit has a second storage circuit that stores a second state when a number of times or a frequency that each of the second reset signal and the second control abnormality signal becomes greater than or equal to a predetermined threshold value, a second cutoff circuit that stops power supply to the gear-shifting electromagnet valve when the second storage circuit stores the second state, and a reset circuit that preliminarily initializes the second storage circuit when the power switch for starting power supply to the second CPU is closed; and wherein the second gate means or the second gate circuit resets the second CPU through the second reset signal and the second control abnormality signal before the second state is stored in the second storage circuit, and prohibits the second control abnormality signal from resetting the second CPU to prevent a continuous non-runaway abnormality related to transmission control from affecting back-and-forth selection control.

3. The vehicle electronic control apparatus according to claim 2, wherein the second CPU is bus-connected with a second RAM, which is a calculation-processing RAM, a nonvolatile second data memory, and a second memory including a nonvolatile second program memory;

wherein the second memory is divided into an address first region including control data and control programs related to a selection control means for the selection electromagnetic valve and a power supply control means for a power source relay for auxiliary apparatuses including a hydraulic pump, an address second region including control data and transmission control programs related to the gear-shift control means for the gear-shifting electromagnet valve, and an address third region including others; and wherein the address third region or the address first region further contains a program that functions as a pulse generation means for generating the second pulse train signal and a transmission control stopping means, which is a transmission control stopping program that switches the control flow so that the transmission control program related to the transmission control means is not implemented when the second storage circuit stores occurrence of an abnormality, and the transmission control stopping means is implemented before the transmission control program is implemented after the second CPU has been initialized.

4. The vehicle electronic control apparatus according to claim 3,
wherein a plurality of question information pieces generated by the second monitoring control means or the second monitoring control circuit unit are a plurality of question numbers, which are different numbers divided in accordance with the address regions of the second memory, and the second monitoring control means or the second monitoring control circuit unit has a second region determination means or a second region determination circuit;
wherein the second control abnormality determination means or the second control abnormality determination circuit generates the second control abnormality signal and an identification signal corresponding to the address region where an abnormality has occurred; and
wherein when the second control abnormality signal is related to an address first region of the second memory, the second region determination means or the second region determination circuit always initializes and restarts the second CPU, regardless of how large the number of times or the frequency that the second control abnormality signal becomes greater than or equal to the predetermined threshold value.

5. The vehicle electronic control apparatus according to claim 4,
wherein the address third region or the address second region of the second program memory contains a monitoring control program that includes a disconnection/short-circuit abnormality detection means for the gar-shifting electromagnet valve and a disconnection/short-circuit abnormality detection means for a gear-shift sensor and a vehicle speed sensor and that functions as a self-check means for generating a second H/W abnormality signal when an abnormality is detected;
wherein monitoring control operation by the self-check means is monitored by the second control abnormality determination means of the second monitoring control means or the second control abnormality determination circuit of the second monitoring control circuit unit; and
wherein when the self-check means detects occurrence of an abnormality, the second storage circuit stores the occurrence of an abnormality and stops power supply to the gar-shifting electromagnet valve, and even when after that, the second control abnormality signal related to the second address region occurs, the second control abnormality signal is prohibited from performing reset processing of the second CPU.

6. The vehicle electronic control apparatus according to claim 4,
wherein the address third region of the second program memory contains a control program that functions as a second memory abnormality determination means for applying a sum check or a code check represented by a CRC check to the second memory and generating the second memory abnormality signal; and
wherein the second memory abnormality determination means also creates an identification signal corresponding to the address region where the second memory abnormality signal is generated, and the second memory abnormality signal becomes part of the second control abnormality signal and undergoes logical sum processing.

7. The vehicle electronic control apparatus according to claim 2, wherein T1 is greater than or equal to T2 when T1 and T2 denote times allowed for the first CPU and the second CPU to generate the first answer information and the second answer information after receiving the plurality of first questions and the plurality of second questions, respectively.

8. The vehicle electronic control apparatus according to claim 1,
wherein the first CPU is bus-connected with the first random access memory (RAM), which is a calculation-processing RAM, a nonvolatile first data memory, and the first memory including a nonvolatile first program memory;
wherein the first memory is divided into a first address region including control data and control programs related to a fuel injection control means for the fuel-injection electromagnetic valve, a power supply control means for a power source relay for auxiliary apparatuses including a fuel injection pump, and an ignition control means for the ignition coil of a gasoline engine, a second address region including control data and valve-opening control program related to the valve-opening control means for the intake valve opening degree control motor, and a third address region including others;
wherein the third address region or the first address region further includes a pulse generating means that generates the first pulse train signal and an abnormality monitoring program that works as a runaway monitoring means at a time when the first CPU monitors the operation of the second CPU or as a second control abnormality determination means; and
wherein the third address region or the first address region includes a valve-opening control stopping means, which is a program that switches the control flow so that when the first storage circuit stores the number of times or the frequency that each of the first reset signal and the first control abnormality signal becomes greater than or equal to the predetermined threshold value, the control program related to the valve-opening control means is not implemented, and the valve-opening control stopping means is implemented before the valve-opening program is implemented after the first CPU has been initialized.

9. The vehicle electronic control apparatus according to claim 8,
wherein a plurality of question information pieces generated by the first monitoring control circuit unit are a plurality of question numbers, which are different numbers divided in accordance with address regions of the first memory, and the first monitoring control circuit unit has a first region determination circuit;
wherein the first control abnormality determination circuit generates the first control abnormality signal and an identification signal corresponding to the address region where an abnormality has occurred; and
wherein when the first control abnormality signal is related to the first address region of the first memory, the first region determination circuit always initializes and restarts the first CPU, regardless of how large the number of times or the frequency that the first control abnormality signal becomes greater than or equal to the predetermined threshold value.

10. The vehicle electronic control apparatus according to claim 9, wherein the third or the second address region of the first program memory contains a monitoring control program that includes a disconnection/short-circuit abnormality detection means for a driving circuit of the intake valve opening degree control motor, a disconnection/short-circuit abnormality detection means for an accelerator position sensor detecting an accelerator pedal step-on degree, and a disconnection/short-circuit abnormality detection means for a throttle position sensor detecting an intake valve opening degree and that functions as a self-check means for generating a first hardware (H/W) abnormality signal when an abnormality is detected;

wherein monitoring control operation by the self-check means is monitored by the first control abnormality determination circuit of the first monitoring control circuit unit; and wherein when the self-check means detects occurrence of an abnormality, the first storage circuit stores the occurrence of an abnormality and stops power supply to the intake valve opening degree control motor, and even when after that, the first control abnormality signal related to the second address region occurs, the first control abnormality signal is prohibited from performing reset processing of the first CPU.

11. The vehicle electronic control apparatus according to claim 9,
wherein the third address region of the first program memory contains a control program that functions as a first memory abnormality determination means for applying a sum check or a code check represented by a cyclic redundancy check (CRC) check to the first memory and generating the first memory abnormality signal; and wherein the first memory abnormality determination means also creates an identification signal corresponding to the address region where the first memory abnormality signal is generated, and the first memory abnormality signal becomes part of the first control abnormality signal and undergoes logical sum processing.

* * * * *